United States Patent
Fouts et al.

(10) Patent No.: US 12,514,640 B2
(45) Date of Patent: Jan. 6, 2026

(54) SYSTEMS AND METHODS FOR VISUALLY GUIDING BONE REMOVAL DURING A SURGICAL PROCEDURE ON A JOINT

(71) Applicant: Stryker Corporation, Kalamazoo, MI (US)

(72) Inventors: Brian Fouts, Morgan Hill, CA (US);
Ruth Godbey, San Jose, CA (US);
Christopher Zeh, Parker, CO (US);
Ulrich Hoffmann, Breisach (DE)

(73) Assignee: Stryker Corporation, Portage, MI (US)

( * ) Notice: Subject to any disclaimer, the term of this patent is extended or adjusted under 35 U.S.C. 154(b) by 1239 days.

(21) Appl. No.: 17/180,573

(22) Filed: Feb. 19, 2021

(65) Prior Publication Data
US 2021/0259774 A1     Aug. 26, 2021

Related U.S. Application Data

(60) Provisional application No. 62/979,993, filed on Feb. 21, 2020.

(51) Int. Cl.
*A61B 34/10* (2016.01)
*A61B 90/00* (2016.01)

(52) U.S. Cl.
CPC .............. *A61B 34/10* (2016.02); *A61B 90/37* (2016.02); *A61B 2034/105* (2016.02);
(Continued)

(58) Field of Classification Search
CPC ............. A61B 34/10; A61B 90/37; A61B 2034/105; A61B 2034/107; A61B 2090/365; A61B 2090/374; A61B 2090/3764
See application file for complete search history.

(56) References Cited

U.S. PATENT DOCUMENTS

| | | |
|---|---|---|
| 5,437,672 A | 8/1995 | Alleyne |
| 5,862,249 A | 1/1999 | Jang et al. |

(Continued)

FOREIGN PATENT DOCUMENTS

| | | |
|---|---|---|
| CN | 101518447 A | 9/2009 |
| CN | 102194047 A | 9/2011 |

(Continued)

OTHER PUBLICATIONS

Jansen, Mylène P. (2017) A Novel 3D joint space quantification method in patients with osteoarthritis in the knee. 64 pages. (Year: 2017).*

(Continued)

*Primary Examiner* — Larry D Riggs, II
*Assistant Examiner* — Emilie A Neulen
(74) *Attorney, Agent, or Firm* — Morrison & Foerster LLP

(57) ABSTRACT

A method for guiding bone removal during a surgical procedure includes receiving a two-dimensional image of at least a portion of a joint during the surgical procedure, determining an alignment of a pre-generated three-dimensional model of the at least a portion of the joint with the two-dimensional image based on one or more features in the two-dimensional image that are associated with the at least a portion of the joint, wherein the pre-generated three-dimensional model comprises a representation of planned bone removal, generating an overlay image based on the determined alignment, the overlay image comprising an overlay of at least a portion of the representation of planned bone removal on the two-dimensional image, and displaying the overlay image to guide bone removal during the surgical procedure.

40 Claims, 39 Drawing Sheets

(52) U.S. Cl.
CPC .............. *A61B 2034/107* (2016.02); *A61B 2090/365* (2016.02); *A61B 2090/374* (2016.02); *A61B 2090/3764* (2016.02)

(56) References Cited

U.S. PATENT DOCUMENTS

| | | | |
|---|---|---|---|
| 6,161,080 | A | 12/2000 | Aouni-Ateshian et al. |
| 6,205,411 | B1 | 3/2001 | Digioia, III et al. |
| 6,697,664 | B2 | 2/2004 | Kienzle, III et al. |
| 7,167,738 | B2 | 1/2007 | Schweikard et al. |
| 7,231,076 | B2 | 6/2007 | Fu et al. |
| 7,327,865 | B2 | 2/2008 | Fu et al. |
| 7,643,862 | B2 | 1/2010 | Schoenefeld |
| 7,689,042 | B2 | 3/2010 | Brunner et al. |
| 7,783,008 | B2 | 8/2010 | Jabri |
| 7,949,386 | B2 | 5/2011 | Buly et al. |
| 8,014,984 | B2 | 9/2011 | Tannotti et al. |
| 8,052,623 | B2 | 11/2011 | Haimerl et al. |
| 8,090,166 | B2 | 1/2012 | Rappaport et al. |
| 8,152,816 | B2 | 4/2012 | Tuma et al. |
| 8,328,816 | B2 | 12/2012 | Beaule |
| 8,369,593 | B2 | 2/2013 | Peng et al. |
| 8,594,397 | B2 | 11/2013 | Haimerl et al. |
| 8,611,697 | B2 | 12/2013 | Nathaniel et al. |
| 8,678,125 | B2 | 3/2014 | Kosugi et al. |
| 8,679,125 | B2 | 3/2014 | Smith et al. |
| 8,694,075 | B2 | 4/2014 | Groszmann |
| 8,696,603 | B2 | 4/2014 | Takahashi et al. |
| 8,702,805 | B2 | 4/2014 | Trabish |
| 8,715,289 | B2 | 5/2014 | Smith |
| 8,774,900 | B2 | 7/2014 | Buly et al. |
| 8,828,009 | B2 | 9/2014 | Allen et al. |
| 8,831,324 | B2 | 9/2014 | Penenberg |
| 8,858,563 | B2 | 10/2014 | Philippon et al. |
| 8,888,782 | B2 | 11/2014 | Smith et al. |
| 8,890,511 | B2 | 11/2014 | Belew |
| 8,900,320 | B2 | 12/2014 | Frederick et al. |
| 8,923,584 | B2 | 12/2014 | Chabanas et al. |
| 8,934,961 | B2 | 1/2015 | Lakin et al. |
| 8,958,611 | B2 | 2/2015 | Ikits |
| 8,965,108 | B2 | 2/2015 | Chabanas et al. |
| 9,020,223 | B2 | 4/2015 | Chabanas et al. |
| 9,082,319 | B2 | 7/2015 | Shimada et al. |
| 9,113,921 | B2 | 8/2015 | Lang et al. |
| 9,113,971 | B2 | 8/2015 | Metzger et al. |
| 9,122,670 | B2 | 9/2015 | Chabanas et al. |
| 9,123,155 | B2 | 9/2015 | Cunningham et al. |
| 9,173,716 | B2 | 11/2015 | Kasodekar et al. |
| 9,183,629 | B2 | 11/2015 | Chabanas et al. |
| 9,220,567 | B2 | 12/2015 | Sutherland et al. |
| 9,271,804 | B2 | 3/2016 | Wu |
| 9,320,421 | B2 | 4/2016 | Chabanas et al. |
| 9,345,495 | B2 | 5/2016 | Gibson et al. |
| 9,345,552 | B2 | 5/2016 | Janik et al. |
| 9,386,993 | B2 | 7/2016 | Meridew et al. |
| 9,402,726 | B2 | 8/2016 | Linderman et al. |
| 9,443,346 | B2 | 9/2016 | Ikits |
| 9,480,534 | B2 | 11/2016 | Bowling et al. |
| 9,514,533 | B2 | 12/2016 | Chabanas et al. |
| 9,672,662 | B2 | 6/2017 | Scanlan et al. |
| 10,070,903 | B2 | 9/2018 | Blau |
| 10,105,168 | B2 | 10/2018 | Blau |
| 10,709,394 | B2 | 7/2020 | Zhou et al. |
| 10,918,398 | B2 | 2/2021 | Fouts et al. |
| 2003/0176783 | A1 | 9/2003 | Hu |
| 2004/0242987 | A1 | 12/2004 | Liew et al. |
| 2005/0096535 | A1 | 5/2005 | de la Barrera |
| 2007/0016008 | A1 | 1/2007 | Schoenefeld |
| 2007/0129630 | A1 | 6/2007 | Shimko |
| 2007/0135706 | A1 | 6/2007 | Shimko et al. |
| 2007/0249967 | A1 | 10/2007 | Buly et al. |
| 2007/0260256 | A1 | 11/2007 | Beaule |
| 2008/0039717 | A1 | 2/2008 | Frigg et al. |
| 2008/0058641 | A1 | 3/2008 | Shimko |
| 2008/0300478 | A1 | 12/2008 | Zuhars |
| 2009/0000626 | A1 | 1/2009 | Quaid et al. |
| 2009/0209851 | A1 | 8/2009 | Blau |
| 2010/0049493 | A1 | 2/2010 | Haimerl |
| 2010/0284590 | A1 | 11/2010 | Krishnan et al. |
| 2011/0190774 | A1 | 8/2011 | Nikolchev et al. |
| 2011/0213374 | A1 | 9/2011 | Fitz et al. |
| 2011/0213377 | A1 | 9/2011 | Lang et al. |
| 2011/0213379 | A1 | 9/2011 | Blau et al. |
| 2011/0213428 | A1 | 9/2011 | Fitz et al. |
| 2011/0213429 | A1 | 9/2011 | Lang et al. |
| 2011/0238431 | A1 | 9/2011 | Cionni et al. |
| 2011/0270295 | A1 | 11/2011 | Litvack et al. |
| 2011/0301654 | A1 | 12/2011 | Wozencroft et al. |
| 2012/0066892 | A1 | 3/2012 | Lang et al. |
| 2012/0271147 | A1 | 10/2012 | Kim et al. |
| 2013/0083984 | A1 | 4/2013 | Chabanas et al. |
| 2013/0089253 | A1 | 4/2013 | Chabanas et al. |
| 2013/0114866 | A1 | 5/2013 | Kasodekar et al. |
| 2013/0191099 | A1 | 7/2013 | Krekel |
| 2013/0211232 | A1 | 8/2013 | Murphy et al. |
| 2013/0211386 | A1 | 8/2013 | Blau et al. |
| 2013/0211408 | A1 | 8/2013 | Kather et al. |
| 2013/0211531 | A1 | 8/2013 | Steines et al. |
| 2013/0314440 | A1 | 11/2013 | Simon et al. |
| 2013/0315371 | A1 | 11/2013 | Simon et al. |
| 2014/0079303 | A1 | 3/2014 | Pfrengle et al. |
| 2014/0187908 | A1 | 7/2014 | Ellermann et al. |
| 2014/0243833 | A1 | 8/2014 | Smith |
| 2014/0278322 | A1 | 9/2014 | Jaramaz et al. |
| 2014/0316417 | A1 | 10/2014 | Kaiser et al. |
| 2014/0322197 | A1 | 10/2014 | Brooks |
| 2014/0378982 | A1 | 12/2014 | Philippon et al. |
| 2015/0066151 | A1 | 3/2015 | Frederick et al. |
| 2015/0106024 | A1 | 4/2015 | Lightcap et al. |
| 2015/0133945 | A1 | 5/2015 | Dushyant et al. |
| 2015/0182295 | A1 | 7/2015 | Bozung et al. |
| 2015/0185846 | A1 | 7/2015 | Otto et al. |
| 2015/0265266 | A1 | 9/2015 | Sanchez et al. |
| 2015/0265362 | A1 | 9/2015 | Andersson et al. |
| 2015/0269727 | A1 | 9/2015 | Chabanas et al. |
| 2015/0355298 | A1 | 12/2015 | Ben-Eliezer et al. |
| 2016/0038160 | A1 | 2/2016 | Metzger et al. |
| 2016/0066770 | A1 | 3/2016 | Barbato et al. |
| 2016/0074124 | A1 | 3/2016 | Fitz et al. |
| 2016/0113720 | A1 | 4/2016 | Lavallee et al. |
| 2016/0135816 | A1 | 5/2016 | Lavallee et al. |
| 2016/0157751 | A1 | 6/2016 | Mahfouz |
| 2016/0157936 | A1 | 6/2016 | Netravali |
| 2016/0175054 | A1 | 6/2016 | Kang et al. |
| 2016/0191887 | A1 | 6/2016 | Casas |
| 2016/0235381 | A1 | 8/2016 | Scanlan et al. |
| 2016/0242931 | A1 | 8/2016 | Wong et al. |
| 2016/0253846 | A1 | 9/2016 | Scanlan et al. |
| 2016/0262772 | A1 | 9/2016 | Gibson et al. |
| 2016/0278787 | A1 | 9/2016 | Axelson, Jr. et al. |
| 2016/0278793 | A1 | 9/2016 | Meridew et al. |
| 2016/0324580 | A1 | 11/2016 | Esterberg |
| 2016/0331467 | A1 | 11/2016 | Slamin et al. |
| 2017/0306416 | A1 | 10/2017 | Bedoya et al. |
| 2018/0035964 | A1 | 2/2018 | Funabasama et al. |
| 2018/0318014 | A1 | 11/2018 | Gangwar et al. |
| 2019/0133693 | A1 | 5/2019 | Mahfouz |
| 2019/0167221 | A1 | 6/2019 | Simon et al. |
| 2019/0231433 | A1 | 8/2019 | Amanatullah |
| 2019/0231434 | A1 | 8/2019 | Lambers et al. |
| 2020/0253667 | A1 | 8/2020 | Fouts et al. |
| 2020/0312011 | A1 | 10/2020 | Kopeinigg et al. |
| 2021/0169503 | A1 | 6/2021 | Fouts et al. |
| 2021/0251590 | A1 | 8/2021 | Guo |
| 2022/0183760 | A1 | 6/2022 | Fouts et al. |
| 2023/0210599 | A1 | 7/2023 | Lambers et al. |
| 2023/0414231 | A1 | 12/2023 | Fouts |
| 2024/0390017 | A1 | 11/2024 | Fouts |
| 2025/0195146 | A1 | 6/2025 | Fouts et al. |

FOREIGN PATENT DOCUMENTS

| | | |
|---|---|---|
| CN | 104185451 A | 12/2014 |
| CN | 104244860 A | 12/2014 |

(56) References Cited

FOREIGN PATENT DOCUMENTS

| | | |
|---|---|---|
| CN | 112037200 A | 12/2020 |
| DE | 10057023 A1 | 6/2002 |
| EP | 1844726 B1 | 10/2007 |
| EP | 2618313 A1 | 7/2013 |
| GB | 2572594 A | 10/2019 |
| JP | 6063599 B1 | 1/2017 |
| WO | 2011/158117 A2 | 12/2011 |
| WO | 2012/149964 A1 | 11/2012 |
| WO | 2013/174401 A1 | 11/2013 |
| WO | 2013/174402 A1 | 11/2013 |
| WO | 2014/048447 A1 | 4/2014 |
| WO | 2015/124171 A1 | 8/2015 |
| WO | 2016/154557 A1 | 9/2016 |
| WO | 2017/218933 A1 | 12/2017 |
| WO | 2018/236936 A1 | 12/2018 |
| WO | WO-2019148154 A1 * | 8/2019 ............. A61B 34/10 |
| WO | 2019/193341 A1 | 10/2019 |

OTHER PUBLICATIONS

Agus et al. (2003). "A haptic model of a bone-cutting burr," Studies in Health Technology and Informatics 94: 4-10.

Alignment Disorders, Radiology Key, 2015, https://radiologykey.com/alignment-disorders/, 11 pages.

Allen, D. et al., Prevalence of associated deformities and hip pain in patients with cam-type femoroacetabular impingement, J Bone Joint Surg, vol. 91-B. No. 5, May 2009, pp. 589-594.

Anderson, Lucas A. et al., Acetabular Carilage Delamination in Femoroacetabular Impingement: Risk Factors and Magnetic Resonance Imaging Diagnosis, J Bone Joint Surg Am, vol. 91, No. , 2009, pp. 305-313.

Audenaert et al. (May 2012). "Imageless versus image-based registration in navigated arthroscopy of the hip," The Journal of Bone & Joint Surgery 94-B(5) 624-629.

Audenaert, Emmanuel A. et al., Development of a three-dimensional detection method of cam deformities in femoroacetabular impingement, Skeletal Radiology, vol. 40, 2011, pp. 921-927.

Audenaert, Emmanuel A. et al., Three-Dimensional Assessment of Cam Engagement in Femoroacetabular Impingement, Arthroscopy, vol. 27, No. 2, 2011, pp. 167-171.

Beaule, Paul E. et al., Three-dimensional computed tomography of the hip in the assessment of femoroacetabular impingement, J Orthop Res, vol. 23, 2005, pp. 1286-1292.

Beck, M. et al., Hip morphology influences the pattern of damage to the acetabular cartilage: femoroacetabular impingement as a cause of early osteoarthritis of the hip, J Bone Joint Surg, vol. 87-B, No. 7, 2005, pp. 1012-1018.

Bei, Yanhong et al., Multibody dynamic simulation of knee contact mechanics, Med Eng Phys., vol. 26, No. 9, Nov. 2004, pp. 777-789.

Bouma, Heinse W. et al., Can Combining Femoral and Acetabular Morphology Parameters Improve the Characterization of Femoroacetabular Impingement?, Clin Orthop Rel Res, vol. 473, No. 4, 2015, pp. 1396-1403.

Broughton, N. S. et al., Reliability of radiological measurements in the assessment of the child's hip, J Bone Joint Surg, vol. 71-B, No. 1, 1989, p. 6-8.

Butler, Mark H., Current Technologies for Device Independence, Hewlett Packard, 2001, pp. 1-28.

Cadet, Edwin R. et al., Inter- and intra-observer agreement of femoroacetabular impingement (FAI) parameters comparing plain radiographs and advanced, 3D computed tomographic (CT)-generated hip models in a surgical patient cohort, Knee Surg Sports Traumatol Arthrosc, vol. 27, No. 7, 2014, pp. 2324-2331.

Carlisle, John C. et al., Reliability of Various Observers in Determining Common Radiographic Parameters of Adult Hip Structural Anatomy, The Iowa Orthopaedic Journal, vol. 31, 2011, pp. 52-58.

Chadayammuri, Vivek et al., Measurement of lateral acetabular coverage: a comparison between CT and plain radiography, J Hip Preservation Surgery, vol. 2, No. 4, Oct. 22, 2015, pp. 392-400.

Chadayammuri, Vivek et al., Passive Hip Range of Motion Predicts Femoral Torsion and Acetabular Version, J Bone Joint Surg Am., vol. 98, 2016, pp. 127-134.

Chavhan, Govind B. et al., Principles, Techniques, and Applications of T2*-based MR Imaging and Its Special Applications, RadioGraphics, vol. 29, 2009, pp. 1433-1449.

Cheng, Hui et al., Comparison of 2.5D and 3D Quantification of Femoral Head Coverage in Normal Control Subjects and Patients with Hip Dyplasia, PLOS One, vol. 10, No. 11, Nov. 24, 2015, pp. 1-14.

Clohisy, John C. et al., A Systematic Approach to the Plain Radiographic Evaluation of the Young Adult Hip, J Bone Joint Surg Am., vol. 90, Supp. 4, 2008, pp. 47-66.

Clohisy, John C. et al., Radiographic Evaluation of the Hip has Limited Reliability, Clin Orthop Relat Res, vol. 467, 2009, pp. 666-675.

Clohisy, John C. et al., The Frog-leg Lateral Radiograph Accurately Visualized Hip Cam Impingement Abnormalities, Clin Orthop Relat Res, No. 462, Sep. 2007, pp. 115-121.

Cobb et al. (Apr. 30, 2010). "Cams and Pincer Impingement Are Distinct, Not Mixed," Clinical Orthopaedics and Related Research 468(8): 2143-2151.

Dandachli, W. et al., Analysis of cover of the femoral head in normal and dysplastic hips, J Bone Joint Surg, vol. 90-B, No. 11, 2008, pp. 1428-1434.

Dandachli, W. et al., Three-dimensional CT analysis to determine acetabular retroversion and the implications for the management of femoro-acetabular impingement, J Bone Joint Surg. Vol. 91-B, No. 8, 2009, pp. 1031-1036.

Danz, J.C. et al., Three-dimensional portable document format: A simple way to present 3-dimensional data in an electronic publication, American Journal of Orthodontics and Dentofacial Orthopedics, vol. 140, No. 2, Aug. 2011, pp. 274-276.

Decision of Rejection dated Sep. 1, 2022, directed to CN Application No. 201780083846.8; 14 pages.

Dyonics Plan Hip Impingement Planning System: User Manual and Frequently Asked Questions, Smith & Nephew, Inc., 2014. No page #.

Eguizabal, Alma et al., A Weighting Strategy for Active Shape Models, IEEE International Conference on Image Processing, 2017. 6 pages.

Eijer, H. et al., Evaluation and Treatment of Young Adults with Femoro-Acetabular Impingement Secondary to Perthes' Disease, Hip Int., vol. 16, No. 4, 2006, pp. 273-280.

EOS Imaging. "EOS System," located at https://www.eos-imaging.com/us/our-expertise/imaging-solutions/eos-system, visited on Oct. 29, 2019. 8 pages.

Extended European Search Report dated May 13, 2020, directed to EP Application No. 17870894.7; 12 pages.

Fa, Lianggluo et al., Superiority of the modified Tonnis angle over the Tonnis angle in the radiographic diagnosis of acetabuular dysplasia, Experimental and Therapeutic Medicine, vol. 8, 2014, pp. 1934-1938.

Fabricant, Peter D. et al., Clinical Outcomes After Arthroscopic Psoas Lengthening: The Effect of Femoral Version, Arthroscopy, vol. 28, No. 7, 2012, pp. 965-971.

Fabricant, Peter D. et al., The Effect of Femoral and Acetabular Version on Clinical Outcomes After Arthroscopic Femoroacetabular Impingement Surgery, J Bone Joint Surg, vol. 97, No. 7, 2015, pp. 537-543.

First Office Action dated Aug. 31, 2021, directed to CN Application No. 201780083846.8; 25 pages.

Fouts et al., U.S. Notice of Allowance and Fee(s) Due mailed Nov. 3, 2022, directed to U.S. Appl. No. 17/143,091; 9 pages.

Fouts et al., U.S. Notice of Allowance and Fee(s) Due mailed Oct. 8, 2020, directed to U.S. Appl. No. 15/818,394; 7 pages.

Fouts et al., U.S. Office Action dated Apr. 21, 2020, directed to U.S. Appl. No. 15/818,394; 33 pages.

Fouts et al., U.S. Office Action dated Apr. 25, 2024, directed to U.S. Appl. No. 18/190,956; 32 pages.

Fouts et al., U.S. Office Action dated Dec. 20, 2019, directed to U.S. Appl. No. 15/818,394: 28 pages.

Fouts et al., U.S. Office Action dated Dec. 8, 2023, directed to U.S. Appl. No. 16/785,367; 39 pages.

(56) References Cited

OTHER PUBLICATIONS

Fouts et al., U.S. Office Action dated Feb. 15, 2019, directed to U.S. Appl. No. 15/818,394; 21 pages.
Fouts et al., U.S. Office Action dated Jun. 3, 2024, directed to U.S. Appl. No. 16/785,367; 43 pages.
Fouts et al., U.S. Office Action dated Jun. 6, 2024, directed to U.S. Appl. No. 17/644,335; 14 pages.
Fouts et al., U.S. Office Action dated Mar. 1, 2022, directed to U.S. Appl. No. 16/785,367; 31 pages.
Fouts et al., U.S. Office Action dated Mar. 23, 2023, directed to U.S. Appl. No. 16/785,367; 18 pages.
Fouts et al., U.S. Office Action dated Nov. 9, 2023, directed to U.S. Appl. No. 18/190,956; 18 pages.
Fouts et al., U.S. Office Action dated Sep. 23, 2022, directed to U.S. Appl. No. 16/785,367; 21 pages.
Gosvig, K. K. et al., A new radiological index for assessing asphericity of the femoral head in cam impingement, J Bone Joint Surg, vol. 89-B, No. 10, Oct. 2007, pp. 1309-1316.
Hanson, Joey A. et al., Discrepancies in measuring acetabular coverage: revisiting the anterior and lateral center edge angels, Journal of Hip Preservation Surgery, vol. 2, No. 3, 2015, pp. 280-286.
Hellman, Michael D. et al., Radiographic Comparison of Anterior Acetabular Rim Morphology Between Pincer Femoroacetabular Impingement and Control, Arthroscopy, vol. 32, No. 3, 2016, pp. 468-472.
Hernandez, Ramiro J. et al., CT Determination of Femoral Torsion, AJR, vol. 137, Jul. 1981, pp. 97-101.
Hetsroni, Iftach et al., Anterior Inferior Illiac Spine Morphology Correlates With Hip Range of Motion: A Classification System and Dtynamic Model, Clin Orthop Relat Res, vol. 471, No. 8, Aug. 2013, pp. 2497-2503.
Heyworth, Benton E. et al., Preoperative Three-dimensional CT Predicts Intraoperative Findings in Hip Arthroscopy, Clin Orthop Rlat Res, vol. 470, No. 7, Jul. 2012, pp. 1950-1957.
International Preliminary Report on Patentability dated Aug. 23, 2022, directed to International Application No. PCT/US2021/018911; 10 pages.
International Preliminary Report on Patentability dated Jun. 13, 2023, directed to International Application No. PCT/US2021/072917; 9 pages.
International Preliminary Report on Patentability mailed on May 31, 2019 for PCT Application No. PCT/US2017/062603 filed Nov. 20, 2017, 11 pages.
International Search Report and Written Opinion mailed Jun. 1, 2021, directed to International Application No. PCT/US2021/018911; 17 pages.
International Search Report and Written Opinion mailed May 10, 2022, directed to International Application No. PCT/US2021/072917; 13 pages.
International Search Report and Written Opinion mailed on Feb. 1, 2018 for PCT Application No. PCT/US2017/062603 filed Nov. 20, 2017, 12 pages.
Ito, K. et al., Femoroacetabular impingement and the cam-effect: a MRI-based quantitative anatomical study of the femoral head-neck offset, J Bone Joint Surg, vol. 83-B, No. 2, Mar. 2001, pp. 171-176.
Jesse, Mary Kristen et al., Normal Anatomy and Imaging of the Hip: Emphasis on Impingement Assessment, Seminars in Musculoskeletal Radiology, vol. 17, No. 3, 2013, pp. 229-247.
Johnston, Todd L. et al., Relationship Between Offset Angle Alpha and Hip Chondral Injury in Femoroacetabular Impingement, Arthoroscopy, vol. 24, No. 6, 2008, pp. 669-675.
Kasten et al. (Apr. 2020). "End-To-End Convultional Neural Network for 3D Reconstruction of Knee Bones from Bi-Planar X-Ray Images," 12 pages.
Kelkar, Rajeev, Normal and Abnormal Mechanics of the Shoulder: Studies of Articular Geometry, Contact, and Kinematics, ProQuest Dissertations and Theses, 1996. 3 pages.

Kelly, Bryan T. et al., Alterations in Internal Rotation and Alpha Angles Are Associated With Arthroscopic Cam Decompression in the Hip, The American Journal of Sports Medicine, 2012, pp. 1-6.
Konishi, N. et al., Determination of acetabular coverage of the femoral head with use of a single anteroposterior radiograph. A new computerized technique, J Bone Joint Surg Am, vol. 75-A, No. 9, 1993, pp. 1318-1333.
Kraeutler, Matthew J. et al., Femoral Version Abnormalities Significantly Outweigh Effect of Cam Impingement on Hip Internal Rotation, J Bone Joint Surg Am., vol. 100-A, No. 3, 2018, pp. 205-210.
Krekel, P.R. et al., Interactive simulation and comparative visualisation of the bone-determined range of motion of the human shoulder, SimVis, 2006, pp. 1-13.
Laborie, Lene Bjerke et al., Radiographic measurements of hip dysplasia at skeletal maturity—new reference intervals baed on 2,036 19-yea-old Norwegians, Skeletal Radiol, vol. 42, No. 7, Jul. 2013, pp. 925-935.
Lambers et al., U.S. Advisory Action dated Oct. 21, 2021, directed to U.S. Appl. No. 16/261,464; 5 pages.
Lambers et al., U.S. Notice of Allowance and Fee(s) Due mailed May 13, 2022, directed to U.S. Appl. No. 16/261,464; 5 pages.
Lambers et al., U.S. Notice of Allowance and Fee(s) Due mailed Nov. 24, 2023, directed to U.S. Appl. No. 18/045,449; 6 pages.
Lambers et al., U.S. Office Action dated Dec. 15, 2020 directed U.S. Appl. No. 16/261,464; 16 pages.
Lambers et al., U.S. Office Action dated Dec. 20, 2021, directed to U.S. Appl. No. 16/261,464; 15 pages.
Lambers et al., U.S. Office Action dated Jul. 7, 2023, directed to U.S. Appl. No. 18/045,449; 14 pages.
Lambers et al., U.S. Office Action dated Jun. 11, 2021, directed to U.S. Appl. No. 16/261,464; 13 pages.
Larson, Christopher M. et al., Are Normal Hips Being Labeled as Pathologic? A CT-based Method for Defining Normal Acetabular Coverage, Clin Orthop Relat Res, vol. 473, No. 4, Apr. 5, 2015. pp. 1247-1254.
Larson, Christopher M. et al., Arthroscopic Hip Revision Surgery for Residual Femoroacetabular Impingement (FAI): Surgical Outcomes Compared With a Matched Cohort After Primary Arthroscopic FAI Correction, The Am J of Sports Med. vol. 42, No. 8, 2014, pp. 1785-1790.
Leboeuf, Fabien, Using LATEX to produce multi-media clinical reports, The PracTeX Journal, No. 1, 2011, pp. 1-14.
Lequesne, M. et al., The normal hip joint space: variations in width, shape, and architecture on 223 pelvic radiographs, Ann Rheum Dis, vol. 63, 2004, pp. 1145-1151.
Levy, David M. et al., Prevalence of Cam Morphology in Females with Femoroacetabular Impingement, Front. Surg., vol. 2, No. 61, Dec. 2015, pp. 1-5.
Linder et al. (Aug. 2013). "Fully Automatic Segmentation of the Proximal Femur Using Random Forest Regression Voting," IEEE Transactions on Medical Imaging 32(8):1462-1472.
Mardones, Rodrigo M. et al., Surgical Correction of "Cam-Type" Femoroacetabular Impingement: A Cadaveric Comparison of Open Versus Arthroscopic Debridement, Arthroscopy, vol. 25, No. 2, 2009, pp. 175-182.
Mardones, Rodrigo M. et al., Surgical Treatment of Femoroacetabular Impingement: Evaluation of the Effect of the Size of the Resection, J Bone Joint Surg Am, vol. 88A, Supp. 1, Mar. 2006, pp. 84-91.
Matsuda et al., Acute Iatrogenic Dislocation Following Hip Impingement Arthroscopic Surgery, Arthroscopy, vol. 25, No. 4, 2009, pp. 400-404.
Matsuda et al., Closed Intramedullary Derotational Osteotomy and Hip Arthroscopy for Cam Femoroacetabular Impingement From Femoral Retroversion, Arthroscopy Techniques, vol. 3, No. 1, 2014, pp. e83-e88.
McCarthy, Joseph et al., Anatomy, pathologic features, and treatment of acetabular labral tears, Clin Orthop Relat Res, No. 406, 2003, pp. 38-47.
Meyer, Dominik C. et al., Comparison of Six Radiographic Projections to Assess Femoral Head/Neck Ashpericity, Clin Orthop Relat Res. No. 445, 2006, pp. 181-185.

(56) References Cited

OTHER PUBLICATIONS

Milone, Michael T. et al., Novel CT-based Three-dimensional Software Improves the Characterization of Cam Morphology, Clin Orthop Relat Res, vol. 471, No. 8, Aug. 2013, pp. 2484-2491.
Minciullo et al. "Fully Automated Shape Analysis for Detection of Osteoarthritis from Lateral Knee Radiographs," 2016 23rd International Conference on Pattern Recognition (ICPR), Dec. 4-8, 2016, Cancún Center, Cancún, México; pp. 3787-3791.
Miyasaka, Dai et al., Three-dimensional Assessment of Femoral Head Coverage in Normal and Dysplastic Hips: A Novel Method, Acta Med., vol. 68, No. 5, 2014, pp. 277-284.
Murphy, S.B. et al., The prognosis in untreated dysplasia of the hip: A study of radiographic factors that predict the outcome, J Bone Joint Surg Am, vol. 77-A, No. 7, 1995, pp. 985-989.
Nepple, Jeffrey J. et al., Clinical and Radiographic Predictors of Intra-articular Hip Disease in Arthroscopy, Am J Sports Med, vol. 39, No. 2, 2011, pp. 296-303.
Nepple, Jeffrey J. et al., Diagnostic Imaging of Femoroacetabular Impingement, J Am Acad Orthop Surg, vol. 21, Suppl. 1, 2013, pp. S20-S26.
Nepple, Jeffrey J. et al., Do Plain Radiographs Correlate With CT for Imaging of Cam-type Femoroacetabular Impingement?. Clin Orthop Relat Res, vol. 470, No. 12, Dec. 2012, pp. 3313-3320.
Notzli, H.P. et al., The contour of the femoral head-neck junction as a predictor for the risk of anterior impingement, J Bone Joint Surg, vol. 84-B, 2002, pp. 556-560.
Office Action dated Aug. 23, 2023, directed to EP Application No. 17 870 894.7; 6 pages.
Ogata, S. et al., Acetabular cover in congenital dislocation of the hip, J Bone Joint Surg, vol. 72-B, No. 2, 1990, pp. 190-196.
Omeroglu, Hakan et al., Analysis of a radiographic assessment method of acetabular cover in developmental dysplasia of the hip, Arch Orthop Trauma Surg, vol. 122, No. 6, 2002, pp. 334-337.
Omeroglu, Hakan et al., Measurement of center-edge angle in developmental dysplasia of the hip: a comparison of two methods in patients under 20 years of age, Skeletal Radiol, vol. 31, No. 1, 2002, pp. 25-29.
Outerbridge, R.E., The etiology of chondromalacia patellae, J Bone Joint Surg, vol. 43-B, No. 4, 1961, pp. 556-560.
Ozcelik, Abdurrahman et al., Definition of a quantitative measurement method for acetabular version in a plain radiograph in the healthy adult hip, Eklem Hastalik Cerrahisi, vol. 26, No. 1, 2015, pp. 2-5.
Panoramic Fluoro, Radlink Inc., 2017, http:--www.radlink.com-index.php-products-software-surgeons-checklist-software-panoramic-fluoro-. 2 pages.
Perreira, Aimee C. et al., Multilevel Measurement of Acetabular Version Using 3-D CT-generated Models, Clin Orthop Relat Res, vol. 469, No. 2, Feb. 2011, pp. 552-561.
Phelps, A. et al., Embedding 3D Radiology Models in Portable Document Format, American Journal of Roentgenology, vol. 199, No. 6, Dec. 2012, pp. 1342-1344.
Rakhra, Kawan S. et al., Comparison of MRI Alpha Angle Measurement Planes in Femoroacetabular Impingement, Clin Orthop Relat Res, vol. 467, No. 3, 2009, pp. 660-665.
Reikeras, Olav et al., Cross table lateral radiography for measurement of acetabular cup version, Ann Transl Med., vol. 4, No. 9, 2016, pp. 1-4.
Reynolds, D. et al., Retroversion of the acetabulum: a cause of hip pain, J Bone Joint Surg, vol. 81-B, No. 2, Mar. 1999, pp. 281-288.
Ross, James R. et al., Intraoperative Fluoroscopic Imaging to Treat Cam Deformities: Correlation With 3-Dimensional Computed Tomography, Am J. Sports Med. vol. 42, No. 6, 2014, pp. 1370-1376.
Ruthensteiner, B. et al., Embedding 3D Models of Biological Specimens in PDF Publications, Microscopy Research and Technique, vol. 71, No. 11, 2008, pp. 778-786.
Schumann et al. (2013). "An Integrated System for 3D Hip Joint Reconstruction from 2D X-rays: A Preliminary Validation Study," Annals of Biomedical Engineering, 41(10): 2077-2087.
Second Office Action dated Mar. 16, 2022, directed to CN Application No. 201780083846.8; 17 pages.
Siebenrock, K.A. et al., Effect of Pelvic Tilt on Acetabular Retroversion: A Study of Pelves From Cadavers, Clin Orthop Relat Res. No. 407, Feb. 2003, pp. 241-248.
Stahelin, Lisca et al., Arthroscopic Offset Restoration in Femoroacetabular Cam Impingement: Accuracy and Early Clinical Outcome, Arthroscopy: The J of the Arthroscopic and Rel Surg, vol. 24, No. 1, 2008, pp. 51-57.
Stelzeneder, David et al., Can Radiographic Morphometric Parameters for the Hip Be Assessed on MRI?, Clin Orthop Relat Res, vol. 471, No. 3, Mar. 2013, pp. 989-999.
Stubbs, Allston J. et al., Classic measures of hip dysplasia do not correlate with three-dimensional computer tomographic measures and indices, Hip Int, vol. 21, No. 5, 2011, pp. 549-558.
Tannast, Moritz et al., Conventional radiographs to assess femoroacetabular impingement, Instr Course Lect, vol. 58, 2009, pp. 203-212.
Tannast, Moritz et al., Femoroacetabular Impingement: Radiographic Diagnosis—What the Radiologist Should Know, Am J Radiology, vol. 188, Jun. 2007, pp. 1540-1552.
Tannast, Moritz et al., Noninvasive Three-Dimensional Assessment of Femoroacetabular Impingement, J Orthop Res, vol. 25, No. 1, 2007, pp. 122-131.
Tannast, Moritz et al., Which Radiographic Hip Parameters Do Not Have to Be Corrected for Pelvic Rotation and Tilt?, Clin Orthop Relat Res, vol. 473, No. 4, Apr. 2015, pp. 1255-1266.
Tannenbaum, Eric et al., Gender and racial differences in focal and global acetabular version, J Arthroplasty, vol. 29, No. 2, Feb. 2014, pp. 373-376.
Tannenbaum, Eric P. et al., A Computed Tomography Study of Gender Differences in Acetabular Version and Morphology: Implications for Femoroacetabular Impingement, The J of Arthroscopic and Rel Surg, vol. 31, No. 7, 2015, pp. 1247-1254.
Thaler et al. "Volumetric Reconstruction from a Limited No. of Digitally Reconstructed Radiographs Using CNNs," Proceedings of a OAGM Workshop, 2018; pp. 13-19.
Tonnis, D. et al., Acetabular and Femoral Anteversion: Relationship with Osteoarthritis of the Hip, J Bone Joint Surg Am, vol. 81-A, No. 12, 1999, pp. 1747-1770.
Tonnis, D., Congenital Dysplasia and Dislocation of the Hip in Children and Adults, Chapter 9, 1987, pp. 100-142.
Uchida, Soshi et al., Clinical and Radiographic Predicators for Worsened Clinical Outcomes After Hip Arthroscopic Labral Preservation and Capsular Closure in Developmental Dysplasia of the Hip, Am J Sports Med. vol. 44, No. 1, 2016, pp. 28-38.
Van Bosse, Harold J. P. et al., Pelvic Positioning Creates Error in CT Acetabular Measurements, Clin Orthop Relat Res, vol. 469, No. 6, Jun. 2011, pp. 1683-1691.
Werner, Clement M. L. et al., Normal values of Wiberg's lateral center-edge angle and Lequesne's acetabular index-a coxometric update, Skeletal Radiol, vol. 41, 2012, pp. 1273-1278.
Wiberg, Gunnar, Studies on Dysplastic Acetabula and Congenital Subluxation of the Hip Joint with Special Reference to the Complication of Osteoarthritis, Orthopedic Clinic of Karolinska Institutet, 1939, pp. 1-39 and 129-135.
Wilson, J. D. et al., To what degree is digital imaging reliable? Validation of femoral neck shaft angle measurement in the era of picture archiving and communication systems, The British Journal of Radiology, vol. 84, Apr. 2011, pp. 375-379.
Zaltz, Ira et al., The Crossover Sign Overestimates Acetabular Retroversion, Clin Orthop Relat Res, vol. 471, 2013, pp. 2463-2470.
Zhao et al. "Automated Analysis of Femoral Artery Calcification Using Machine Learning Techniques," 2019 International Conference on Computational Science and Computational Intelligence (CSCI), Dec. 5-7, 2019, Las Vegas, Nevada, United States; pp. 584-589.
Ziegler, A. et al., Effectively incorporating selected multimedia content into medical publications, BMC Medicine, vol. 9, No. 17, 2011, pp. 1-6.
Fouts et al., U.S. Notice of Allowance and Fee(s) Due dated Feb. 21, 2025, directed to U.S. Appl. No. 18/190,956; 7 pages.

(56) References Cited

OTHER PUBLICATIONS

Fouts et al., U.S. Office Action dated Jan. 23, 2025, directed to U.S. Appl. No. 16/785,367; 34 pages.
Atlas of MSK Measurements (2012): how to draw the alpha angle, Stanford MSK, http://xrayhead.com/measure/show_measurement.php?i=3; 1 page.
Atlas of MSK Measurements (2012): how to draw the femoral version, Stanford MSK, http://xrayhead.com/measure/show_measurement.php?i=5; 1 page.
Fouts et al., U.S. Advisory Action dated Aug. 9, 2024, directed to U.S. Appl. No. 18/190,956; 6 pages.
Fouts et al., U.S. Advisory Action dated Oct. 18, 2024, directed to U.S. Appl. No. 16/785,367; 5 pages.
Fouts et al., U.S. Notice of Allowance and Fee(s) Due mailed Nov. 25, 2024, directed to U.S. Appl. No. 17/644,335; 10 pages.
Fouts et al., U.S. Office Action dated Sep. 12, 2024, directed to U.S. Appl. No. 18/190,956; 20 pages.
Fouts et al., U.S. Office Action dated Jun. 6, 2025, directed to U.S. Appl. No. 16/785,367; 16 pages.
Office Action dated Apr. 10, 2025, directed to EP Application No. 21 711 707.6; 6 pages.
The First Office Action dated May 8, 2025, directed to CN Application No. 202180030039.6; 9 pages.

\* cited by examiner

CAM-TYPE FEMOROACETABULAR IMPINGEMENT (FAI)

CAM INJURY TO THE LABRUM

PINCER-TYPE FEMOROACETABULAR IMPINGEMENT (FAI)

PINCER INJURY TO THE LABRUM

SYSTEMS AND METHODS FOR VISUALLY GUIDING BONE REMOVAL DURING A SURGICAL PROCEDURE ON A JOINT

CROSS REFERENCE TO RELATED APPLICATIONS

This application claims benefit of U.S. Provisional Application No. 62/979,993, filed Feb. 21, 2020, the contents of which is incorporated herein by reference in its entirety.

FIELD

This disclosure relates to orthopedics in general, and more particularly to surgical methods and systems for treating a joint.

BACKGROUND

Orthopedics is a medical specialty that focuses on the diagnosis, correction, prevention, and treatment of patients with skeletal conditions, including for example conditions or disorders of the bones, joints, muscles, ligaments, tendons, nerves and skin, which make up the musculoskeletal system. Joint injuries or conditions such as those of the hip joint or other joints can occur from overuse or over-stretching or due to other factors, including genetic factors that may cause deviations from "normal" joint morphology.

Joints are susceptible to a number of different pathologies (e.g., conditions or disorders, which may cause deviation from the normal joint morphology). These pathologies can have both congenital and injury-related origins. In some cases, the pathology can be substantial at the outset. In other cases, the pathology may be minor at the outset but, if left untreated, may worsen over time. More particularly, in many cases an existing pathology may be exacerbated, for example, by the dynamic nature of the joint, the substantial weight loads imposed on the joint, or a combination thereof. The pathology may, either initially or thereafter, significantly interfere with patient comfort and lifestyle and may require surgical treatment.

The current trend in orthopedic surgery is to treat joint pathologies using minimally-invasive techniques such as joint arthroscopy in which an endoscope is inserted into the joint through a small incision. Procedures performed arthroscopically include debridement of bony pathologies in which portions of bone in a joint that deviate from a "normal" or target morphology are removed. During a debridement procedure, the surgeon uses an endoscopic camera to view the debridement area, but because the resulting endoscopic image has a limited field of view and is somewhat distorted, the surgeon cannot view the entire pathology all at once. As a result, it is generally quite difficult for the surgeon to determine exactly how much bone should be removed, and whether the shape of the remaining bone has the desired geometry.

SUMMARY

According to some embodiments, systems and methods can guide a surgeon during a surgical procedure on a joint by displaying an overlay of a three-dimensional representation of planned bone removal on a two-dimensional image of the joint. The two-dimensional image can be an intra-operatively generated image of the joint, showing the joint in its current state during the procedure, and the three-dimensional representation of planned bone removal can indicate where bone should be removed from the joint in three-dimensional space, so that the overlay illustrates where bone should be removed both at the profile of the bone captured in the two-dimensional image and portions of the joint that are beyond the two-dimensional imaging plane. By providing a three-dimensional representation of the planned bone removal as an overlay on a two-dimensional image of the current state of the joint, the surgeon can better understand where bone should be removed beyond just the profile of the bone captured in the two-dimensional image.

According to some embodiments, the systems and methods can generate the overlay by extracting one or more features associated with the position of the bone of interest from the intra-operatively generated two-dimensional image and using the features to determine an alignment of the three-dimensional model of the joint with the two-dimensional image. The representation of the planned bone removal in the two-dimensional image can then be rendered as an overlay at the proper location and in the proper orientation to enable the surgeon to visualize where and how much bone should be removed outside of the imaging plane. This process can be repeated for newly generated two-dimensional images as the surgery progresses.

According to some embodiments, a method for guiding bone removal during a surgical procedure includes receiving a two-dimensional image of at least a portion of a joint during the surgical procedure, determining an alignment of a pre-generated three-dimensional model of the at least a portion of the joint with the two-dimensional image based on one or more features in the two-dimensional image that are associated with the at least a portion of the joint, wherein the pre-generated three-dimensional model comprises a representation of planned bone removal, generating an overlay image based on the determined alignment, the overlay image comprising an overlay of at least a portion of the representation of planned bone removal on the two-dimensional image, and displaying the overlay image to guide bone removal during the surgical procedure.

In any of these embodiments, the three-dimensional model can be pre-generated based on one or more scans of the joint.

In any of these embodiments, the joint can include a femur and the one or more features can be associated with at least one of a center of a femoral head, a centerline of a femoral neck, and a perimeter of the femoral head.

In any of these embodiments, the joint can include a pelvis, and the one or more features can be associated with at least one of a center of the acetabulum, the obturator foramen, and the pubic symphysis.

In any of these embodiments, the joint can include a tibia, and the one or more features can be associated with at least one of the tibial plateau, the tibial shaft, and the intercondylar eminence.

In any of these embodiments, the joint can include a spinal vertebra, and the one or more features can be associated with at least one of the pedicle, the facet, the superior endplate, and the inferior endplate.

In any of these embodiments, determining the alignment of a pre-generated three-dimensional model of the at least a portion of the joint with the two-dimensional image can include translating and rotating the three-dimensional model based on the one or more features.

In any of these embodiments, determining the alignment of a pre-generated three-dimensional model of the at least a portion of the joint with the two-dimensional image can include detecting an edge in the two-dimensional image that is associated with a periphery of bone.

In any of these embodiments, determining the alignment of a pre-generated three-dimensional model of the at least a portion of the joint with the two-dimensional image can include determining a center of a femoral head in the two-dimensional image, determining a centerline of a femoral neck in the two-dimensional image, aligning a center of a model femoral head in the three-dimensional model with the center of the femoral head in the two-dimensional image, and aligning a centerline of a model femoral neck in the three-dimensional model with the centerline of the femoral neck in the two-dimensional image.

In any of these embodiments, the representation of planned bone removal can include at least one of a heat map indicating locations for and amounts of planned bone removal, a contour map indicating locations for and amounts of planned bone removal, and an outline of a planned bone removal area.

In any of these embodiments, the three-dimensional model can include a representation of bone that is outside of the planned bone removal and the representation of bone that is outside of the planned bone removal can be omitted from the overlay.

In any of these embodiments, the method can further include determining a portion of the three-dimensional model associated with bone that has been removed during the surgical procedure and omitting the portion of the three-dimensional model from the overlay. In any of these embodiments, the portion of the three-dimensional model omitted from the overlay can be a portion of a heat map associated with planned bone removal.

In any of these embodiments, the method can further include, after displaying the overlay image, modifying a position of the overlay of at least a portion of the representation of planned bone removal on the two-dimensional image in response to a user input.

In any of these embodiments, the method can further include capturing a new two-dimensional image of the portion of the joint in a new position, determining an updated alignment of the pre-generated three-dimensional model with the new two-dimensional image, generating an updated overlay image based on the determined updated alignment, and displaying the updated overlay image to indicate a progress of bone removal.

In any of these embodiments, the representation of planned bone removal can be three-dimensional and generating the overlay image can comprise projecting the representation of planned bone removal onto a two-dimensional plane.

In any of these embodiments, the representation of planned bone removal can indicate planned bone removal associated with a cam-type femoroacetabular impingement.

In any of these embodiments, the representation of planned bone removal can indicate planned bone removal associated with a pincer-type femoroacetabular impingement.

In any of these embodiments, the representation of planned bone removal can indicate sawing and deforming the tibia to treat deformation of the knee joint during a high tibial osteotomy (HTO).

In any of these embodiments, the representation of planned bone removal can indicate planned drilling during a spinal fusion for the placement of pedicle screws.

In any of these embodiments, the two-dimensional image can be received intra-operatively from an x-ray system, such as a C-arm type fluoroscope.

In any of these embodiments, the three-dimensional model can be based on imaging data from an imaging system of a first type and the two-dimensional image can be received from an imaging system of a second type that is different than the first type. In any of these embodiments, the imaging system of the first type can be an MRI system or a CT system and the imaging system of the second type can be a C-arm type fluoroscope.

According to some embodiments, a system for guiding bone removal during a surgical procedure can comprise one or more processors, memory, and one or more programs, wherein the one or more programs are stored in the memory and configured to be executed by the one or more processors, the one or more programs including instructions for receiving a two-dimensional image of at least a portion of a joint during the surgical procedure, determining an alignment of a pre-generated three-dimensional model of the at least a portion of the joint with the two-dimensional image based on one or more features in the two-dimensional image that are associated with the at least a portion of the joint, wherein the pre-generated three-dimensional model comprises a representation of planned bone removal, generating an overlay image based on the determined alignment, the overlay image comprising an overlay of at least a portion of the representation of planned bone removal on the two-dimensional image, and transmitting the overlay image to a display for guiding bone removal during the surgical procedure.

In any of these embodiments, the system can be configured for communicatively connecting to an intra-operative imaging system that generates the two-dimensional image.

In any of these embodiments, the one or more programs can include instructions for receiving a user input for repositioning the overlay of the at least a portion of the representation of planned bone removal on the two-dimensional image.

In any of these embodiments, the system can include a touch screen display or augmented reality system for displaying the two-dimensional image and receiving the user input.

In any of these embodiments, the three-dimensional model can be pre-generated based on one or more scans of the joint.

In any of these embodiments, the one or more features can be associated with at least one of a center of a femoral head, a centerline of a femoral neck, and a perimeter of the femoral head.

In any of these embodiments, determining the alignment of a pre-generated three-dimensional model of the at least a portion of the joint with the two-dimensional image can include translating and rotating the three-dimensional model based on the one or more features.

In any of these embodiments, determining the alignment of a pre-generated three-dimensional model of the at least a portion of the joint with the two-dimensional image can include detecting an edge in the two-dimensional image that is associated with a periphery of bone.

In any of these embodiments, determining the alignment of a pre-generated three-dimensional model of the at least a portion of the joint with the two-dimensional image can include determining a center of a femoral head in the two-dimensional image, determining a centerline of a femoral neck in the two-dimensional image, aligning a center of a model femoral head in the three-dimensional model with the center of the femoral head in the two-dimensional image, and aligning a centerline of a model femoral neck in the three-dimensional model with the centerline of the femoral neck in the two-dimensional image.

In any of these embodiments, the representation of planned bone removal can include at least one of a heat map indicating locations for and amounts of planned bone removal, a contour map indicating locations for and amounts of planned bone removal, and an outline of a planned bone removal area.

In any of these embodiments, the three-dimensional model can include a representation of bone that is outside of the planned bone removal and the representation of bone that is outside of the planned bone removal can be omitted from the overlay.

In any of these embodiments, the one or more programs can include instructions for determining a portion of the three-dimensional model associated with bone that has been removed during the surgical procedure and omitting the portion of the three-dimensional model from the overlay. In any of these embodiments, the portion of the three-dimensional model omitted from the overlay can be a portion of a heat map associated with planned bone removal.

In any of these embodiments, the one or more programs can include instructions for, after displaying the overlay image, modifying a position of the overlay of at least a portion of the representation of planned bone removal on the two-dimensional image in response to a user input In any of these embodiments, the one or more programs can include instructions for capturing a new two-dimensional image of the portion of the joint in a new position, determining an updated alignment of the pre-generated three-dimensional model with the new two-dimensional image, generating an updated overlay image based on the determined updated alignment, and displaying the updated overlay image to indicate a progress of bone removal.

In any of these embodiments, the representation of planned bone removal can be three-dimensional and generating the overlay image comprises projecting the representation of planned bone removal onto a two-dimensional plane.

In any of these embodiments, the representation of planned bone removal can indicate planned bone removal associated with a cam-type femoroacetabular impingement.

In any of these embodiments, the representation of planned bone removal can indicate planned bone removal associated with a pincer-type femoroacetabular impingement.

In any of these embodiments, the two-dimensional image can be received intra-operatively from an x-ray system.

In any of these embodiments, the three-dimensional model can be based on imaging data from an imaging system of a first type and the two-dimensional image can be received from an imaging system of a second type that is different than the first type. In any of these embodiments, the imaging system of the first type can be an MRI system or a CT system and the imaging system of the second type can be a C-arm x-ray system.

According to some embodiments, a non-transitory computer readable medium stores instructions for execution by one or more processors of an imaging system for performing any of the above methods.

According to some embodiments, a computer program product includes computer implementable instructions which when implemented by a programmable computer cause the computer to perform any of the method above.

BRIEF DESCRIPTION OF THE DRAWINGS

The invention will now be described, by way of example only, with reference to the accompanying drawings, in which.

DETAILED DESCRIPTION

Figure 1A:
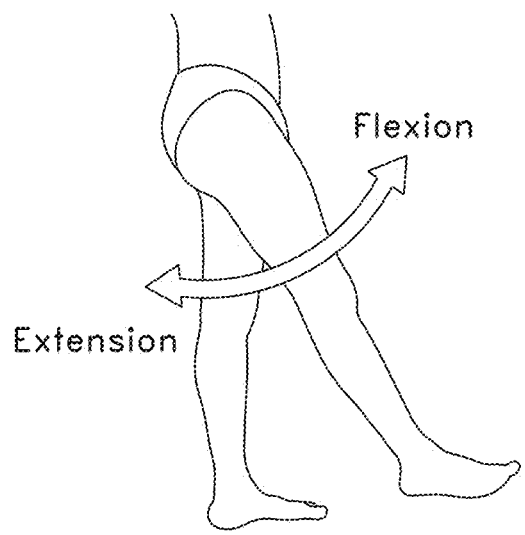
FIGS. 1A-1D are schematic views showing various aspects of, for example, hip motion.
Figure 1B:
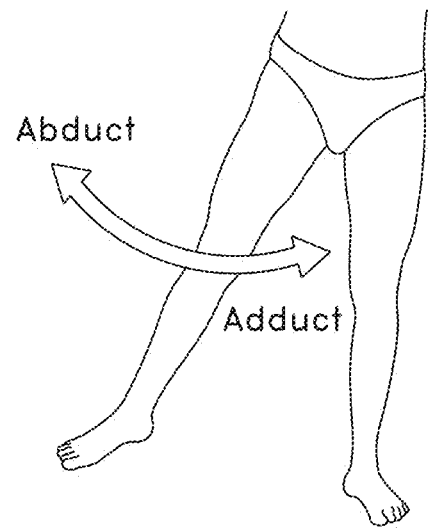
Figure 1C:
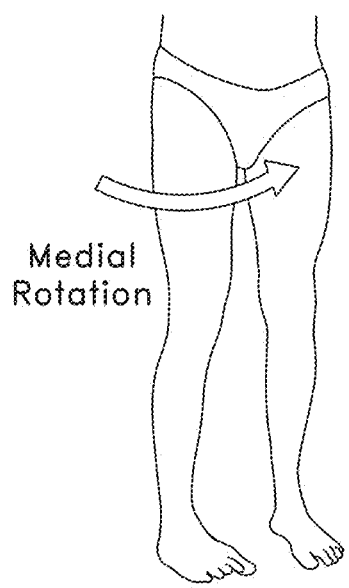
Figure 1D:
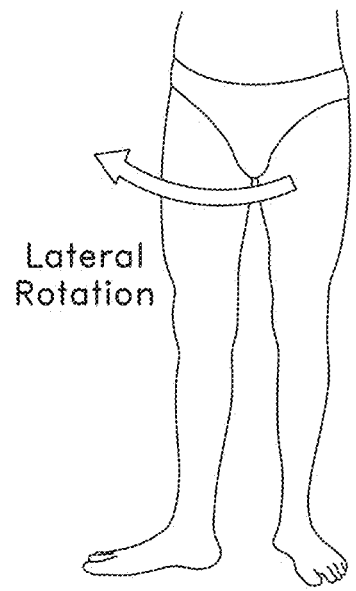

Reference will now be made in detail to implementations and embodiments of various aspects and variations of the invention, examples of which are illustrated in the accompanying drawings. Various devices, systems, and methods are described herein. Although at least two variations of the devices, systems, and methods are described, other variations may include aspects of the devices, systems, and methods described herein combined in any suitable manner having combinations of all or some of the aspects described. Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

According to various embodiments, systems and methods according to the principles described herein can provide visualizations of planned bone removal during a surgical procedure on a joint. The visualization of planned bone removal can indicate at least one three-dimensional region of a joint that deviates from a baseline joint morphology for guiding a surgeon in the surgical treatment of the region. The visualization of planned bone removal can be overlaid on a two-dimensional image of the bone captured intra-operatively so that the surgeon can visualize the planned bone removal relative to the intra-operative state of the bone.

The visualization of planned bone removal can be extracted from a three-dimensional model of the joint of a subject that is generated pre-operatively from one or more scans of the subject. The visualization of planned bone removal can be associated with deviations of a modeled joint from baseline joint morphology identified by comparing the three-dimensional model to baseline data that represents target joint morphology. The visualization can be overlaid on an intra-operatively generated two-dimensional image of the joint by determining an alignment of the three-dimensional model with the two-dimensional image, as discussed further below.

As used herein, "bone removal" encompasses any method of resecting bone, including drilling, sawing, burring, and bone removal using an osteotome.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to devices or systems for performing the operations herein. The devices or systems may be specially constructed for the required purposes, may comprise a general purpose computer selectively activated or reconfigured by a computer program stored in the computer, or may include any combination thereof. Computer instructions for performing the operations herein can be stored in any combination of non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus. One or more instructions for performing the operations herein may be implemented in or executed by one or more Application Specific Integrated Circuits (ASICs), Field Programmable Gate Arrays (FPGAs), Digital Signal Processing units (DSPs), Graphics Processing Units (GPUs), or Central Processing Units (CPUs). Furthermore, the computers referred to herein may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Although the following examples often refer to hip joints, hip joint pathologies, and hip joint characteristics and measurements, it is to be understood that the systems, methods, techniques, visualizations, etc., described herein according to various embodiments, can be used for analyzing and visualizing other joints, including knees, shoulders, elbows, the spine, the ankle, etc.

According to some embodiments, a physician can be provided with improved guidance with respect to the extent of a deviation of a joint morphology from a target morphology, and how much bone should be removed to achieve the target morphology, for example, during a minimally-invasive arthroscopic procedure or open surgical procedure. According to some embodiments, visualizations can provide a physician with improved guidance with respect to morphology measurements for a hip joint, including the Alpha Angle, Lateral Center Edge Angle, Acetabular Version and Femoral Torsion, Tönnis angle, neck shaft angle, and acetabular coverage that can help a practitioner gauge a deviation of the subject morphology from a target morphology.

Target joint morphology can be any joint morphology that may be desired for a given subject. Target joint morphology can be based on the anatomy representative of any reference patient population, such as a normal patient population. For example, baseline data can be a model of a "normal" joint that is derived from studies of a healthy patient population and/or from a model generated based on measurements, computer simulations, calculations, etc. The terms target, baseline, and reference are used interchangeably herein to describe joint morphology characteristics against which a subject's joint morphology is compared.

A better understanding of various joint pathologies, and the advantages provided according to various embodiments described herein, can be gained from a more precise understanding of the anatomy of the joint. The hip joint is formed at the junction of the femur and the hip. The hip joint is a ball-and-socket joint, and is capable of a wide range of different motions, e.g., flexion and extension, abduction and adduction, internal and external rotation, etc., as illustrated in FIGS. 1A-1D. With the possible exception of the shoulder joint, the hip joint is perhaps the most mobile joint in the body. The hip joint carries substantial weight loads during most of the day, in both static (e.g., standing and sitting) and dynamic (e.g., walking and running) conditions.

Figure 2:
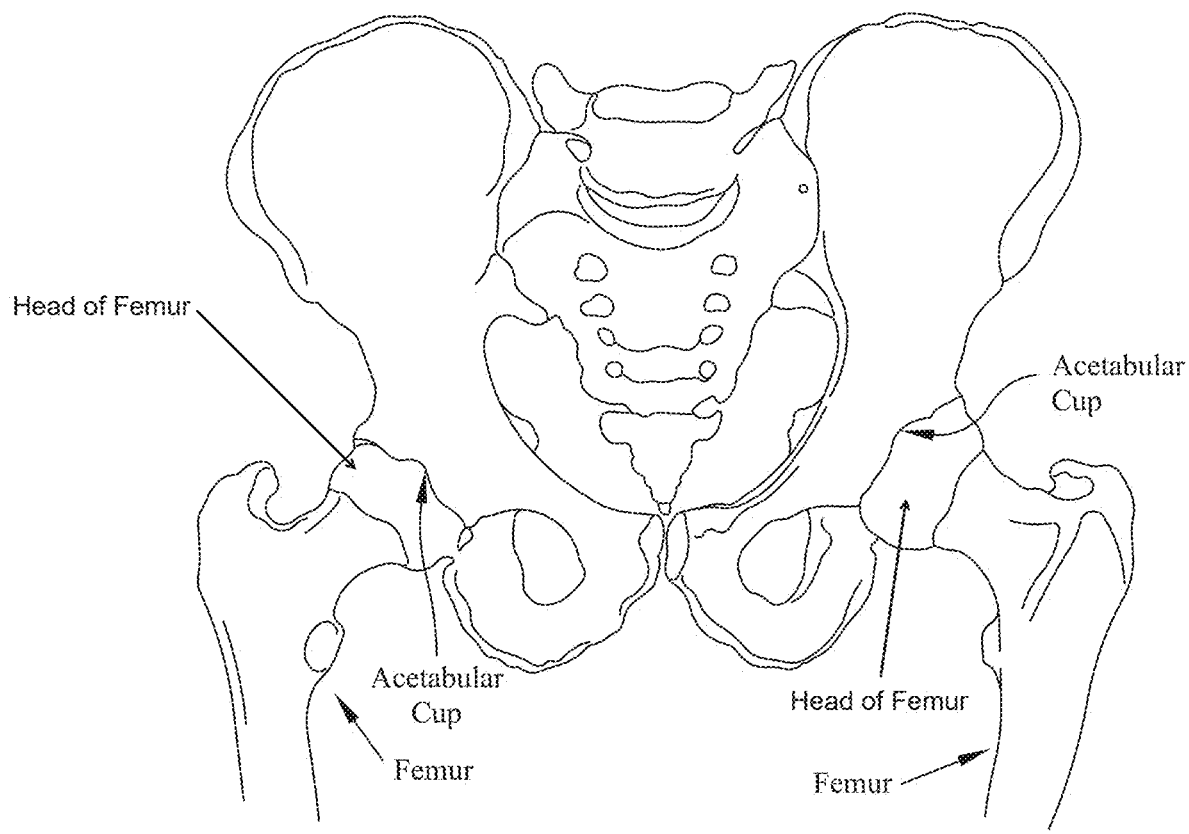
FIG. 2 is a schematic view showing bone structures in the region of the hip joint.
Figure 3:
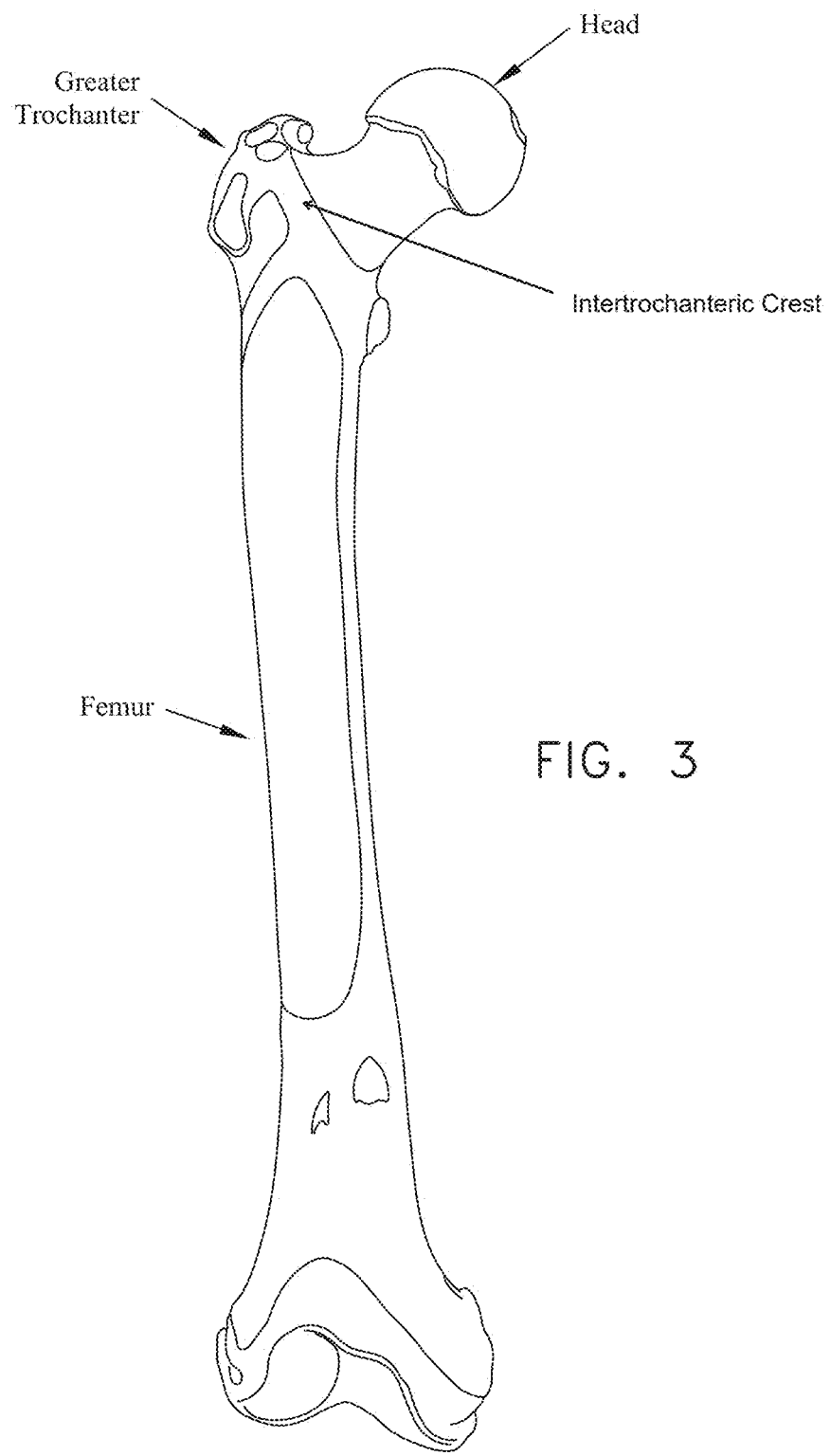
FIG. 3 is a schematic anterior view of the femur.
Figure 4:
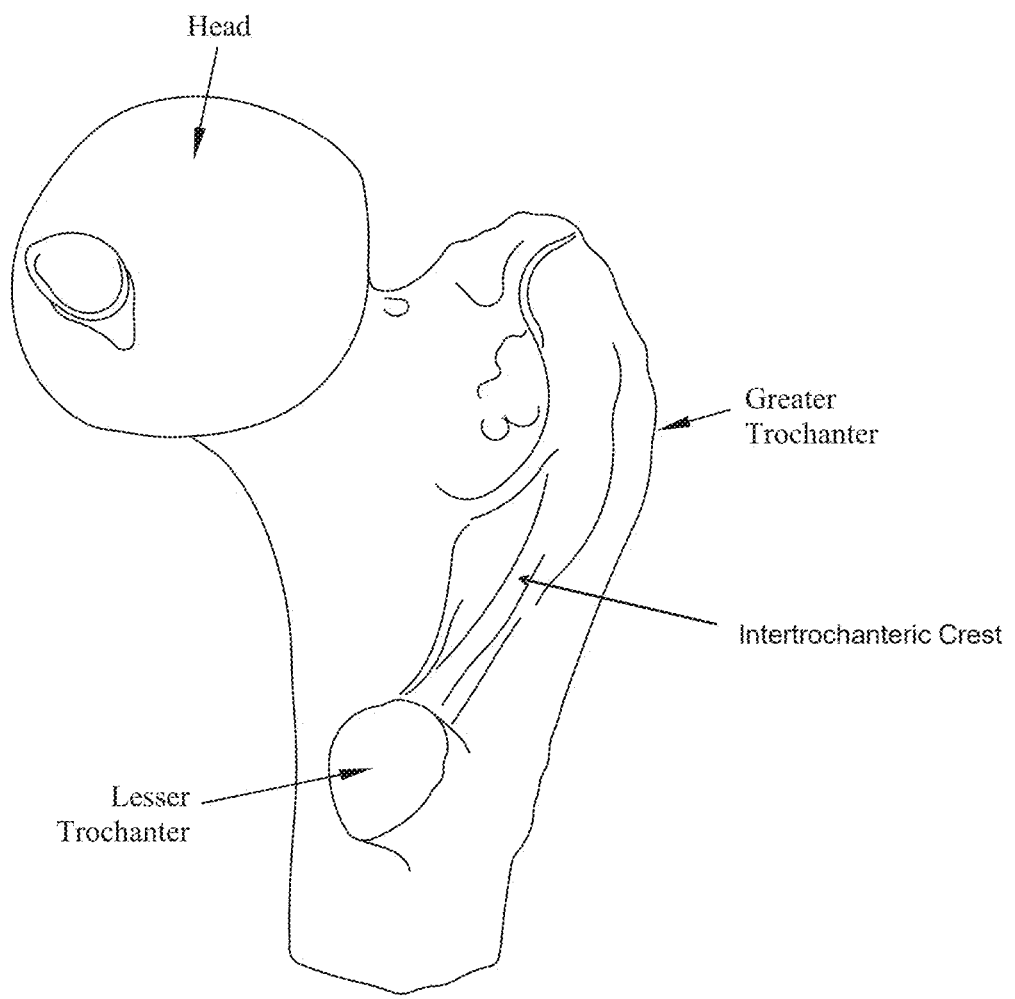
FIG. 4 is a schematic posterior view of the top end of the femur.

More particularly, and with reference to FIG. 2, the ball of the femur is received in the acetabular cup of the hip, with a plurality of ligaments and other soft tissue serving to hold the bones in articulating condition. As is illustrated in FIG. 3, the femur is generally characterized by an elongated body terminating, at its top end, in an angled neck which supports a hemispherical head (also sometimes referred to as the ball). As is illustrated in FIGS. 3 and 4, a large projection known as the greater trochanter protrudes laterally and posteriorly from the elongated body adjacent to the neck. A second, somewhat smaller projection known as the lesser trochanter protrudes medially and posteriorly from the elongated body adjacent to the neck. An intertrochanteric crest extends along the periphery of the femur, between the greater trochanter and the lesser trochanter.

Figure 5:
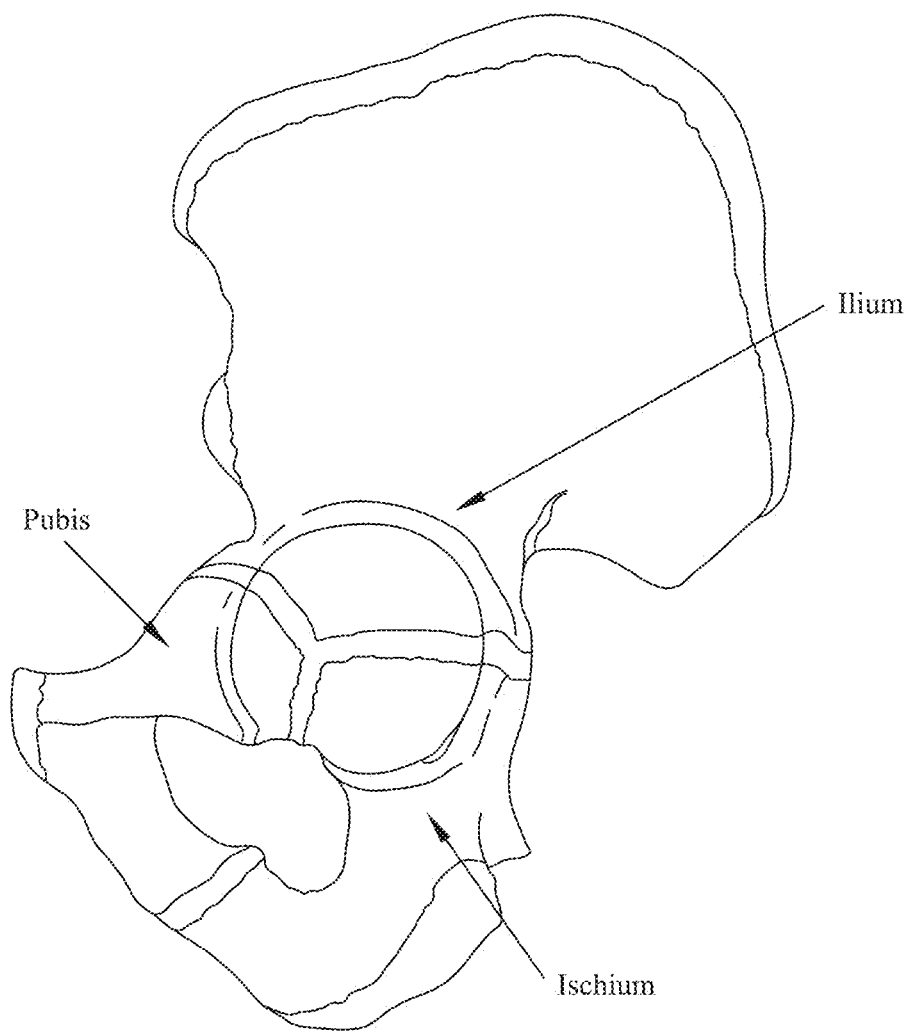
FIG. 5 is a schematic view of the pelvis.

Referring to FIG. 5, the pelvis is made up of three constituent bones: the ilium, the ischium and the pubis. These three bones cooperate with one another (they typically ossify into a single "hip bone" structure by the age of 25) so as to form the acetabular cup. The acetabular cup receives the head of the femur.

Figure 6:
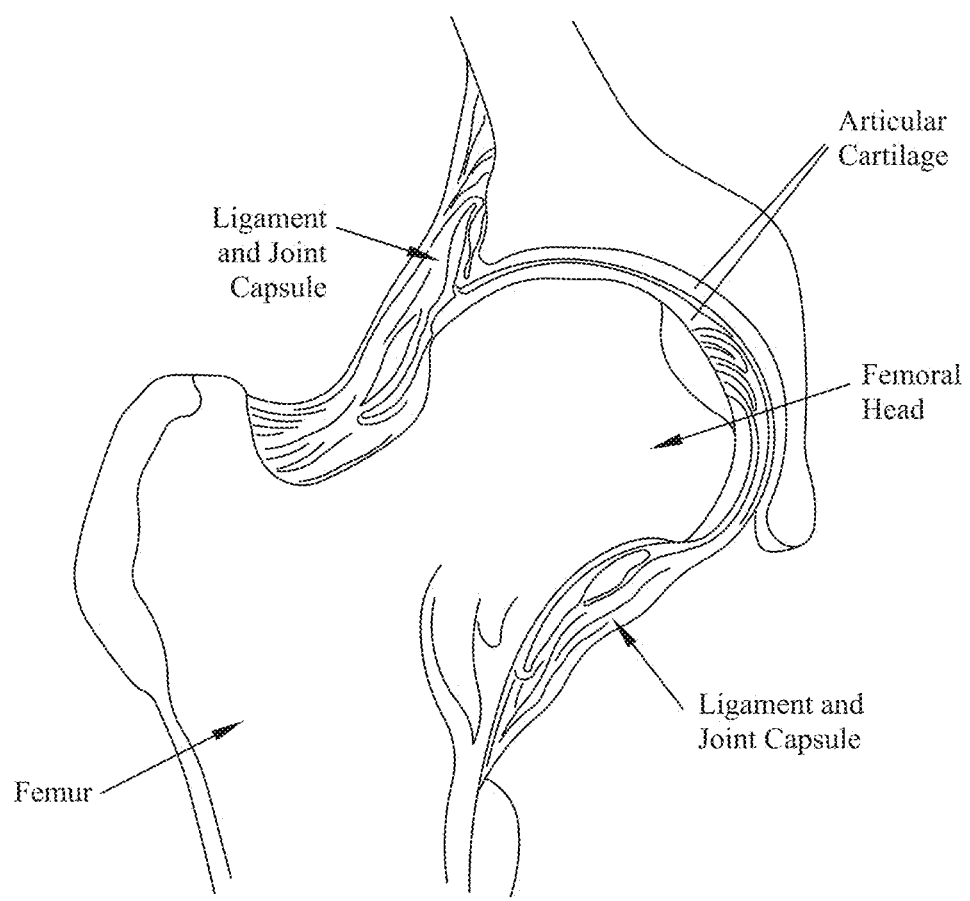
FIGS. 6-12 are schematic views showing bone and soft tissue structures in the region of the hip joint.
Figure 7:
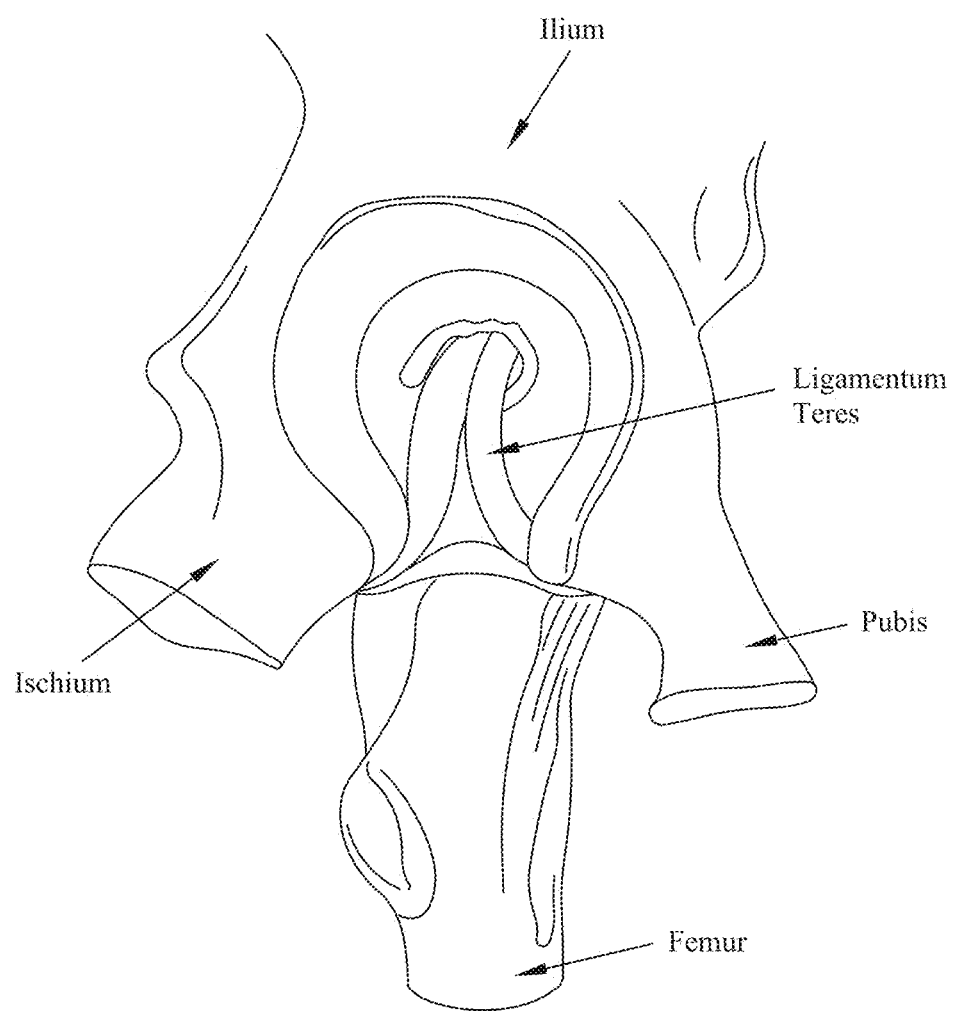
Figure 8:
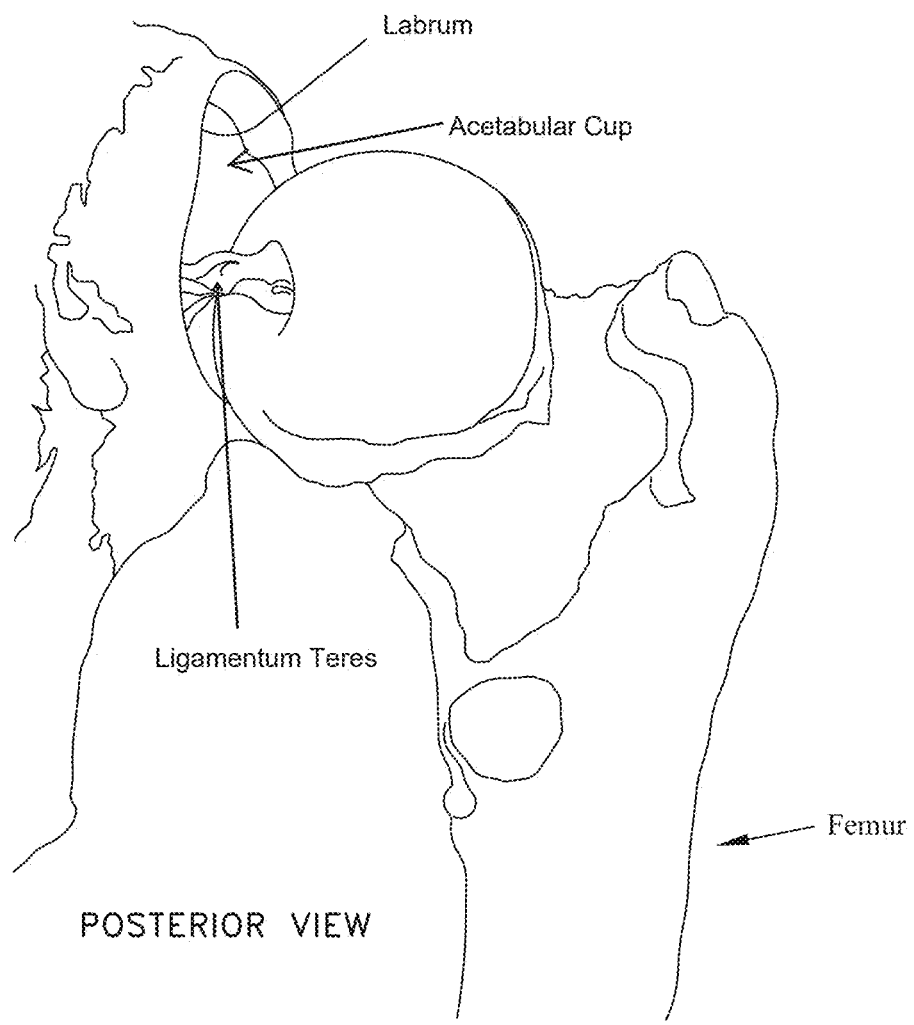
Figure 9:
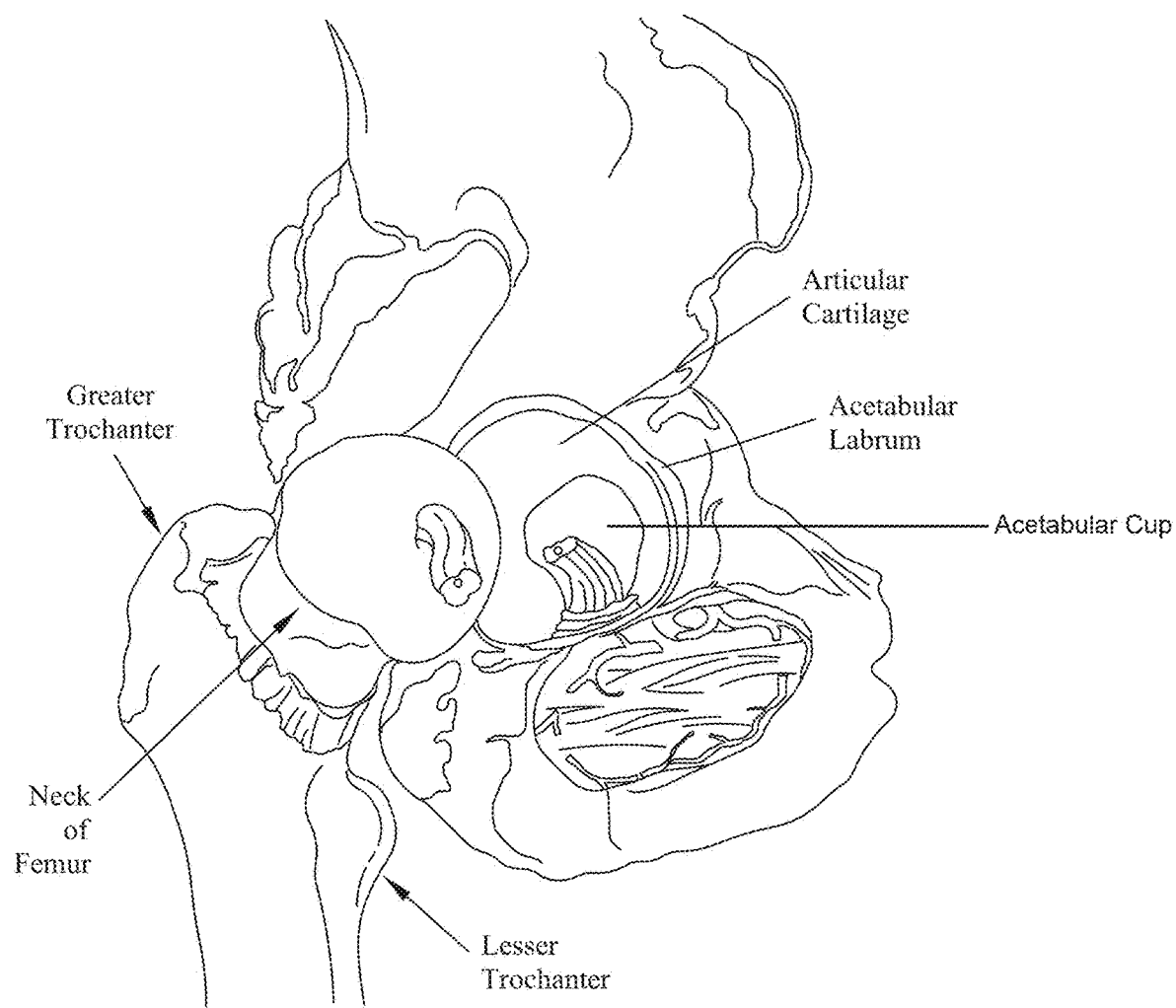
Figure 10:
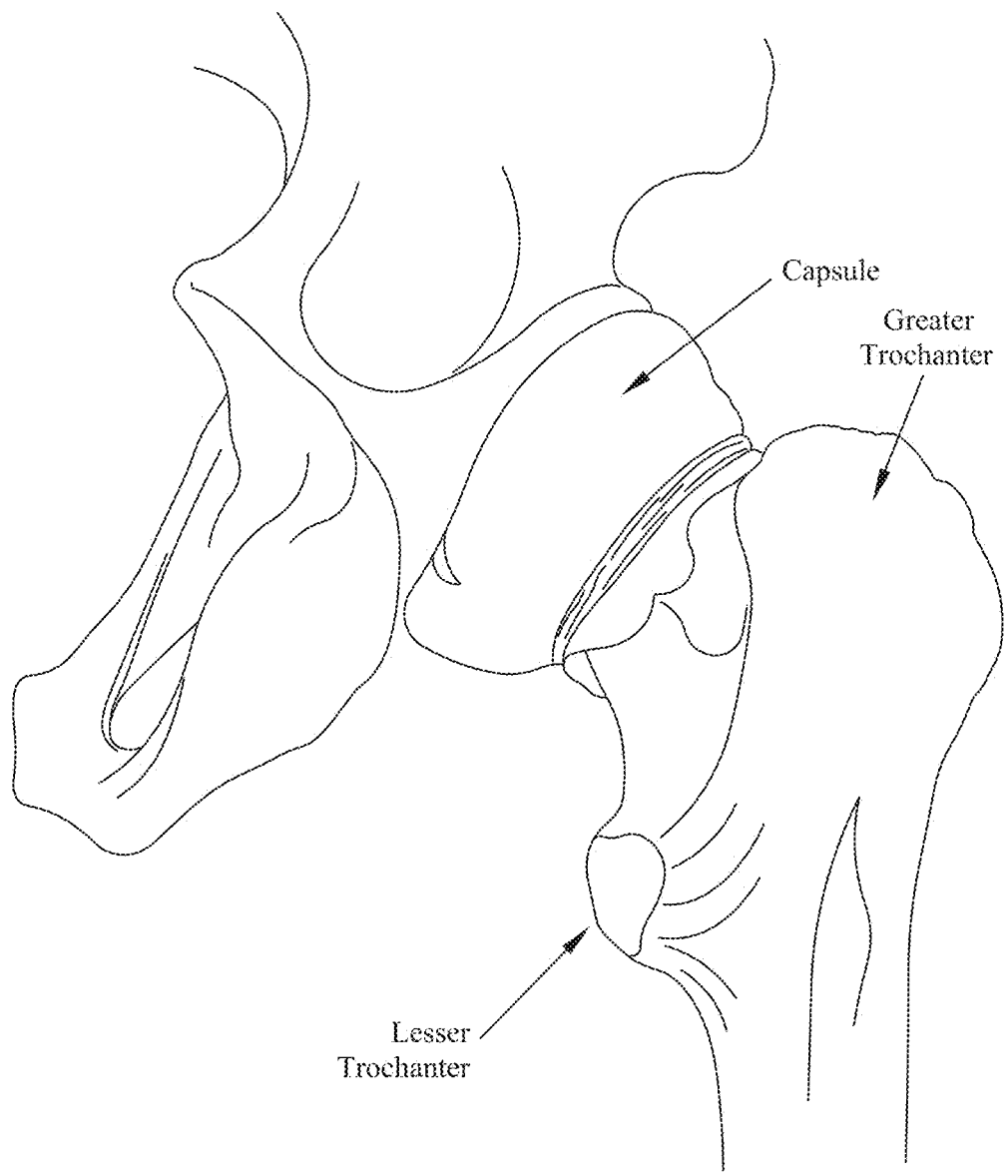
Figure 11:
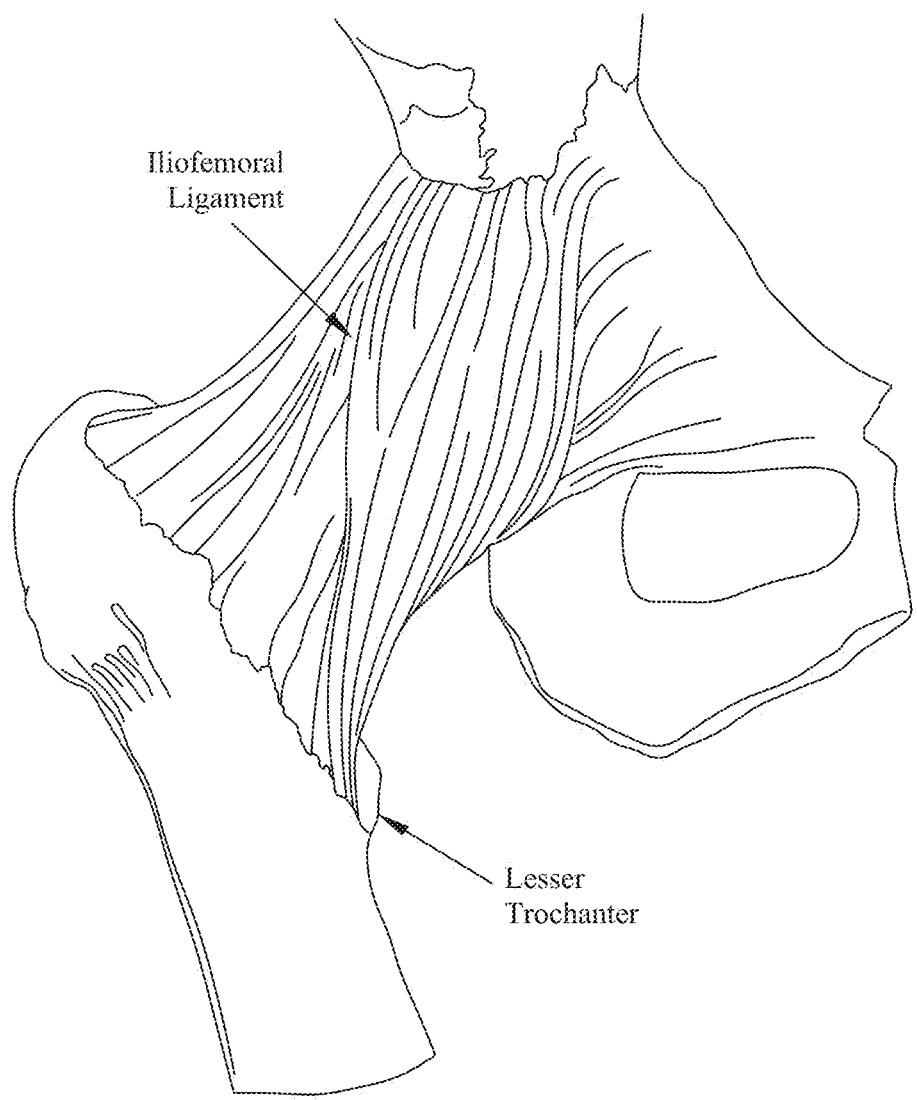
Figure 12:
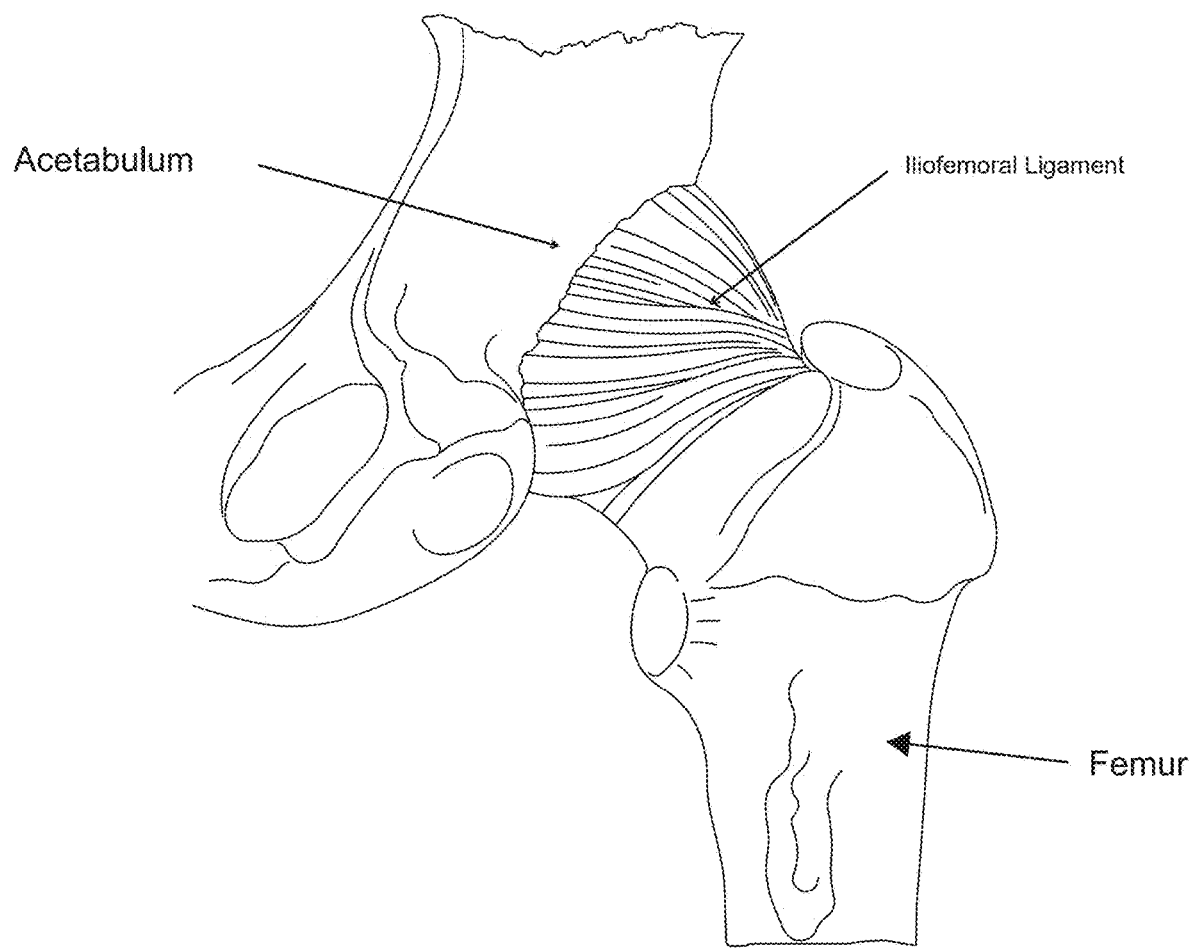

Both the head of the femur and the acetabular cup are covered with a layer of articular cartilage which protects the underlying bone and facilitates motion (see FIG. 6). Various ligaments and soft tissue serve to hold the ball of the femur in place within the acetabular cup. More particularly, and with reference to FIGS. 7 and 8, the ligamentum teres extends between the ball of the femur and the base of the acetabular cup. Referring to FIG. 9, a labrum is disposed about the perimeter of the acetabular cup. The labrum serves to increase the depth of the acetabular cup and effectively establishes a suction seal between the ball of the femur and the rim of the acetabular cup, thereby helping to hold the head of the femur in the acetabular cup. In addition, and with reference to FIG. 10, a fibrous capsule extends between the neck of the femur and the rim of the acetabular cup, effectively sealing off the ball-and-socket members of the hip joint from the remainder of the body. The foregoing structures are encompassed and reinforced by a set of three main ligaments (i.e., the iliofemoral ligament, the ischiofemoral ligament and the pubofemoral ligament) which extend between the femur and the hip (see FIGS. 11 and 12).

Figure 13:
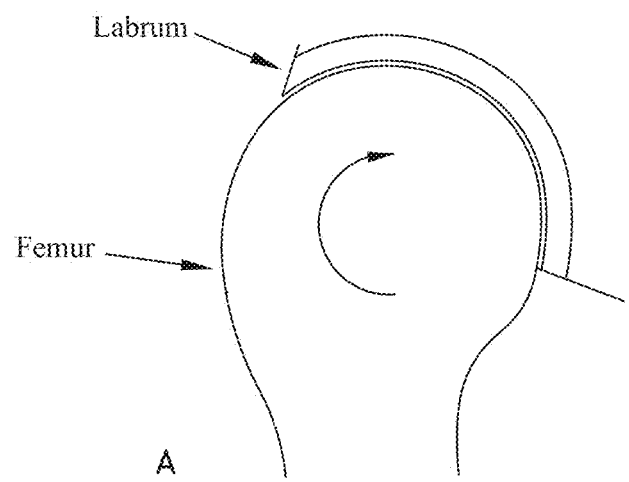
FIG. 13 is a schematic view showing cam-type femoroacetabular impingement (i.e., cam-type FAI)
Figure 13:
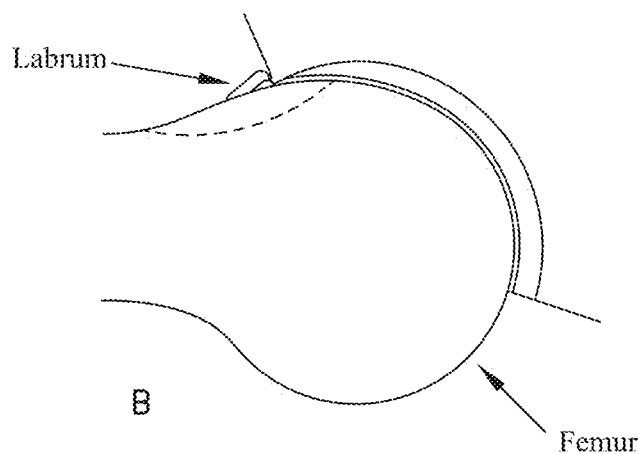
Figure 14:
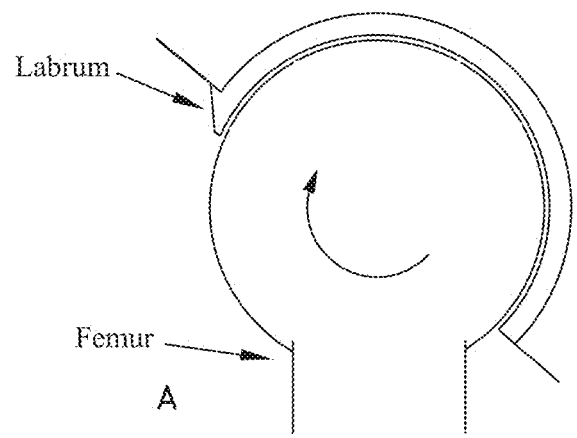
FIG. 14 is a schematic view showing pincer-type femoroacetabular impingement (i.e., pincer-type FAI)
Figure 14:
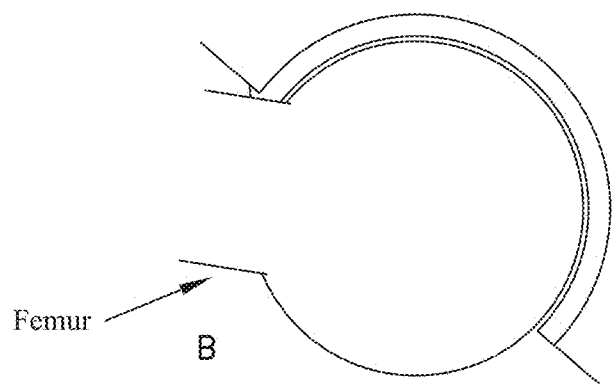

The hip joint is susceptible to a number of different pathologies. These pathologies can have, for example, both congenital and injury-related origins. For example, a congenital pathology of the hip joint involves impingement between the neck of the femur and the rim of the acetabular cup. In some cases, and with reference to FIG. 13, this impingement can occur due to irregularities in the geometry of the femur. This type of impingement is sometimes referred to as a cam-type femoroacetabular impingement (i.e., a cam-type FAI). In other cases, and with reference to FIG. 14, the impingement can occur due to irregularities in the geometry of the acetabular cup. This latter type of impingement is sometimes referred to as a pincer-type femoroacetabular impingement (i.e., a pincer-type FAI). Impingement can result in a reduced range of motion, substantial pain and, in some cases, significant deterioration of the hip joint.

Another example of congenital pathology of the hip joint involves defects in the articular surface of the ball and/or the articular surface of the acetabular cup. Defects of this type sometimes start out fairly small but often increase in size over time, generally due to the dynamic nature of the hip joint and also due to the weight-bearing nature of the hip joint. Articular defects can result in substantial pain, induce or exacerbate arthritic conditions and, in some cases, cause significant deterioration of the hip joint.

Figure 15:
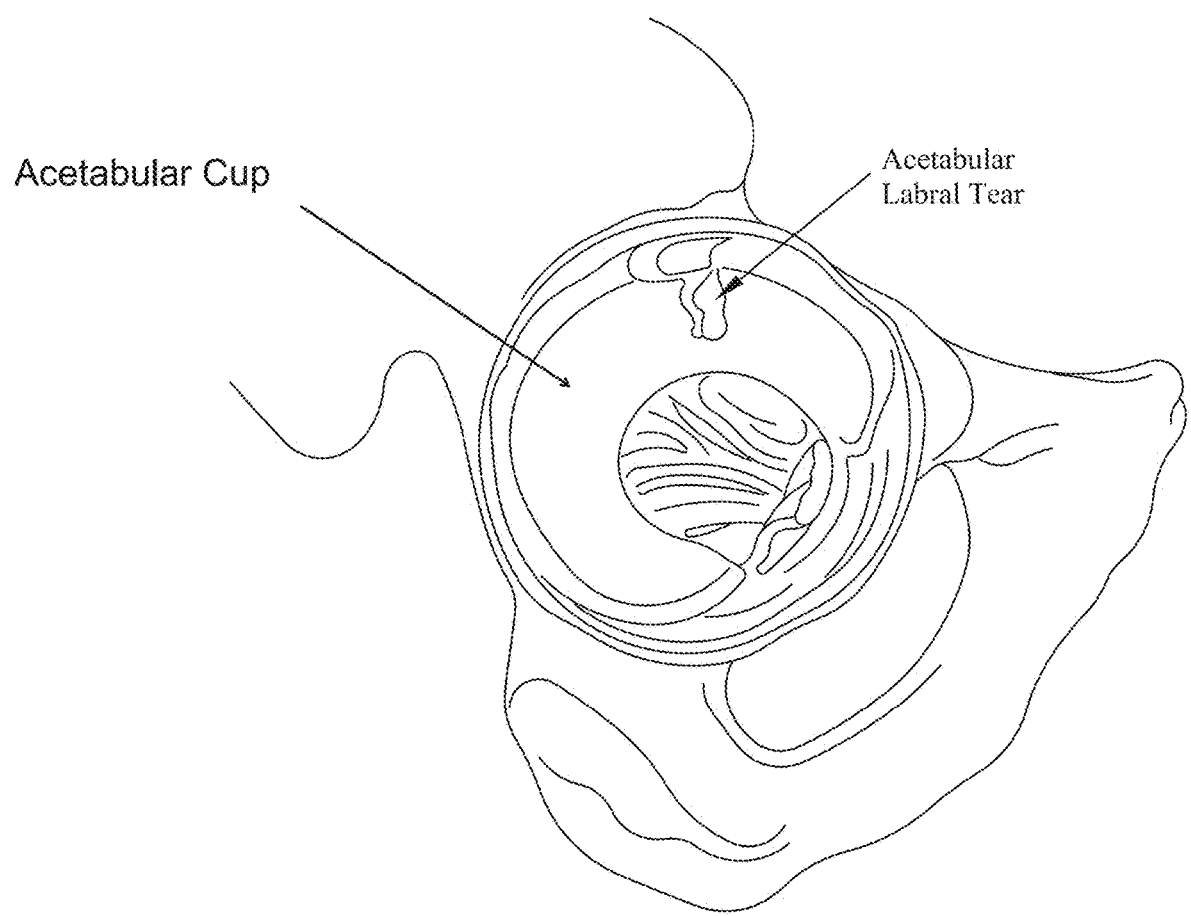
FIG. 15 is a schematic view showing a labral tear.

An example of injury-related pathology of the hip joint involves trauma to the labrum. In many cases, an accident or a sports-related injury can result in the labrum being torn, typically with a tear running through the body of the labrum (e.g., see FIG. 15). These types of injuries can be painful for the patient and, if left untreated, can lead to substantial deterioration of the hip joint.

The current trend in orthopedic surgery is to treat joint pathologies using minimally-invasive techniques. For example, it is common to re-attach ligaments in the shoulder joint using minimally-invasive, "keyhole" techniques which do not require "laying open" the capsule of the shoulder joint. Furthermore, it is common to repair, for example, torn meniscal cartilage in the knee joint, and/or to replace ruptured ACL ligaments in the knee joint, using minimally-invasive techniques. While such minimally-invasive approaches can require additional training on the part of the surgeon, such procedures generally offer substantial advantages for the patient and have now become the standard of care for many shoulder joint and knee joint pathologies.

In addition to the foregoing, due to the widespread availability of minimally-invasive approaches for treating pathologies of the shoulder joint and knee joint, the current trend is to provide such treatment much earlier in the lifecycle of the pathology, so as to address patient pain as soon as possible and so as to minimize any exacerbation of the pathology itself. This is in marked contrast to traditional surgical practices, which have generally dictated postponing surgical procedures as long as possible so as to spare the patient from the substantial trauma generally associated with invasive surgery.

Minimally-invasive treatments for pathologies of the hip joint have lagged behind minimally-invasive treatments for pathologies of the shoulder joint and knee joint. This may be, for example, due to (i) the geometry of the hip joint itself, and (ii) the nature of the pathologies which must typically be addressed in the hip joint.

The hip joint is generally considered to be a "tight" joint, in the sense that there is relatively little room to maneuver within the confines of the joint itself. This is in contrast to the knee joint, which is generally considered to be relatively spacious when compared to the hip joint. As a result, it is relatively more challenging for surgeons to perform minimally-invasive procedures on the hip joint.

Furthermore, the natural pathways for entering the interior of the hip joint (i.e., the pathways which naturally exist between adjacent bones) are generally much more constraining for the hip joint than for the shoulder joint or the knee joint. This limited access further complicates effectively performing minimally-invasive procedures on the hip joint.

In addition to the foregoing, the nature and location of the pathologies (e.g., conditions or disorders, which may cause deviation from the baseline anatomy of the joint) of the hip joint also complicate performing minimally-invasive procedures. For example, in the case of a typical tear of the labrum in the hip joint, instruments must generally be introduced into the joint space using a line of approach which is set, in some locations, at an angle of 25 degrees or more to the line of repair. This makes drilling into bone, for example, much more complex than where the line of approach is effectively aligned with the line of repair, such as is frequently the case in the shoulder joint. Furthermore, the working space within the hip joint is typically extremely limited, further complicating repairs where the line of approach is not aligned with the line of repair.

As a result of the foregoing, minimally-invasive hip joint procedures continue to be relatively difficult, and patients must frequently manage their hip joint pathologies for as long as possible, until a partial or total hip replacement can no longer be avoided, whereupon the procedure is generally done as a highly-invasive, open procedure, with all of the disadvantages associated with highly-invasive, open procedures.

As noted above, hip arthroscopy is becoming increasingly more common in the diagnosis and treatment of various hip pathologies. However, due to the anatomy of the hip joint and the pathologies associated with the same, hip arthroscopy appears to be currently practical for only selected pathologies and, even then, hip arthroscopy has generally met with limited success.

One procedure which is sometimes attempted arthroscopically relates to femoral debridement for treatment of cam-type femoroacetabular impingement (i.e., cam-type FAI). More particularly, with cam-type femoroacetabular impingement, irregularities in the geometry of the femur can lead to impingement between the femur and the rim of the acetabular cup. Treatment for cam-type femoroacetabular impingement typically involves debriding the femoral neck and/or head, using instruments such as burrs and osteotomes, to remove the bony deformities causing the impingement. It is important to debride the femur carefully, since only bone which does not conform to the desired geometry should be removed, in order to ensure positive results as well as to minimize the possibility of bone fracture after treatment. For this reason, when debridement is performed as an open surgical procedure, surgeons generally use debridement templates having a pre-shaped curvature to guide them in removing the appropriate amount of bone from the femur.

However, when the debridement procedure is attempted arthroscopically, conventional debridement templates with their pre-shaped curvature cannot be passed through the narrow keyhole incisions, and hence debridement templates are generally not available to guide the surgeon in reshaping the bone surface. As a result, the debridement must generally be effected "freehand." In addition to the foregoing, the view of the cam pathology is also generally limited. Primarily, the surgeon uses a scope and camera to view the resection area, but the scope image has a limited field of view and is somewhat distorted. Also, because the scope is placed close to the bone surface, the surgeon cannot view the entire pathology "all at once." Secondarily, the surgeon also utilizes a fluoroscope to take X-ray images of the anatomy. These X-ray images supplement the arthroscopic view from the scope, but it is still limited to a two-dimensional representation of the three-dimensional cam pathology.

As a result of the foregoing, it is generally quite difficult for the surgeon to determine exactly how much bone should be removed, and whether the shape of the remaining bone has the desired geometry. In practice, surgeons tend to err on the side of caution and remove less bone. Significantly, under-resection of the cam pathology is the leading cause of revision hip arthroscopy.

An example of another procedure which is sometimes attempted arthroscopically relates to treatment of pincer-type femoroacetabular impingement (i.e., pincer-type FAI). More particularly, with pincer-type femoroacetabular impingement, irregularities in the geometry of the acetabulum can lead to impingement between the femur and the rim of the acetabular cup. Treatment for pincer-type femoroacetabular impingement typically involves debriding the rim of the acetabular cup using instruments such as burrs and osteotomes to remove the bony deformities causing the impingement. In some cases, the labrum is released from the acetabular bone so as to expose the underlying rim of the acetabular cup prior to debriding the rim of the acetabular cup, and then the labrum is reattached to the debrided rim of the acetabular cup. It is important to debride the rim of the acetabular cup carefully, since only bone which does not conform to the desired geometry should be removed, in order to alleviate impingement while minimizing the possibility of removing too much bone from the rim of the acetabular cup, which could cause joint instability.

However, when the debridement procedure is attempted arthroscopically, the debridement must generally be effected freehand. In this setting, it is generally quite difficult for the surgeon to determine exactly how much bone should be removed, and whether the remaining bone has the desired geometry. In practice, surgeons tend to err on the side of caution and remove less bone. Significantly, under-resection of the pincer pathology may necessitate revision hip arthroscopy.

Two common anatomical measurements used in diagnosing femoroacetabular impingement (FAI) are the Alpha Angle (FIG. 16) for cam-type impingement and the Center Edge Angle (FIG. 17) for pincer-type impingement. These measurements are typically measured from pre-operative images (e.g., pre-operative X-ray images). These measurements are used to determine the degree to which the patient's hip anatomy deviates from normal (e.g., baseline), healthy hip anatomy.

For example, a healthy hip typically has an Alpha Angle of anywhere from less than approximately 42 degrees to approximately 50 degrees; thus, a patient with an Alpha Angle of greater than approximately 42 degrees to approximately 50 degrees may be a candidate for FAI surgery. These are merely exemplary Alpha Angle ranges and do not limit the systems and methods herein to any particular range of Alpha Angles. During an initial examination of a patient, the surgeon will typically take an X-ray of the patient's hip. If the patient has an initial diagnosis of FAI, the patient may also obtain an MRI or CT scan of their hip for further evaluation of the bony pathology causing the FAI.

Most of today's imaging techniques (e.g., X-ray, CT, MRI) are digital, and hence the images can be imported into, and manipulated by, computer software. Using the imported digital images, the surgeon is able to measure the Alpha Angle (and/or the Center Edge Angle). For example, the surgeon imports the digital image into one of the many available software programs that use the DICOM (Digital Imaging and Communications in Medicine) standard for medical imaging. In order to make the Alpha Angle (or the Center Edge Angle) measurements with the digital image, the surgeon must first manually create and overlay geometric shapes onto the digital medical image.

Figure 16:
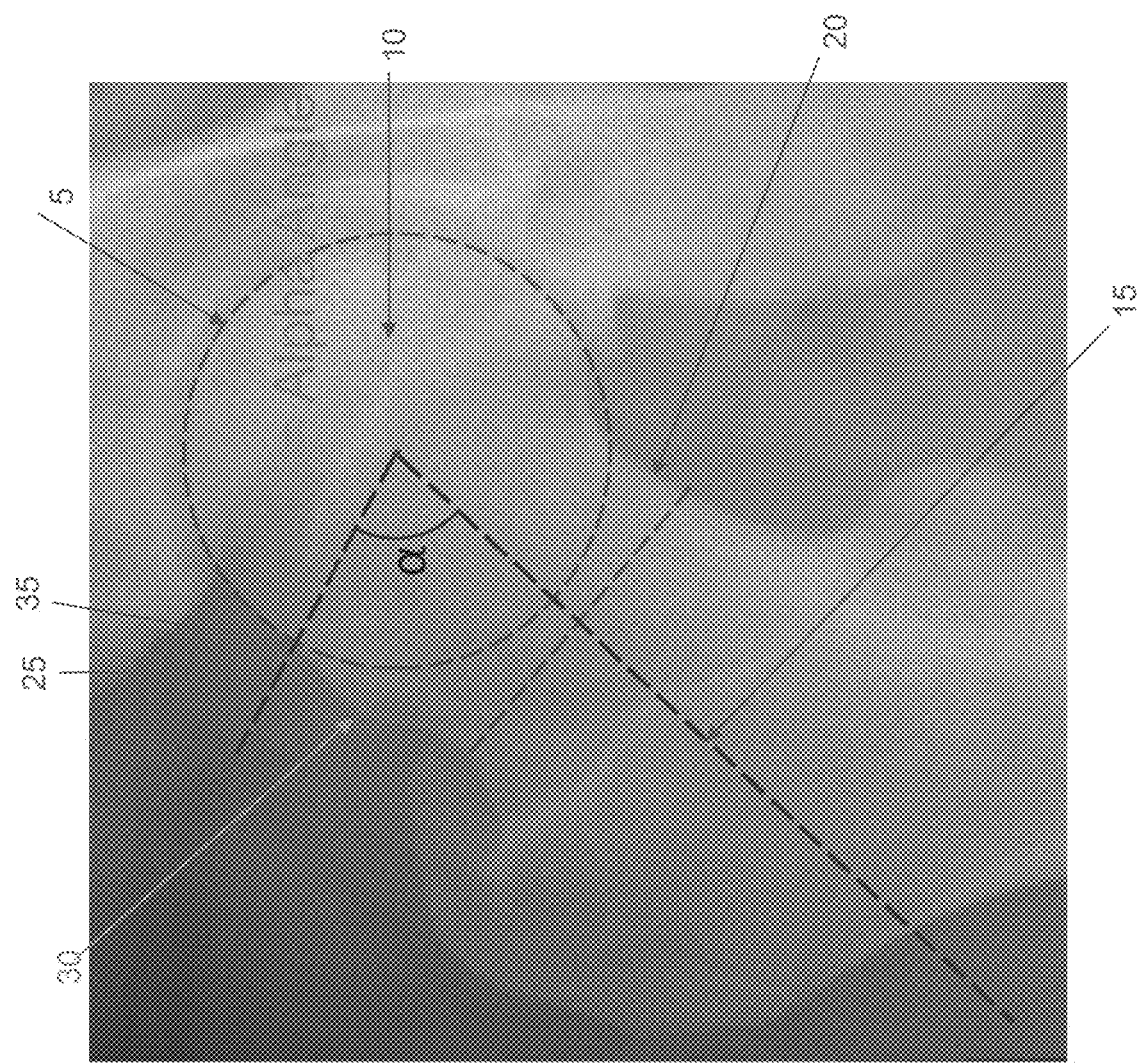
FIG. 16 is a schematic view showing an Alpha Angle determination on the hip of a patient.

For example, and with reference to FIG. 16, to measure the Alpha Angle, the surgeon manually creates a circle 5 and places it over the femoral head 10, and then manually sizes the circle such that the edge of the circle matches the edge of the femoral head. The surgeon then manually creates a line 15 and places it along the mid-line of the femoral neck 20. The surgeon then manually draws a second line 25 which originates at the center of the femoral head and passes through the location which signifies the start of the cam pathology 30 (i.e., the location where the bone first extends outside the circle set around the femoral head). The surgeon then manually selects the two lines and instructs the software to calculate the angle between the two lines; the result is the Alpha Angle 35.

Figure 17:
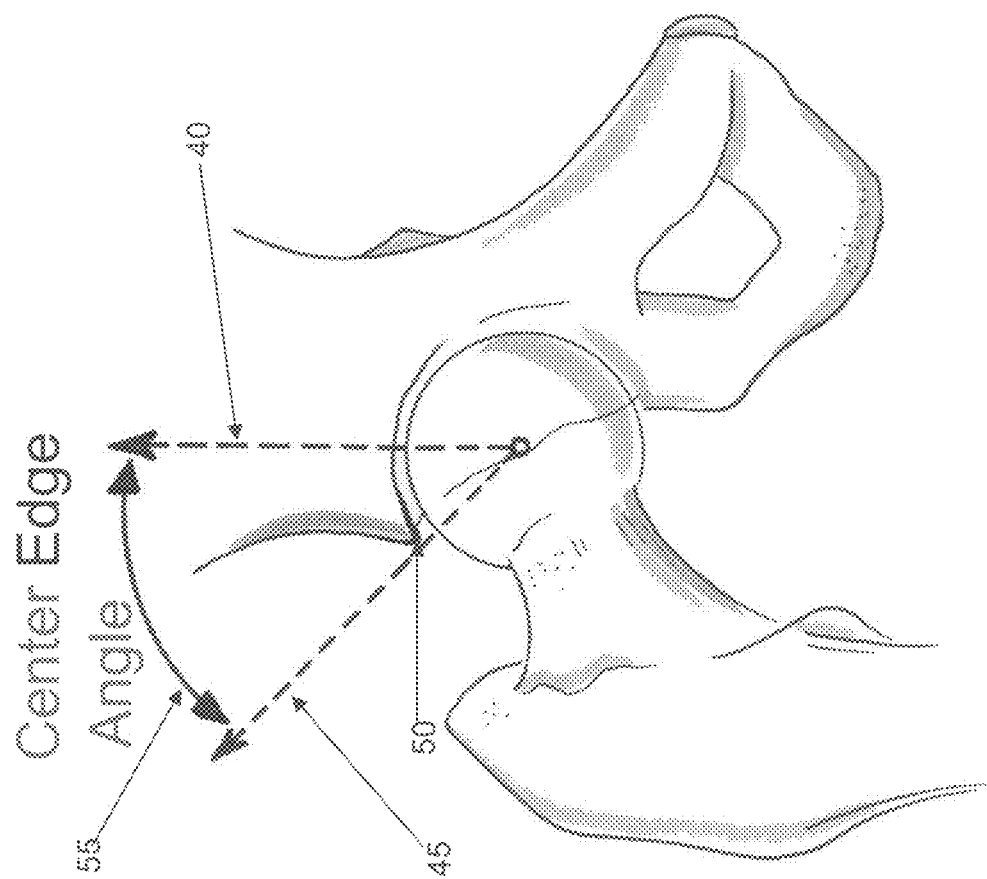
FIG. 17 is a schematic view showing a Center Edge Angle determination on the hip of a patient.

Correspondingly, and with reference to FIG. 17, to measure the Center Edge Angle, the surgeon manually creates a vertical line 40 which originates at the center of the femoral head and is perpendicular to the transverse pelvic axis. The surgeon then manually draws a second line 45 which originates at the center of the femoral head and passes through the location which signifies the start of the pincer pathology 50 (i.e., the rim of the acetabular cup). The surgeon then manually selects the two lines and instructs the software to calculate the angle between the two lines; the result is the Center Edge Angle 55.

These Alpha Angle measurements (or Center Edge Angle measurements) are typically performed around the time that the patient is initially examined, which typically occurs weeks or months prior to surgery. At the time of surgery, the surgeon may bring a copy (e.g., a printout) of the Alpha Angle measurements (or the Center Edge Angle measurements) to the operating room so that the printout is available as a reference during surgery. The surgeon may also have access to these measurements with a computer located in or near the operating room, which is connected to the hospital's PACS system (Picture Archiving and Communication System). Either way, the surgeon can have the pre-operative measurements available as a reference during surgery.

However, while the surgeon is debriding bone on the cam (or pincer), the pre-operative measurements may be insufficient for adequately guiding the surgeon regarding where and how much bone should be removed due to the difficulty in comparing what the surgeon sees in the endoscopic images with the pre-operative measurements. Accordingly, as discussed further below with respect to various embodiments, systems and methods can guide a surgeon during a surgical procedure on a joint by displaying an overlay of a three-dimensional representation of planned bone removal on a two-dimensional image of the joint captured during the surgical procedure. The three-dimensional representation of planned bone removal can indicate where bone should be removed from the joint in three-dimensional space, so that the surgeon can better understand how the planned bone removal relates to what the surgeon is seeing via the endoscopic imaging.

Figure 18:
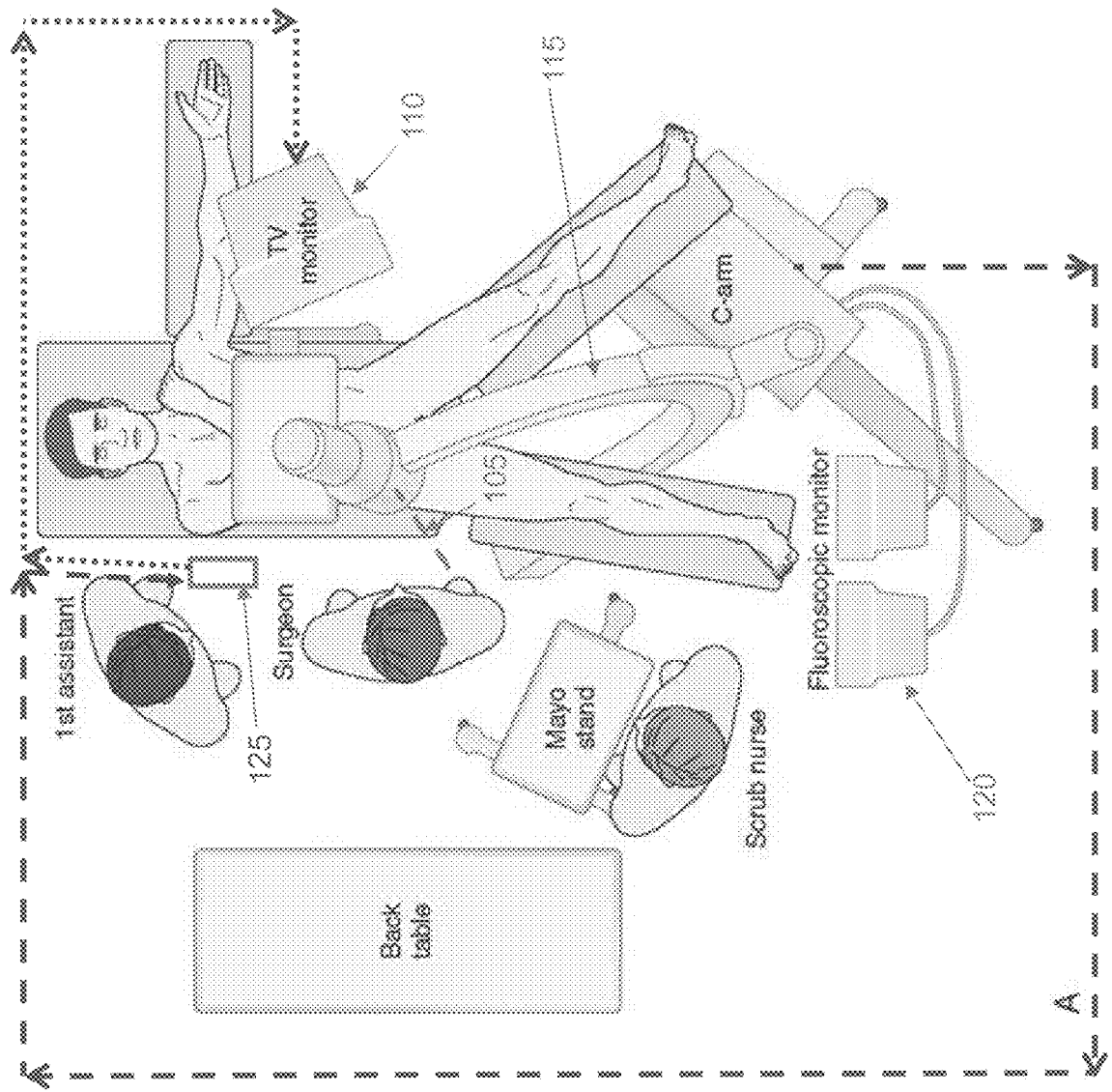
FIG. 18 is a schematic view of a surgical suite, according to some embodiments.

FIG. 18 illustrates a surgical suite incorporating a system for guiding a surgeon in removing bone from a portion of a joint during a surgical procedure, according to some embodiments. In a typical arthroscopic surgical suite, the surgeon uses an arthroscope 105 and a display 110 to directly view an internal surgical site. In addition, the surgeon may also use a C-arm X-ray machine 115 and a fluoroscopic display 120 to image the internal surgical site. In accordance with various embodiments, the surgical suite can include a visual guidance system 125 that can generate an overlay image in which a representation of bone removal extracted from a three-dimensional model of the bone is overlaid on a two-dimensional image of the bone captured intra-operatively, such as by a C-arm X-ray machine 115, according to the principles described herein, for guiding the surgeon during the surgical procedure.

According to some embodiments, visual guidance system 125 comprises one or more processors, memory, and one or more programs stored in the memory for causing the visual guidance system to provide the functionality disclosed herein. According to some embodiments, visual guidance system 125 comprises a tablet device with an integrated computer processor and user input/output functionality, e.g., a touchscreen. The visual guidance system 125 may be at least partially located in the sterile field, for example, the visual guidance system 125 may comprise a touchscreen tablet mounted to the surgical table or to a boom-type tablet support. The visual guidance system 125 may be covered by a sterile drape to maintain the surgeon's sterility as he or she operates the touchscreen tablet. Visual guidance system 125 may comprise other general purpose computers with appropriate programming and input/output functionality, e.g., a desktop or laptop computer with a keyboard, mouse, touch-screen display, heads-up display, gesture recognition device, voice activation feature, pupil reading device, etc.

Figure 19:
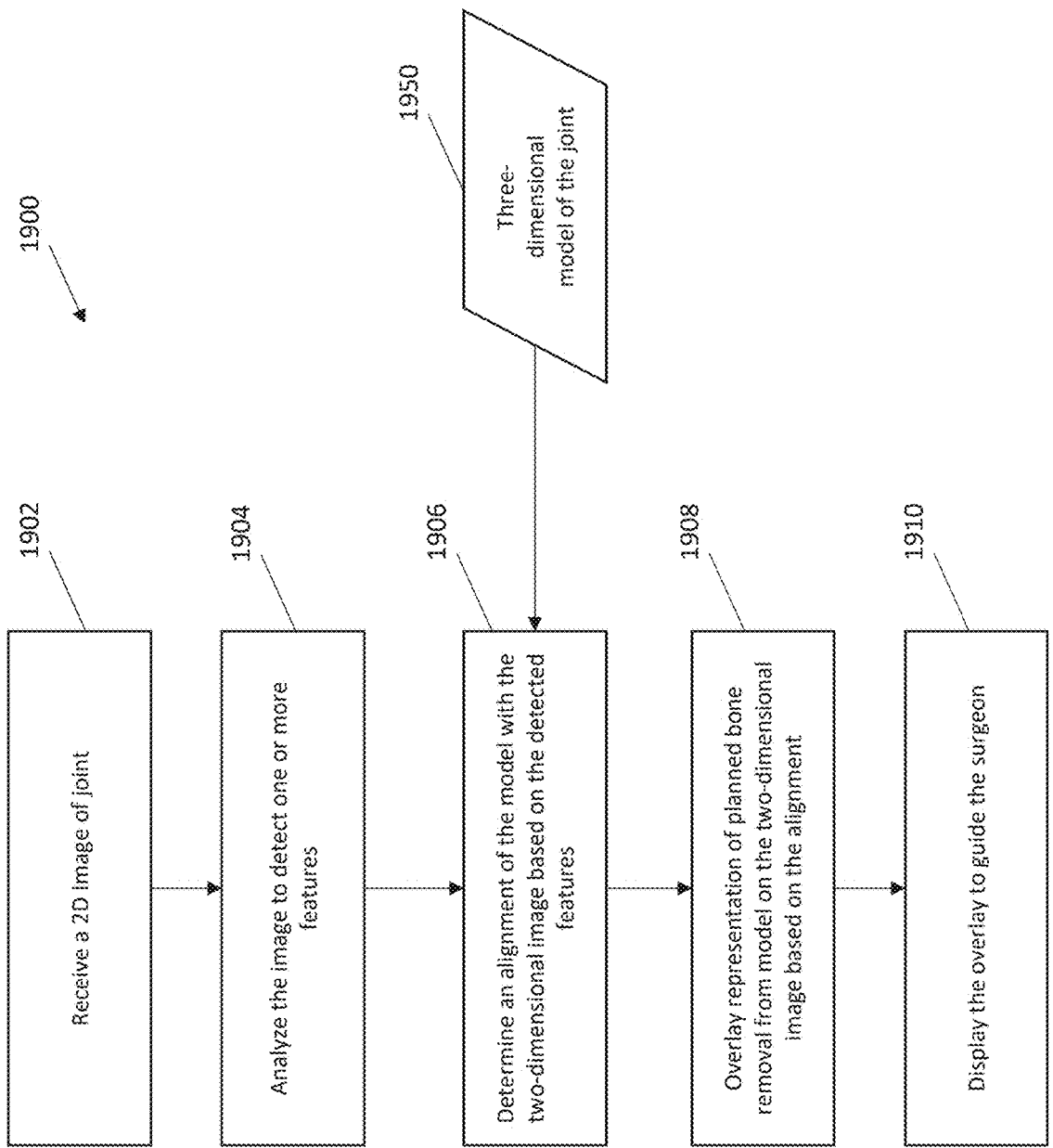
FIG. 19 illustrates a method 1900 for guiding a surgeon in the removal of bone from a portion of a joint during a surgical procedure, according to some embodiments.

FIG. 19 illustrates a method 1900 for guiding a surgeon in the removal of bone from a portion of a joint during a surgical procedure, according to some embodiments. Method 1900 can be performed by a visual guidance system, such as visual guidance system 125 of FIG. 18, to display an overlay image that includes a rendering of a three-dimensional visualization of planned bone removal for a portion of a joint overlaid on a two-dimensional image (e.g., a fluoroscopic image) of the portion of the joint that is captured during the surgical procedure. The overlay image can indicate to the surgeon where and how much bone should be removed in portions of the joint that are not captured in the two-dimensional image—i.e., are outside of the imaging plane. This method can be advantageous to the surgeon by allowing the surgeon to better associate the planned bone removal with what the surgeon is seeing in the endoscopic imaging. Since a two-dimensional image of the joint shows only the two-dimensional profile of the joint at the imaging plane, it is often difficult for the surgeon to identify the location in the endoscopic imaging that corresponds to the profile in the two-dimensional image and, therefore, where exactly bone should be removed. Method 1900 enables a surgeon to visualize the locations of bone for removal that are outside of the imaging plane, which enables the surgeon to better compare the planned bone removal with what the surgeon is seeing in via the endoscopic imaging. Method 1900 may be used for any joint of the body, including the hip joint, shoulder joint, knee joint, spinal joints, etc.

Generally, as discussed further below, the rendering of the planned bone removal is part of a pre-operatively generated three-dimensional model 1950 of the patient's joint or portion thereof that was generated based on a three-dimensional scan of the patient's joint, such as during a pre-operative planning phase. The three-dimensional model 1950 models at least a portion of the joint that is targeted for surgical treatment, such as the upper portion of the femur or the acetabulum. The model also includes a representation of planned bone removal that can identify portions of the bone that deviate from target joint morphology. For example, in some embodiments, the representation of bone removal is a heat map provided on a portion of bone that is associated with a pathology target by surgical treatment. The visualization can indicate where and, in some embodiments, how much, bone should be removed during a debridement procedure. Method 1900 generally includes determining the alignment of the three-dimensional model that when projected onto a two-dimensional plane will align with the two-dimensional image and overlaying at least the representation of planned bone removal from the model on the two-dimensional image based on the alignment.

Figure 20:
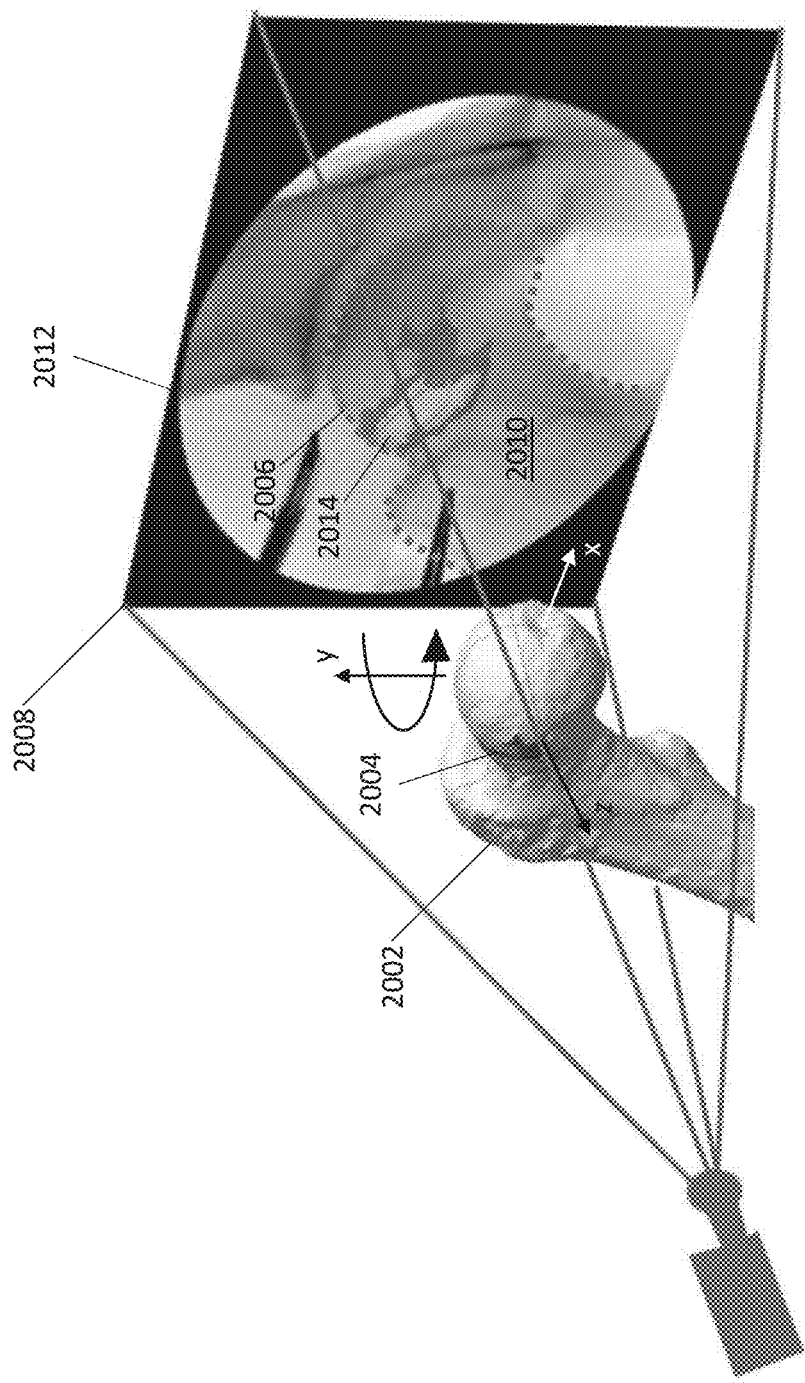
FIG. 20 illustrates aspects of the application of method 1900 to a femur, according to some embodiments.

FIG. 20 illustrates general principles of method 1900 for an embodiment directed to debridement of a CAM lesion on the head of a femur of a hip joint, according to some embodiments. In the illustrated example, the three-dimensional model 2002 models the upper portion of a femur and includes a representation of planned bone removal in the form of a heat map 2004 that covers the portion of bone that deviates from a target morphology and, as such, is identified for removal (e.g., via debridement). The heat map 2004 is color coded according to the planned depth of bone removal. As discussed further below, method 1900 includes steps for aligning the three-dimensional model 2002 so that a projection 2006 of the model onto a two-dimensional plane 2008 that corresponds with the imaging plane aligns with the femur 2010 in the two-dimensional image 2012. Conceptually speaking, according to some embodiments, the model 2002 is manipulated according to the available degrees of freedom-such as translations in the x, y, and z directions, rotations about these axes, and scaling relative to the viewpoint of a viewer (depicted as a camera in FIG. 20)—until its projection 2006 aligns sufficiently with the femur 2010 in the two-dimensional image 2012. Once this satisfactory alignment is achieved, and with continued reference to the example of FIG. 20, the three-dimensional heat map 2004 is projected onto the two-dimensional plane 2008 and rendered as an overlay 2014 on the two-dimensional image 2012 that is displayed to the surgeon intra-operatively.

Prior to describing the step of method 1900, various aspects of the three-dimensional model 1950, according to various embodiments, will be described. Generally, the three-dimensional model is pre-operatively generated using three-dimensional imaging data. The model can include one or more portions of one or more bones of a joint. For example, for a hip joint, a patient's hip joint can be imaged and a model can be built from the imaging that includes various portions of the hip joint, including, for example, the femoral head, the femoral neck, the acetabular cup, the pelvis, femoral condyles, etc. Any suitable imaging system can be used, including, for example, a CT imaging system, an ultrasound tomography system, an O-arm™ imaging system, a beam cone CT imaging system, and an MRI imaging system. The three-dimensional model may then be analyzed to identify portions of the imaged anatomy that may require surgical treatment, such as for resecting an FAI lesion.

According to some embodiments, systems and methods according to the principles described herein can generate a three-dimensional model of at least a portion of a joint that includes a representation of at least one region of the portion of the joint that deviates from a target morphology. This model can be used to assist a practitioner in planning for a surgical procedure on the at least one region of the joint, such as by indicating to the practitioner where and how much bone should be removed. For example, a three-dimensional model of a portion of a hip joint of a subject can be generated that includes information identifying a location of a hip joint pathology (e.g., a condition or a disorder), such as an FAI, and an amount of bone that may be removed to match a baseline anatomy. The three-dimensional model can be used to generate a rendering of the portion of the joint that includes a visual representation of the location and amount of bone to be removed, such as a heat map covering the portion of bone that deviates from a target and including variation in color, contrast, or other suitable visual indicator, that indicates a degree of deviation from the target morphology.

The three-dimensional model and information regarding deviations from a baseline/target anatomy can be used to generate a three-dimensional rendering of the joint that includes a visual representation of the deviations from the baseline/target anatomy. In some embodiments, the visual representation can indicate the location and amount of bone that should be removed to achieve a target morphology. In some embodiments, a user, such as the surgeon or a third party, can tailor the visual representation for surgical planning purposes, such as by altering one or more parameters that determine the deviations from the target bone morphology, which can increase or decrease the size of the region indicated for bone removal and/or increase or decrease the amount of bone indicated for removal.

In some embodiments, the three-dimensional model is pre-generated and stored for use during the surgical session. In some embodiments, the three-dimensional model may be generated intraoperatively, such as using an O-arm™ imaging system. In some embodiments, the three-dimensional model may be updated based on images captured during the surgical procedure to reflect the removal of bone during the surgical procedure, which is discussed further below.

Returning to FIG. 19, method 1900 includes receiving a two-dimensional image of at least a portion of a joint during a surgical procedure at step 1902. The two-dimensional image generally includes the portion of the bone that is being surgically treated as well as surrounding portions of the bone that enable the surgeon to generally compare what is shown in the image to what the surgeon is seeing endoscopically. For example, in embodiments involving debridement to address a CAM pathology, the two-dimensional image generally includes the head and neck of the femur. The two-dimensional image can be received from an intra-operative imaging system, such as an X-ray imager that is communicatively connected with the surgical guidance system performing method 1900 (e.g., C-arm X-ray machine 115 of FIG. 18). In some embodiments, one or more pre-processing operations are applied to the X-ray image, such as one or more scaling operations, cropping operations, down-sampling, up-sampling, etc. In some embodiments, a dewarping operation is applied to the X-ray image to correct for warping caused by the imaging system. In some embodiments, dewarping of an X-ray image is performed based on the determined relationship between a known pattern of reference markers attached to the detector of the imaging system and the reference markers visible in the X-ray image. For example, the reference markers in an X-ray image may be detected, a non-rigid transformation that maps the known positions of the reference markers to the markers visible in the image may be calculated, and the transformation may be applied to the image, resulting in a dewarped image. In some embodiments, the reference markers may then be removed from the image.

At step 1904, the two-dimensional image is analyzed to extract one or more features associated with the location of the target bone in the two-dimensional image that can be used to align the three-dimensional model of the bone with the two-dimensional image. According to some embodiments, the extracted features include the edges of the bone in the image, which can be extracted using one or more edge detection techniques. In some embodiments additional features are extracted based on the detected edges, which can include, for example, size and location of the bone.

Figure 21:
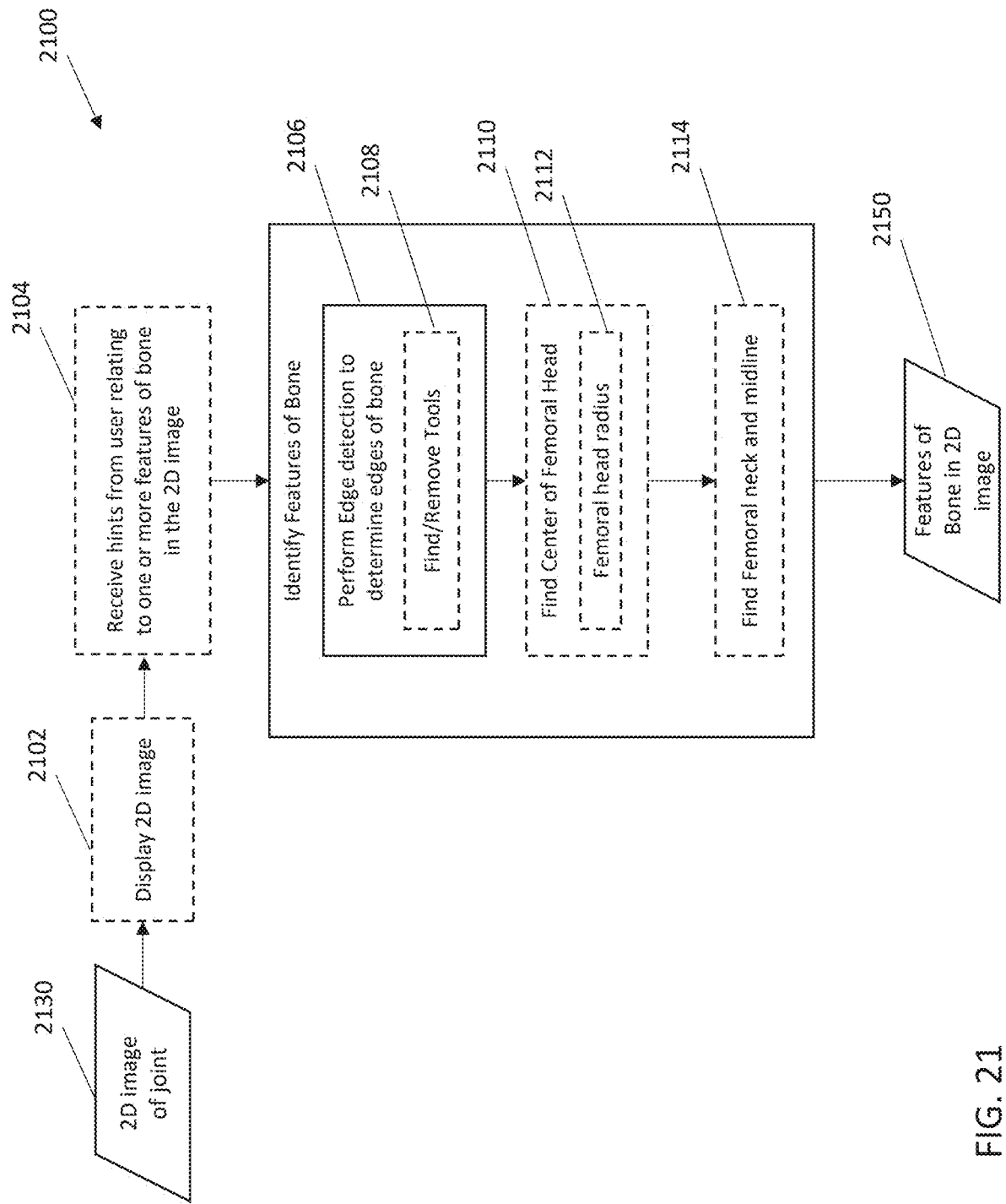
FIG. 21 illustrates an implementation of an embodiment of step 1904 for extracting features of a femur.

FIG. 21 illustrates an implementation of an embodiment of step 1904 for extracting features of a femur. Method 2100 can be used for providing visual guidance to the surgeon during a bony debridement of the femur to treat a CAM legion.

Figure 22:
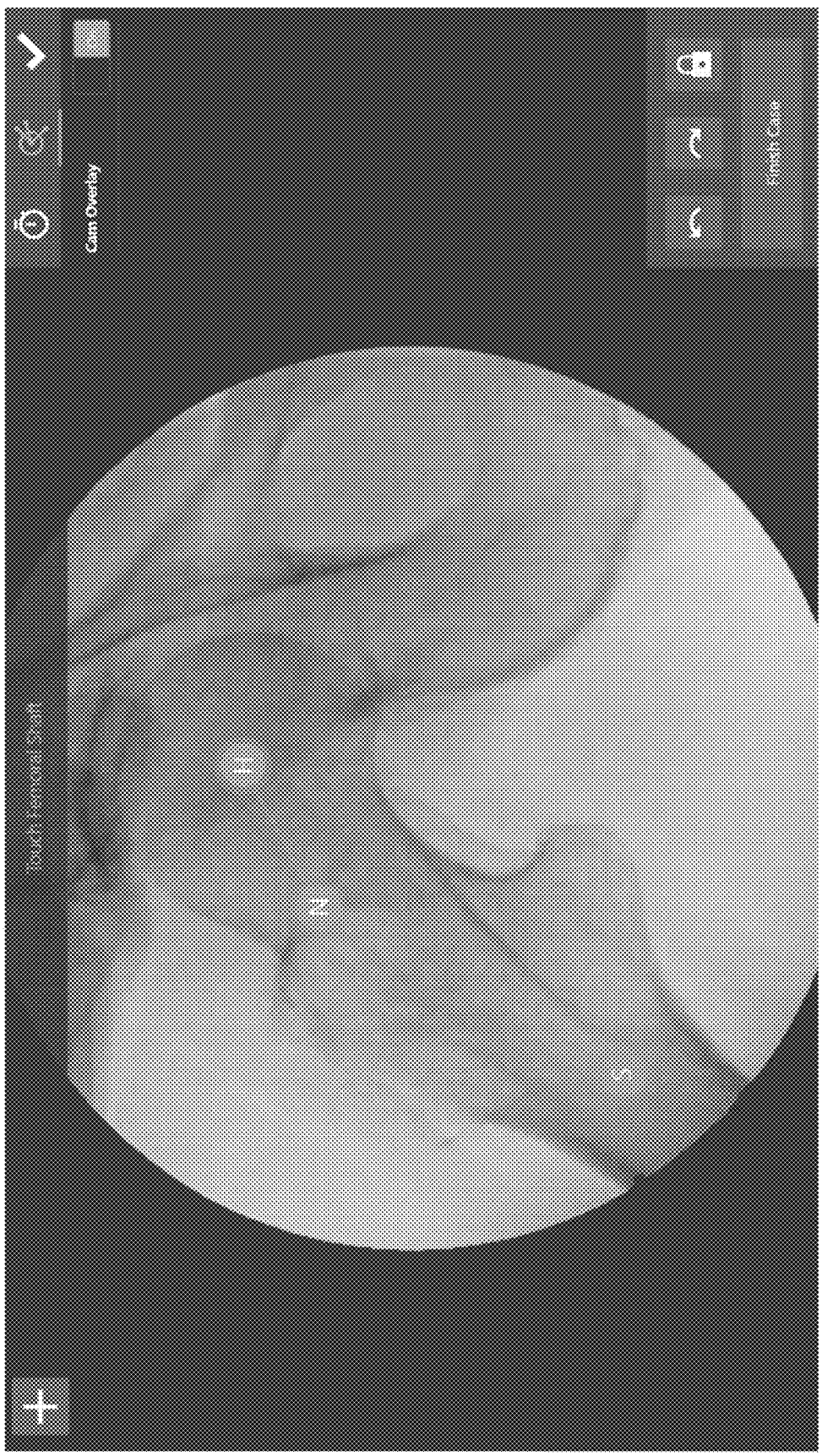
FIG. 22 illustrates an example of a display of a two-dimensional x-ray image of a portion of a hip joint captured by an x-ray imaging system with user hints placed on the image, according to some embodiments.

At step 2102, a two-dimensional image 2130 of a portion of a joint is displayed to the surgeon on a display (such as on visual guidance system 125 and/or display 110 of FIG. 18) FIG. 22 illustrates an example of a display of a two-dimensional x-ray image of a portion of a hip joint captured by an x-ray imaging system (e.g., a C-arm x-ray machine 115). The displayed image 2130 can enable the surgeon to determine if the image 2130 is an adequate image (e.g., is it clear enough, is it of the correct location).

In some embodiments, the image 2130 can be displayed as part of a user interface configured for receiving "hints" from the surgeon (or other operating room personnel) regarding one or more features of the femur in the image at optional step 2104. These "hints" may be used to speed up the identification of features of the bone in the image. The one or more hints from the surgeon can be received via any suitable input, including, for example, a touch input to a corresponding portion of the touchscreen display displaying the two-dimensional image 2130 or a gesture recognition system of an augmented reality or virtual reality system incorporated into or coupled to the visual guidance system 125. In some embodiments, and with reference to FIG. 22, the surgeon may provide one or more hints related to landmarks of the bone in the image. For example, a femoral head hint "H" may be provided on the femoral head in the image and a femoral neck hint "N" may be provided on the femoral neck in the image. In some embodiments, a femoral shaft hint "S" may be provided on the femoral shaft in the image 2130. The surgeon may be guided through this process by one or more prompts on the display indicating to the surgeon what hints are being sought. In some embodiments, the visual guidance system may be configured to display one or more warnings in accordance with a determination that a hint meets one or more predefined criteria. For example, the system may be configured to determine whether a hint provided by the surgeon is outside of a predefined range, or whether a hint provided by the surgeon appears to be in an incorrect area of an image, or whether a hint provided by the surgeon does not enable the system to make a determination as to the location of one or more anatomical features on the basis of the hint. If the one or more predefined criteria for displaying a warning in response to receiving a hint is satisfied, then the system may display a warning in the form of a popup window or drop-down window. In some embodiments, the warning may display information regarding the satisfied criteria that caused display of the warning. In some embodiments, the warning may prompt the surgeon to re-enter a new hint. As noted above, receiving user hints is optional.

Figure 35:
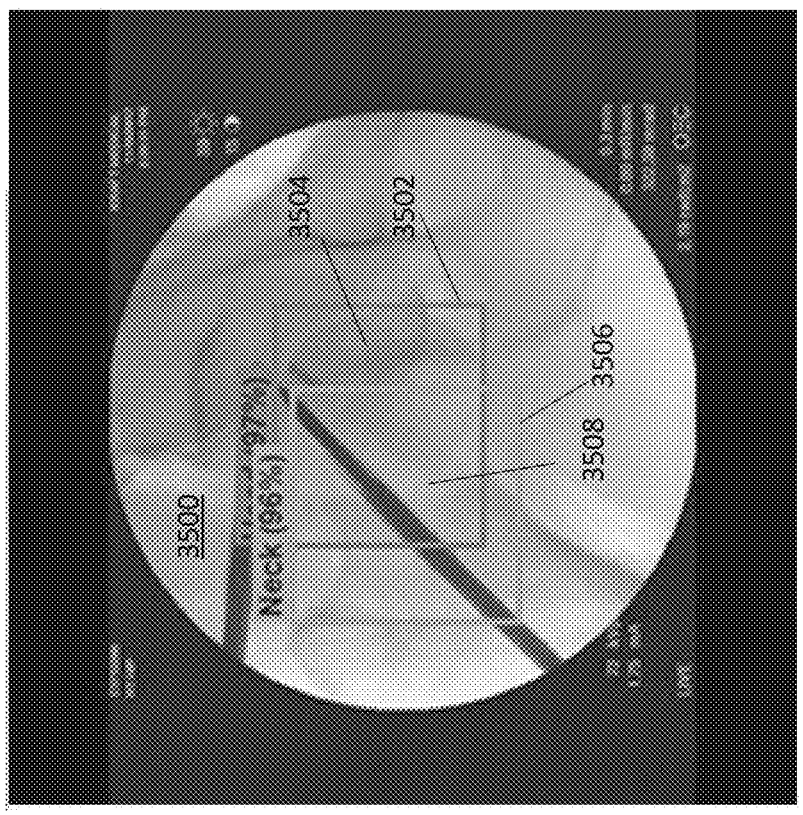
FIG. 35 illustrates the generation of scored bounding boxes using a machine learning model trained to detect the head and neck of a femur, according to various embodiments.

In some embodiments, the feature identification process is entirely automatic, requiring no guidance from a user. For example, an object detection machine learning model that is trained to detect one or more features of bone in the image may be used. For example, an object detection machine learning model can be trained to detect the femoral head, femoral neck, greater trochanter, lesser trochanter, and/or femoral shaft. An object detection machine learning model could utilize a convolutional neural network (CNN), such as R-CNN or YOLO architecture, or any other suitable object detection model. In some embodiments, the trained machine learning model provides potential bounding boxes and their classifications (e.g., one or more of the head of the femur, the neck of the femur, the shaft of the femur, etc.). Post processing of the machine learning model results may determine the highest scoring bounding box for each classification. The scores may be compared to one or more threshold value and if the scores meet the threshold values, then the center of each bounding box may be used as starting points for further feature detection, in similar fashion to the user-provided hints discussed above. FIG. 35 illustrates the generation of scored bounding boxes using a machine learning model trained to detect the head and neck of a femur, according to various embodiments. The machine learning model can provide a bounding box 3502 bounding the femoral head 3504 captured in the X-ray image 3500 and a bounding box 3506 bounding the femoral neck 3508 in the image 3500. The femoral head bounding box 3502 has a score of 97% and the femoral neck bounding box 3506 has a score of 96%. If these scores meet a predetermined threshold, then the centers of the respective bounding boxes may be used as starting points for further feature identification steps for identifying the femoral head and neck, as discussed further below. In some embodiments, if the scores do not meet the threshold values, the system may prompt the user to provide hints as discussed above.

Figure 23:
FIG. 23 illustrates an example of the results of an edge detection algorithm for a femoral head, according to some embodiments.

Method 2100 continues with step 2106 in which edge detection is performed on the two-dimensional image 2130 to identify the edges of at least a portion of the femur in the image, such as edges of the femoral head, the femoral neck, the greater trochanter, the lesser trochanter, and/or any other portions of the femur. There are multiple ways to carry this edge detection step, including industry standard methods such as Sobel, Canny, and Scharr edge detection methods. FIG. 23 illustrates an example of the results of an edge detection algorithm for an upper portion of a femur, according to some embodiments.

After edge detection is complete, it may be advantageous to find and remove the edges of any instruments that are in the search area in optional step 2108, since the presence of instrument edges in the image can complicate subsequent processing steps (e.g., finding the femoral head, finding the femoral neck, etc.). Finding and removing instrument edges may be conducted according to algorithms well known in the art of image processing.

Figure 24:
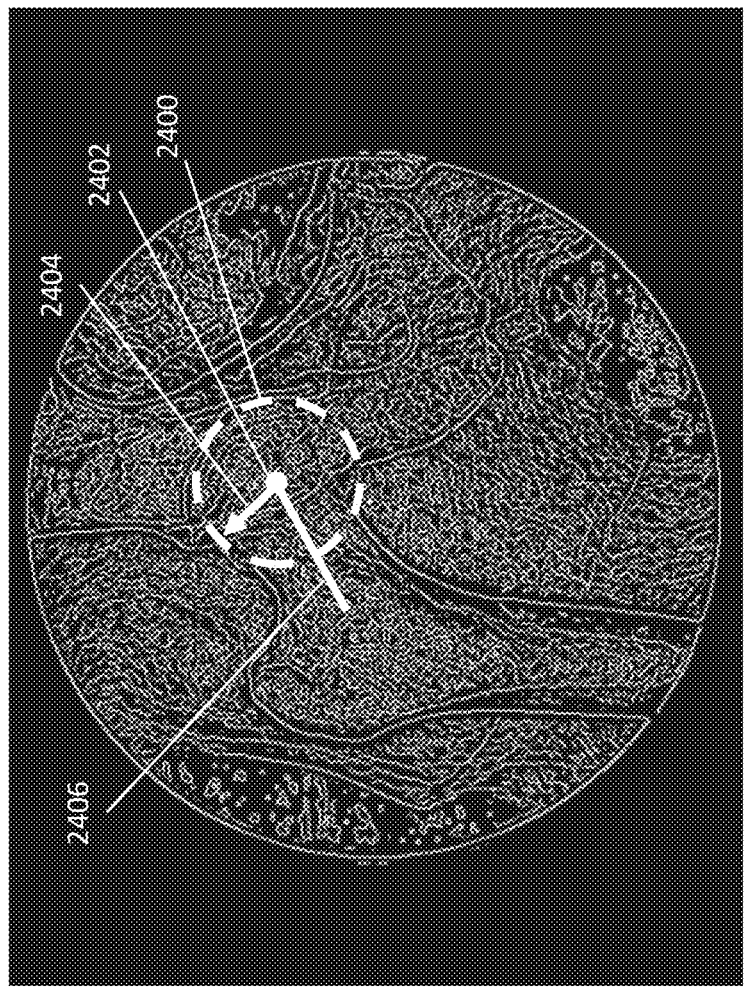
FIG. 24 illustrates an example of a circle from a Hough transform encircling the edges of the femoral head detected via edge detection, according to an embodiment.

In some embodiments, at step 2110, the center of the femoral head is determined based on the edges detected in step 2106. According to some embodiments, the center of the femoral head may be detected by first detecting the perimeter of the femoral head in the image. According to some embodiments, this can be done using a Hough transform, which looks for circles that match the edges of the femoral head. These circles may be limited in the range of the smallest and largest possible femoral heads. The Hough transform produces a list of possible answers and the best possible answer is selected. FIG. 24 illustrates an example of a circle 2400 from a Hough transform encircling the edges of the femoral head detected via edge detection, according to an embodiment.

Although the Hough transform is relatively fast, it may not be as accurate as desired since the femoral head may not be a perfect circle. Accordingly, in some embodiments, an alternative approach is used in which a center point is selected (such as using a hint provided by the surgeon at step 2104) and then visual guidance system 125 starts tracing along lines looking for edges between the minimum and maximum possible radii (which correlates to the smallest and largest possible femoral head). In this approach, visual guidance system 125 selects the point that has the strongest edge in each ray, and then checks to see if these points end up in a circle. Then another point is selected, and the process is repeated. This is done iteratively until the best point is found, using previous points as a guide for where to look next. Any other suitable technique can be used to locate the perimeter of the femoral head, including machine learned models trained on images of similar anatomy.

Once the femoral head is identified, the center of the femoral head in the x and y dimensions may be determined, as illustrated in FIG. 24 at 2402. In some embodiments, the radius of the femoral head may also be determined in step 2112 by measuring the distance from the center of the femoral head to the perimeter of the femoral head, as indicated at 2404 in FIG. 24.

In some embodiments, method 2100 continues with step 2114 in which the mid-line of the femoral neck is identified. The midline in the example of FIG. 24 is indicated at 2406. There are multiple ways to find the femoral neck; however, it is generally easier to find the femoral neck once the femoral head has been identified. In some embodiments, a Box Sweep method is used to find the femoral neck. A box is swept around the femoral head (where the box has its mid-line passing through the center of the femoral head) until the sides of that box line up with the edges of the femoral neck (as identified via edge detection). This is repeated for boxes of multiple sizes. The box that lines up with the strongest edges of the femoral neck can be chosen. The center of the box is then used to determine the mid-line of the femoral neck.

Resulting from method 2100 is a set of features 2150 of the bone in the two-dimensional image that can be used to align the three-dimensional model with the two-dimensional image. As described above, the set of features 2150 can include the edges of at least the femoral head and neck in the two-dimensional image, the coordinates of the center of the femoral head in x and y, the radius of the femoral head, and the direction of the midline of the femoral neck. These features are merely exemplary of features of an upper portion of a femur that can be identified. Various embodiments can include identified one or more of these features and/or one or more additional features, such as the midline of the femoral shaft, the upper trochanter, and/or the lower trochanter.

Method 2100 is merely exemplary of feature detection step 1904 of method 1900 as applied to a femur. According to various embodiments, feature detection can be performed multiple times throughout method 1900. For example, a first feature detection step can be performed at an initial stage of an alignment determination process to provide a starting point for alignment, as discussed further below, and a second feature detection step can be performed at a later stage when refining the model alignment. Thus, multiple steps of feature detection can be conducted in an iterative feature detection and alignment process. Feature detection can be performed differently at different times. For example, an initial feature detection step may detect edges and may also detect features derivable from those edges-such as the location of the center of a femoral head, while a later feature extraction step may include only edge detection. According to some embodiments, feature extraction can be limited to simple edge detection using one or more edge detection algorithms as mentioned above.

In some embodiments, one or more features of a pelvis may be detected at step 1904. For example, the features of the pelvis may be associated with at least one of a center of the acetabulum, the obturator foramen, and the pubic symphysis. In some embodiments, method 1900 is applied to a knee joint, and the one or more features can be associated with at least one of the tibial plateau, the tibial shaft, and the intercondylar eminence. In some embodiments, method 1900 is applied to one or more vertebra and the one or more features can be associated with at least one of the pedicle, the facet, the superior endplate, and the inferior endplate.

Returning to FIG. 19, once the features of the bone in the two-dimensional image are detected in step 1904, one or more of the detected features can be used to determine an alignment of the three-dimensional model 1950 with the two-dimensional image in step 1906. Generally, determining the alignment includes manipulating the three-dimensional model 1950 according to the available spatial degrees of freedom until a projection of that model onto a two-dimensional plane aligns with the bone in the two-dimensional image. According to some embodiments, the features extracted from the two-dimensional model can be as simple as the outline of the bone in the two-dimensional image (for example, extracted using edge detection) and the alignment process can include iteratively repositioning the three-dimensional model until a projection of the three-dimensional model aligns with the outline of the bone. In some embodiments, additional features detected in the two-dimensional image are used to provide an initial estimate the alignment of the model, which can help reduce the processing time required to find the correct alignment.

Figure 25:
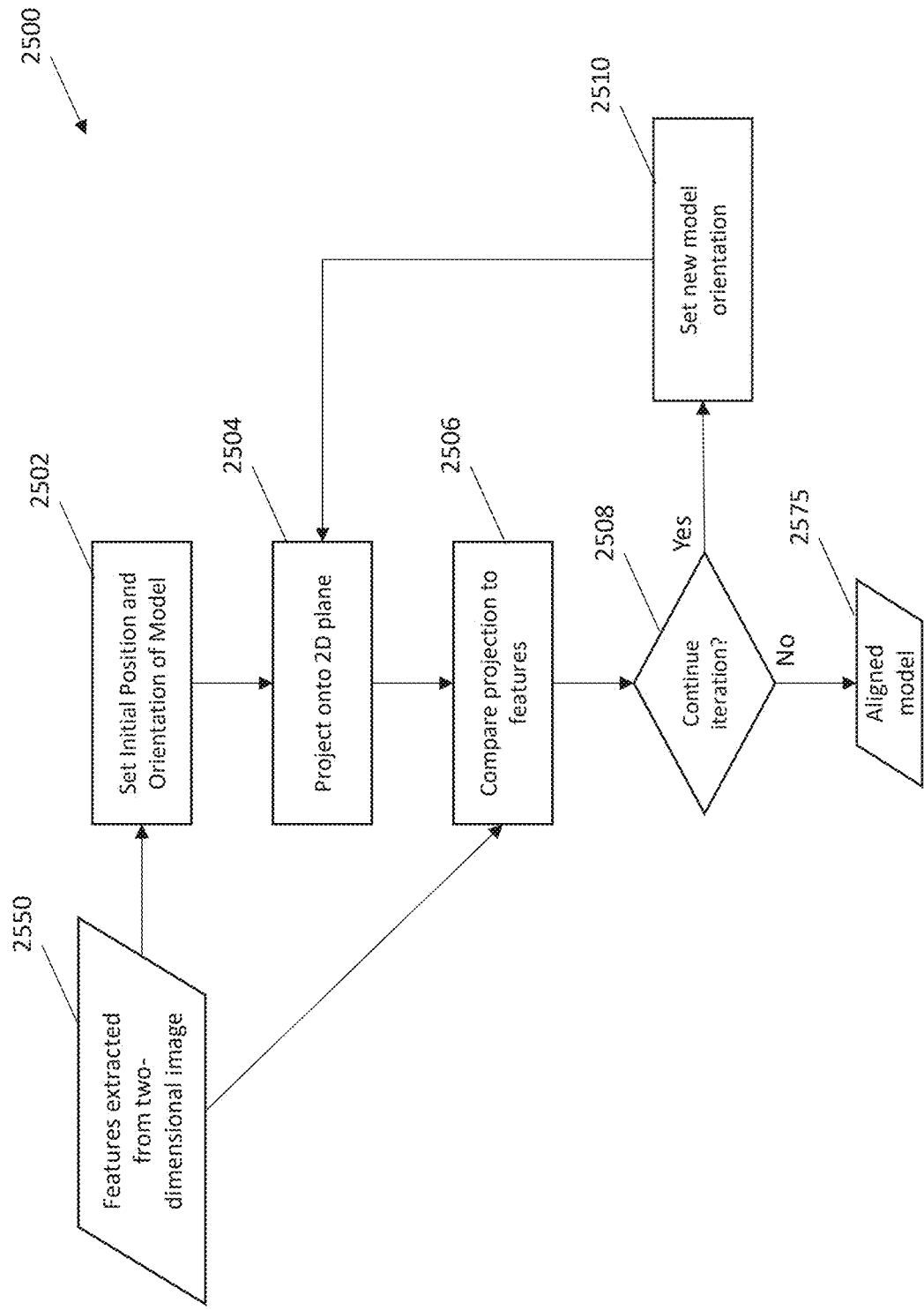
FIG. 25 illustrates a method for determining an alignment of a three-dimensional model with a two-dimensional image, according to some embodiments.

FIG. 25 illustrates a method 2500 for determining an alignment of a three-dimensional model with a two-dimensional image, according to some embodiments. At step 2502, an initial position and orientation of the three-dimensional model is set as a starting point for an iterative process of determining the alignment of the three-dimensional model that when projected onto a two-dimensional plane aligns with the two-dimensional image. Setting the initial position and orientation can include setting the available degrees of freedom of the model, including the three positional degrees of freedom, the three rotational degrees of freedom, and the scale of the model. In some embodiments, multiple initial positions and orientations of the model are set so that multiple positions can be analyzed in parallel.

In some embodiments, the initial position and orientation of the three-dimensional model is set according to one or more predefined criteria. For example, in some embodiments, the initial position and orientation is set according to default values associated with the three-dimensional model, such as by setting all translations and rotations to a zero value and a scaling to a value of one. In some embodiments, the initial position may be set according to one or more positions that the anatomy may typically take during a surgical procedure. For example, the initial position and orientation of the three-dimensional model may be set according to a position and orientation of the anatomy when in a position that the body commonly takes during the surgical procedure. For instance, it may be standard practice in certain medical procedures for physicians to capture anatomical images, such as X-ray images, in predefined patient positions and/or from predefined angles. For example, for cam resection procedures, six standard patient positions are typically imaged to ensure that all potential cam pathology locations on the femur are assessed, as described in an article in The American Journal of Sports Medicine, titled "Intraoperative Fluoroscopic Imaging to Treat Cam Deformities: Correlation with 3-Dimensional Computed Tomography," authored by James R. Ross, et al., and published online on Apr. 15, 2014, the entire contents of which is hereby incorporated by reference. As described in the Ross article, the six standard positions are: the knee and hip in full extension (i.e., 0 degrees flexion) and the leg in (1) 30 degrees of internal rotation, (2) neutral rotation, and (3) 30 degrees of external rotation; and the hip and knee positioned in 50 degrees of flexion and the hip in (4) neutral rotation, (5) 40 degrees of external rotation, and (6) 60 degrees of external rotation. As such, in some embodiments, the initial position and orientation of three-dimensional model is set according to one or more of these six standard positions.

In some embodiments, the initial position and orientation is set according to one or more features 2550 determined from the two-dimensional image. For example, an estimate of a center and/or midline of a bone in the image can be used to center the corresponding bone in the three-dimensional image. In some embodiments, the initial position and orientation is set according to a combination of one or more predefined criteria and one or more features determined from the two-dimensional image. For example, the determined features can be used to set one or more, but fewer than all, degrees of freedom and predefined criteria can be used to set the remaining degrees of freedom.

Once the initial position and orientation of the three-dimensional model is set for the number of initial model alignments (multiple initial alignments can be used to speed the process), the model according to each alignment is projected onto a two-dimensional plane at step 2504. As used herein, projecting the model onto a two-dimensional plane means finding the silhouette edge of the model with respect to the position and orientation of the model set in step 2502. Projecting the three-dimensional model onto a two-dimensional plane results in a two-dimensional outline of the bone. For embodiments in which multiple positions are analyzed in parallel, a projection is generated for each initial position and orientation set in step 2502.

At step 2506, the projection generated in step 2504 is compared to one or more features 2550 determined from the two-dimensional image. In some embodiments, the features determined from the two-dimensional image are edges detected in the two-dimensional image and the projection is compared to the detected edges to determine how similar the edges in the projection are to the detected edges. This comparison of edges can include generating a similarity metric comparing the projection to the detected edges. In some embodiments, the similarity metric is an edge-based similarity metric. The edge-based similarity metric can take into account any suitable attribute of edges detected in the two-dimensional image, such as the strength of an edge, direction that the edge is facing, and continuity with neighboring edges, and can compare one or more attributes of a detected edge with a corresponding portion of the three-dimensional model. In some embodiments, the edge-based similarity metric is based on weighting the distance from points on the edges in the projection to the closest edges extracted from the two-dimensional image and producing a value associated with the distances. In some embodiments, the edge-based similarity metric is based on the strength of the edge extracted from the two-dimensional image for each edge in the projection. In some embodiments, the edge-based similarity metric is based on the matching angle from the edge extracted from the two-dimensional image to the corresponding edge in the projection. For embodiments in which multiple positions are analyzed in parallel, each projection is compared to the features extracted from the two-dimensional image.

At step 2508, a decision can be made whether to continue to search for the proper alignment of the three-dimensional model or to complete the alignment step. In some embodiments, this decision can be based on the results of step 2506, such as by determining whether the results of step 2506 indicate an adequate alignment. For example, in some embodiments, step 2506 may result in a similarity metric value that is compared to a predefined threshold to determine whether the alignment is close enough or whether further iteration is desired. In some embodiments, the decision whether to continue to iterate is based on a predefined criteria, such as whether a predefined number of iterations have completed.

If the decision at step 2508 is to continue, then a new model position and orientation is set at step 2510. The new model position and orientation can be set by moving the model in one or more degrees of freedom by a fixed amount relative to a previous position and orientation. In embodiments in which multiple positions and orientations are analyzed in parallel, the position and orientation with the best match to the features of the two-dimensional model may be selected in step 2510 and the model may be perturbed relative to that selected position and orientation. For example, the position and orientation that resulted in the best similarity score in step 2506 may be selected and the model may be repositioned relative the selected position and orientation via predetermined amounts in one or more degrees of freedom. In some embodiments, multiple new model positions and orientations are set. For example, the model may be moved relative to the selected position and orientation by a fixed amount in a first degree of freedom to provide a first new model position and orientation and by a fixed amount in a second degree of freedom to provide a second new model position and orientation.

With the new model position and orientation (or multiple new positions and orientations set) in step 2510, the process returns to step 2504 in which each new model alignment is projected onto the two-dimensional plane. This process continues in a loop until the decision at step 2508 is to stop iterating, for example, because the resulting projection is close enough or because the predetermined number of iterations is complete, resulting in the determined model alignment 2575 that produces a projection that is sufficiently aligned with the two-dimensional image.

Figure 26:
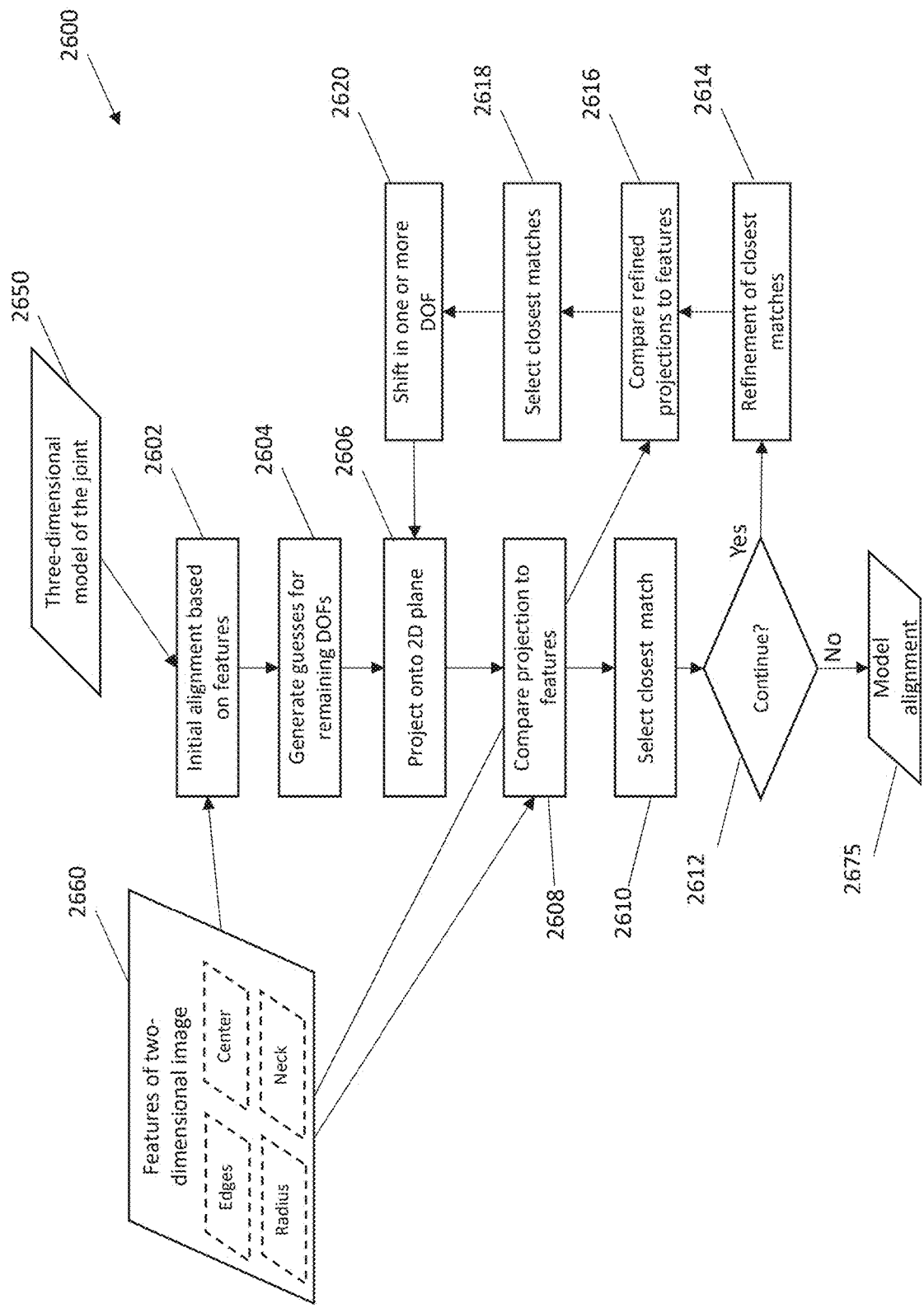
FIG. 26 illustrates an embodiment of an application of the method of FIG. 25 for aligning a three-dimensional model of at least an upper portion of a femur of a subject with a two-dimensional image of at least an upper portion of the femur of the subject captured during a surgical procedure on the femur.

FIG. 26 illustrates an embodiment of an application of method 2500 for aligning a three-dimensional model of at least an upper portion of a femur of a subject with a two-dimensional image of at least an upper portion of the femur of the subject captured during a surgical procedure on the femur, such as during a bony debridement of the femur to correct a CAM-type FAI.

Method 2600 beings at step 2602 in which an initial alignment of the model 2650 is set based on features 2660 extracted from the two-dimensional image 2630, such as resulting from method 2100 of FIG. 21. The initial alignment may be set according to seven degrees of freedom, which can include three translational degrees of freedom, three rotational degrees of freedom, and scaling. For purposes of explanation, the translation degrees of freedom associated translation within the projection plane are referred to herein as the x and y directions. The z direction extends orthogonally to the projection plane.

In some embodiments, the features used for the initial alignment include the position of the center of the femoral head in the two-dimensional image, the direction of the midline of the femoral neck, and the radius of the femoral head. The center of the femoral head in the image can be used to set the x and y position of the model. The model is conceptually manipulated relative to the projecting plane such that the center of the femoral head in the model is positioned relative to the projecting plane in the same location as the center of the femoral head in the two-dimensional image. For example, according to some embodiments, if the center of the femoral head in the two-dimensional image is in the center of the image, then the model is manipulated relative to the projecting plane such that the center of the model's femoral head projects onto the center of the projecting plane.

The model is positioned in the z direction so as to achieve a size of the bone (for example, in pixels) that matches the size of the bone in the two-dimensional image.

The model is then manipulated relative to the projecting plane so that the midline of the femoral neck extends in the same directed from the center of the femoral head as the midline in the two-dimensional image. This step can be thought of as rotating the model about the z-axis until the midline is in the same position relative to the projecting plane as the midline of the femoral neck in the two-dimensional image.

Through these initial alignment steps, the position of the model approximates the position of the bone in the two-dimensional image in the x, y, and z positions, the scale, and the rotation about the z-axis. The degrees of freedom that are not approximated via the features determined from the image in this example are the rotations about axes that extend within the two-dimensional projecting plane—the rotations about the x and y axes. By defining one of the x and y axes as extending through the femoral neck midline, the two unknown degrees of freedom are the rotation about the axis extending through the femoral neck midline and the rotation about the axis that is within the projecting plane and orthogonal to the midline axis.

Figure 27:
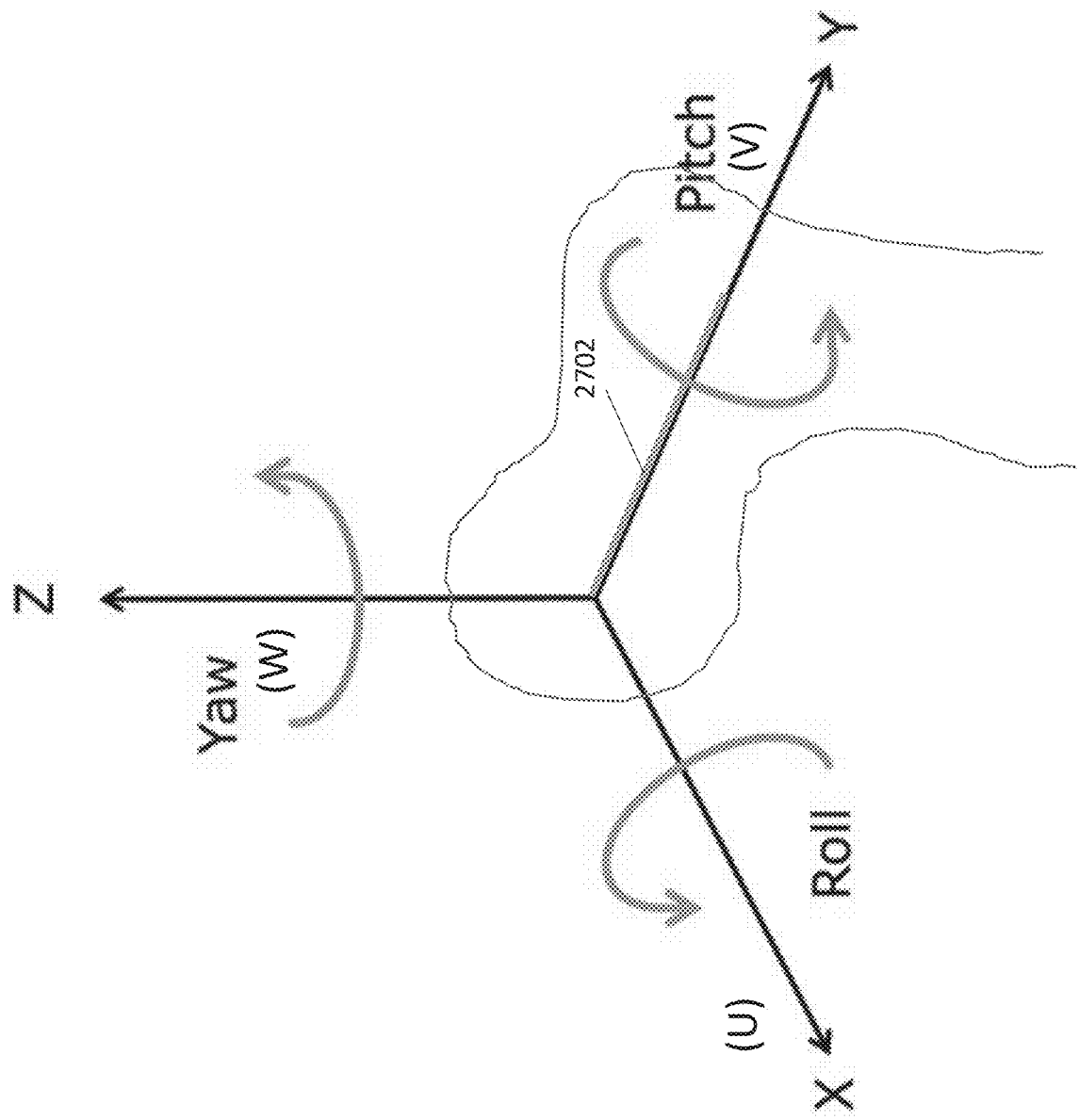
FIG. 27 illustrates the available degrees of freedom for model alignment, according to some embodiments.

The degrees of freedom of the model alignment, according to some embodiments, are illustrated in FIG. 27. The x and y positions are known from the x and y positions of the center of the femoral head in the two-dimensional image. The z-position can be determined from the size of the femoral head from the two-dimensional image, known parameters of the imaging system, and the known size of the femoral head from the three-dimensional model. For example, since the ratio of the z-position to the focal length of the imaging system (the distance from the emitter to the detector) is equal to the ratio of the actual diameter of the femoral head to the diameter of the femoral head in the image, the z-position can be determined by multiplying the focal length by the ratio of the actual diameter of the femoral head, which is known from the three-dimensional model, to the diameter of the femoral head in the image. The diameter of the femoral head in the image can be determined by scaling the pixel diameter of the femoral head in the image to the ratio of the diameter of the detector (e.g., in millimeters) to the diameter of the detector in pixels. The scale is known from the radius of the femoral head from the image. The rotation about the z axis (normal to the imaging/projection plane, "yaw") is known from the orientation of the midline of the femoral neck, indicated by reference numeral 2702. The remaining degrees of freedom are the rotation about the axis extending through the midline of the femoral neck (labeled the y-axis in FIG. 27, "pitch") and the rotation about the axis extending orthogonally to the femoral neck midline axis (labeled the x-axis in FIG. 27, "roll").

In some embodiments, initial alignment is determined based on one or more objects detected in the two-dimensional image via one or more object detection machine learning models and assumptions about the locations of those objects for different joint configurations. In embodiments associated with a femur of a hip joint, the object detection machine learning model may be configured to detect one or more of the femoral neck, the femoral shaft, the lesser trochanter. A femur in an anterior-posterior view appears to have an obtuse angle between the femoral neck and femoral shaft, and as the femur moves towards a Dunn view, the angle between the femoral neck and femoral shaft becomes more obtuse until the femoral neck and femoral shaft appear collinear. Additionally, the lesser trochanter is visible in an anterior-posterior view but not in a Dunn view. Based on this understanding of patient anatomy, if the object detection machine learning model does not see the lesser trochanter, then the assumption can be made that the anterior-posterior view is not the imaged view. If the angle between femoral neck and femoral shaft is obtuse, then the anterior-posterior view is more likely to be the imaged view. Thus, objects detected via one or more objection detection machine learning models can be used to provide an initial guess for the rotations about the x and y axes. This may speed up the algorithm by reducing using input and reducing the search space for a good fit.

Once the initial alignment based on the features extracted from the two-dimensional image is complete, one or more guesses for the remaining degrees of freedom can be made in step 2604. According to some embodiments, several model alignments are evaluated in parallel. Thus, several combinations of remaining degree of freedom guesses are made in step 2604. The guesses for the remaining degrees of freedom can be made based on, for example, predictions regarding how the femur is likely to be positioned. Since the leg has a limited range of motion, the guesses for the remaining degrees of freedom can be constrained based on range of motion limitations. For example, assumptions can be made about the minimum and maximum values for the remaining degrees of freedom and a plurality of values within these minimum and maximum can be selected.

In some embodiments, the values for the remaining degrees of freedom are selected based on predictions regarding the likely position of the bone for the surgical procedure. For example, for surgical procedures to address CAM-type FAI, the leg is often placed in one of six positions that have been found to be useful for x-ray imaging of the portion of the femur needing debridement. Therefore, a set of initial guess can be associated with those six common leg positions.

Once the initial guesses for the remaining degrees of freedom are set, the model alignment or alignments are fully defined. As stated above, different model alignments may be analyzed in parallel, and therefore, the result of step 2604 may be a plurality of initial model alignments. From each model alignment, a silhouette of the model is generated at step 2606 by projecting the aligned model onto a projection plane that correspond to the image. The resulting silhouette(s) is a two-dimensional outline of the bone in the three-dimensional model.

At step 2608, each silhouette is compared to features extracted from the two-dimensional image. For example, the silhouette can be compared to the set of edges detected in the two-dimensional image via edge detection, such as illustrated in FIG. 23. According to some embodiments, the comparison can be based on a similarity algorithm that compares one set of edges (the silhouette) to another set of edges (the edges detected in the two-dimensional image) and the result of the comparison can include a value associated with the degree of similarity (or dissimilarity). Any suitable similarity algorithm can be used, including, for example, an edge alignment metric based on Canny, Sobel, and Scharr edge detection algorithms.

At step 2610, the silhouette or silhouettes that resulted in the best similarity score(s) in step 2608 can be selected (multiple silhouettes can be selected to speed up the search). At step 2612, the decision is made whether to continue the search for the proper alignment. In some embodiments, the decision whether to continue can be based on the degree of similarity of the alignment selected at step 2610—such as if the degree of similarity meets a predefined threshold—or can be based on a fixed number of iterations being completed.

If the decision to continue refining the alignment is made, then the process continues to step 2614 in which the silhouette or silhouettes selected in step 2610 are shifted in one or more of the degrees of freedom, resulting in one or more shifted or "refined" silhouettes. In some embodiments, the silhouette is shifted by different amounts in one or more degree of freedom to generate a plurality of shifted silhouettes for each selected silhouette.

According to some embodiments, silhouettes are shifted only in the one or more of the degrees of freedom that are within the projection plane. For example, the x and/or y position (the in-plane translational degrees of freedom) of the silhouette can be shifted and/or the rotation about the z axis (the in-plane rotational degree of freedom) of the silhouette may be shifted. In some embodiments, the amount that the silhouette is shifted in a given in-plane degree of freedom can be predefined. For example, the silhouette may be shifted by a predefined distance in the x and/or y directions and/or by a predefined angle about the z-axis. In some embodiments, the amount that the silhouette is shifted in a given degree of freedom can be based on the results of the comparison at step 2608. According to some embodiments, the comparison algorithm may provide information regarding how far a given edge in the model is from a given edge in the two-dimensional model and the amount of shift in step 2614 can be selected based on the distance information.

At step 2616, each shifted silhouette resulting from step 2614 is compared to features extracted from the two-dimensional image in similar fashion to step 2608. For example, a similarity algorithm is used to compare the shifted silhouettes to the set of edges extracted from the two-dimensional image via edge detection. This step may result in a similarity (or dissimilarity) score for each shifted silhouette.

At step 2618, the shifted silhouette with the best similarity score is identified and the model is re-aligned according to the degree of freedom values associated with the shifted silhouette (as in other steps, more than one of the best shifted silhouettes can be selected). In other words, the model is aligned according to the x, y, z, roll, pitch, yaw, and scale values associated with the shifted silhouette having the best similarity score. Then, at step 2620, the re-aligned model is perturbed in the roll and pitch degrees of freedom by given amounts, resulting in new model alignments. For example, the model can be perturbed by a small number of degrees in roll and/or pitch. The model can be perturbed by different amounts in roll and/or pitch to generate multiple new model alignments. Furthermore, a hill climbing approach could be used to find the optimal fit in less time.

Method 2600 then returns to step 2606 in which the new model alignments are projected onto the projection plane to generate a new set of silhouettes. These new silhouettes are compared to the features of the two-dimensional image, e.g., the set of edges detected in the two-dimensional image, in step 2608, and the silhouette with the best similarity score is identified at step 2610. Then, the decision is made at step 2612 whether to continue the search for the proper alignment of the model for generating a silhouette that matches the bone in the two-dimensional image. As noted above, this decision can be based on the similarity score meeting a predefined criteria, such as being above a threshold similarity, or can be based on a fixed number of iterations. If the decision is made to continue the search, then the process continues with shifts of the silhouettes within the projection plane in step 2614, comparison of those shifts to the features of the two-dimensional image in step 2616, selection of the closest match in step 2618, perturbation in the roll and/or pitch degrees of freedom to generate a new set of alignments, and so on, until the decision is made to end the search for the proper alignment.

Once the decision is made to end the search for the proper alignment, the set of values for the seven degrees of freedom associated with the best alignment resulting from method 2600 is provided as a model alignment 2675 for generating the overlay image.

In some embodiments, the determined model alignment (e.g., model alignment 2675) is used to provide information regarding the orientation of the patient's anatomy as captured by the two-dimensional image. For example, where the femoral head has been imaged, the orientation of the leg relative to the patient can be determined based on the model alignment and this information can be provided to the user. Once the model alignment is known, information regarding the perspective from which the two-dimensional image was generated relative to the patient's body can be used along with the determined model alignment to determine the relative orientation of the anatomy when the two-dimensional image was captured. For example, with knowledge of the position of the two-dimensional imager, the determined alignment of the three-dimensional image of a head of a femur can be used to determine the degree of abduction/adduction, flexion/extension, and/or internal/external rotation of the leg. In some embodiments, the anatomy orientation is determined based on a predefined assumption regarding the position of the imager (for example, assuming that the C-arm X-ray imager is orientated with the emitter-to-detector direction being vertically upward relative to the patient and the top of the image being in the superior direction of the patient). In other embodiments, information regarding the position of the imager at the time the two-dimensional image was generated is received and used to determine anatomy orientation. The information can be received in any suitable way, including from a user input or from the imager itself.

In some embodiments, information regarding the determined anatomy orientation can be displayed to a user (e.g., intraoperatively to the surgeon), such as by adding to the overlay image. Providing the anatomy orientation information can assist a user in documenting a surgical procedure and/or can assist a user in assessing the accuracy of the determined model alignment. For example, where in the determined anatomy orientation cannot be accurate (for example, because a leg cannot possibly be the determined position), the user may understand that the determined model alignment is inaccurate and should be conducted again, such as on a new two-dimensional image and/or after one or more user adjustments (see discussion of user adjustments with respect to FIG. 29A-B below).

In some embodiments, determining the alignment of the three-dimensional model with the two-dimensional image at step 1906 can be performed based on image segmentation performed at step 1904. According to some embodiments, at step 1904, a semantic segmentation algorithm (e.g., U-net) trained to detect a bone of interest (e.g., the femur) is used to segment the bone (e.g., the femur) in the two-dimensional image, resulting in a mask. The mask is the feature extracted at step 1904. At step 1906, the three-dimensional model is projected into two-dimensional space and the projection is compared to the mask. Different projections are scored as the intersection of the projection with the mask divided by the union of the projection and the mask. The alignment of the projection having the highest score can be the alignment of the bone in the two-dimensional image.

Figure 37:
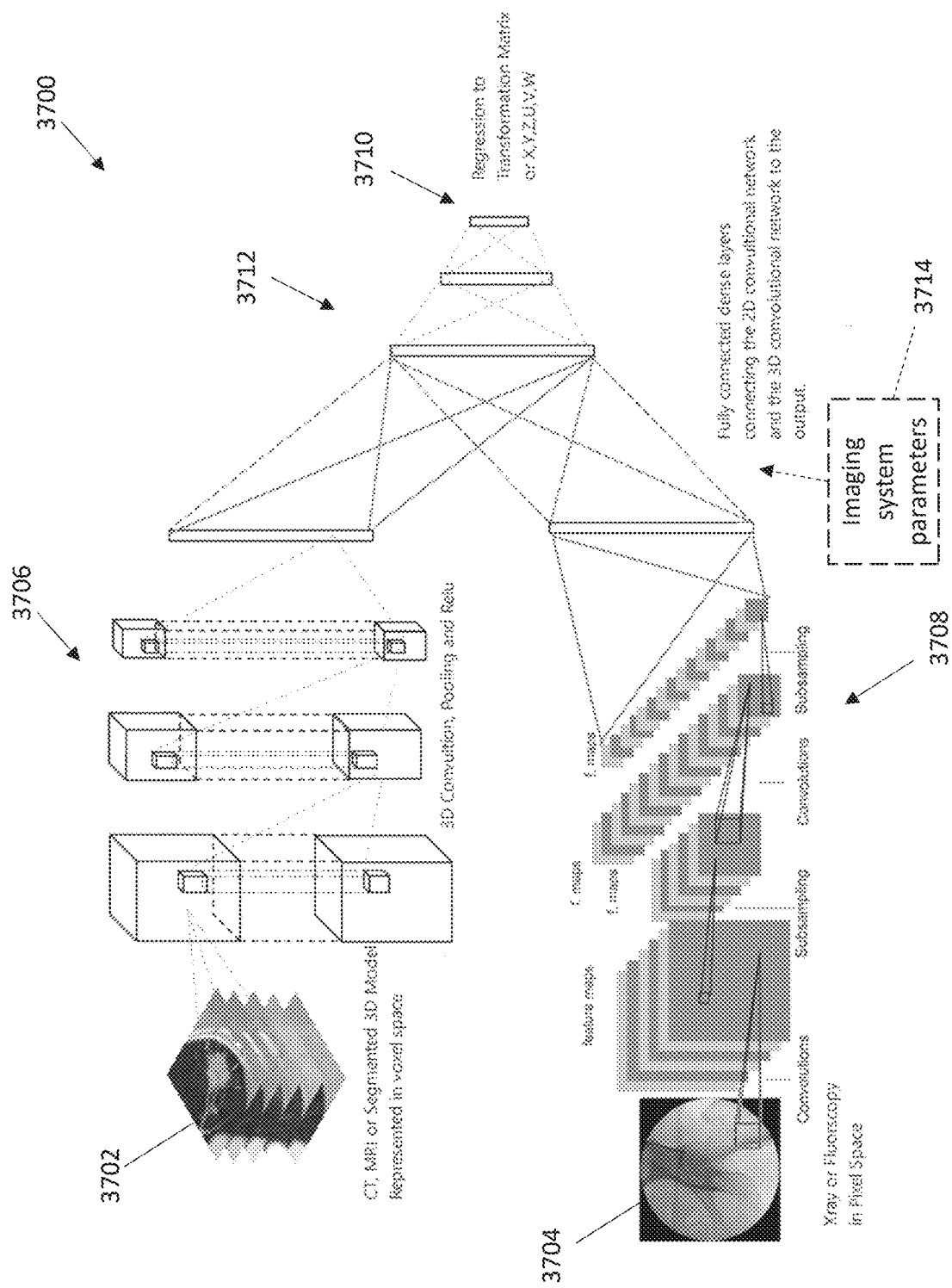
FIG. 37 illustrates an exemplary machine learning algorithm for determining the alignment of a three-dimensional model to a two-dimensional image, according to various embodiments.

In some embodiments, steps 1904 and 1906 are functionally implemented by a machine learning algorithm that is trained to determine alignment of a three-dimensional model to a two-dimensional image from the three-dimensional model and two-dimensional image, and known parameters of the imaging system (e.g. focal length, detector diameter, etc.). FIG. 37 illustrates an exemplary machine learning algorithm 3700 for determining the alignment of a three-dimensional model 3702 (e.g., CT, MRI, segmented three-dimensional model, etc.) to a two-dimensional image 3704 (e.g., X-ray, fluoroscope, etc.). The machine learning algorithm includes a three-dimensional convolutional network 3706 for the three-dimensional model 3702. The three-dimensional convolutional network 3706 may include one or more three-dimensional convolution layers, pooling layers, ReLU (Rectified Linear Units) layers, and/or other convolutional neural network layers. The machine learning algorithm includes a two-dimensional convolutional network 3708 for the two-dimensional model 3704. The two-dimensional convolutional network 3708 may include a series of convolution and subsampling steps. The three-dimensional convolutional network 3706 and two-dimensional convolutional network 3708 are connected to the output 3710 via fully connected dense layers 3712. In some embodiments, one or more parameters 3714 associated with the two-dimensional imaging system used to generated the two-dimensional image 3704 may be provided as inputs to the fully connected dense layers 3712. For example, for a C-arm fluoroscopic imager, the focal length, the detector size, etc., may be inputs to the fully connected dense layers 3712. The output 3710 of the machine learning algorithm is the transformation matrix (x, y, z, u, v, and w transformations) for the alignment of the three-dimensional model with the two-dimensional image.

Returning to method 1900 of FIG. 19, once the alignment of the model has been determined in step 1906 (such as via method 2500 of FIG. 25, method 2600 of FIG. 26, or via the machine learning algorithm of FIG. 37), an overlay image is generated by overlaying a rendering of at least a portion of the three-dimensional model onto the two-dimensional image in step 1908. A projection of the model according to the alignment determined in step 1906 is generated and at least a portion of the projection is overlaid on the two-dimensional image, which is then displayed in step 1910.

As noted above, the three-dimensional model includes a representation of the portion of the bone that deviates from a target bone state. This representation can serve as a plan for the surgical procedure that indicates to the surgeon where and how much bone should be removed to achieve the target state of the bone. In step 1908, at least a portion of the representation of planned bone removal is included in the overlay to provide the surgeon with information regarding bone to be removed. In some embodiments, the model includes portions of bone that are outside of the planned bone removal and the overlay can include at least some of these portions of bone. In some embodiments, only the representation of planned bone removal is included in the overlay.

Figure 28A:
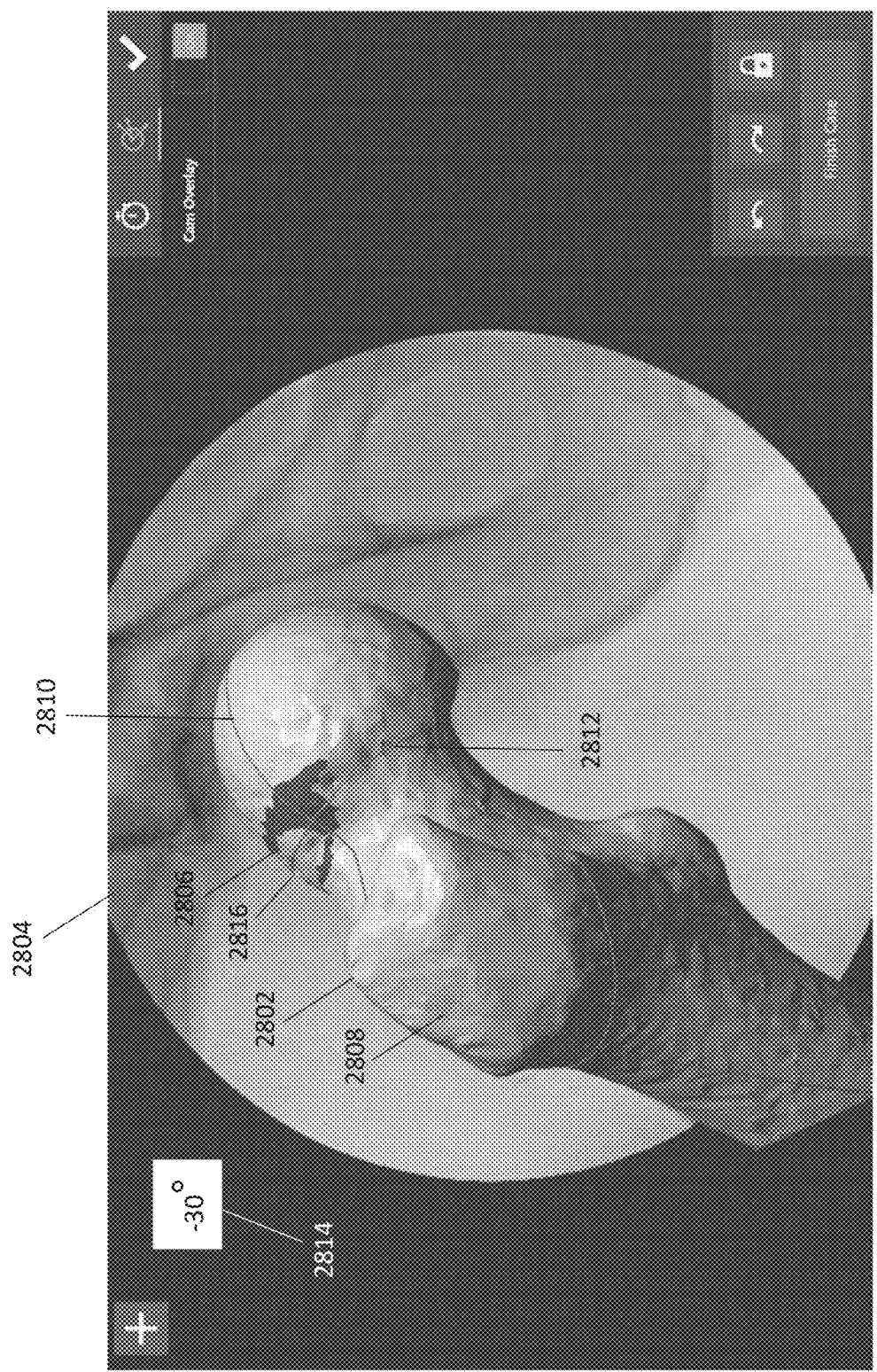
FIGS. 28A and 28B illustrate overlay images, according to some embodiments.
Figure 28B:
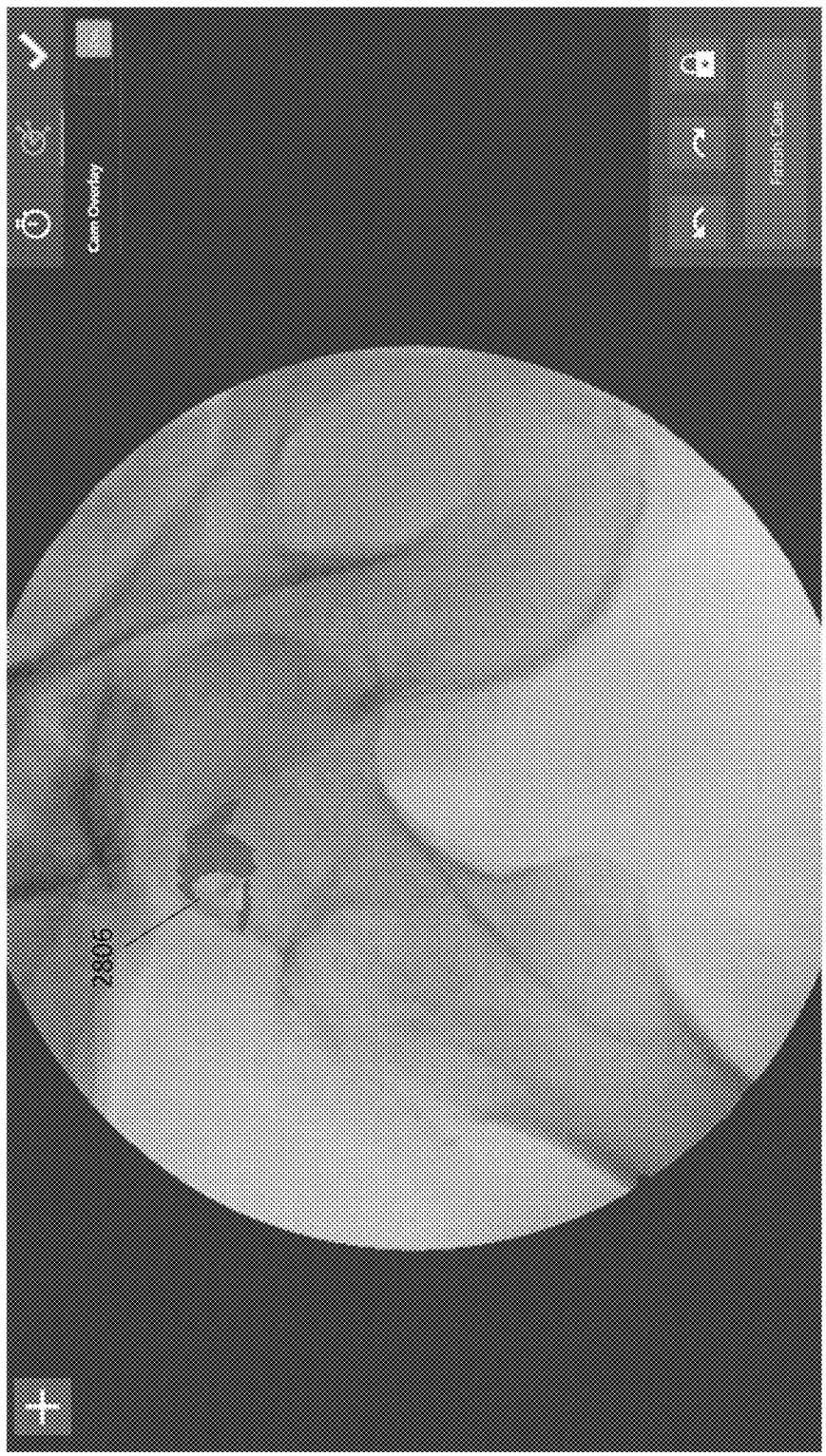

FIG. 28A illustrates an overlay of a rendering 2802 of a projection of a three-dimensional model of the upper portion of the femur on a two-dimensional image 2804 of the hip joint, according to an embodiment. The rendering 2802 includes a representation 2806 of planned bone removal—in the form of a heat map—and portions 2808 of bone outside of the planned bone removal. The heat map illustrated in FIG. 28A is merely exemplary of a representation of planned bone removal. Any suitable representation may be used, including, for example, an outline of the planned bone removal area, a contour map indicating amounts of bone removal, or any combinations of such visual aids. FIG. 28B illustrates an overlay of a rendering of the projection of a three-dimensional model of the upper portion of the femur in which only the representation 2806 of planned bone removal is overlaid on the two-dimensional image.

According to some embodiments, additional information may also be displayed in the overlay, including for example clock-face line 2810, which may be a virtual object from the three-dimensional model. As is known in the art, clock-face lines are useful for surgeons to identify positions within the hip joint (e.g., for identifying rotational positions about the femoral head, the acetabular cup, etc.). Clock-face line 2810 indicates the 12 o'clock position (the 3 o'clock position is also shown in FIG. 28A). In some embodiments, an Alpha Angle line 2812 may also be displayed. The Alpha Angle line 2812 may represent the set of circumferential locations where the bone first extends outside a best-fit sphere (or a plurality of best-fit circles) around the femoral head, as discussed above. In some embodiments, a target Alpha Angle line may be also be displayed in the overlay to indicate the target bone morphology. In the 3D model, it may also be useful to project a circle representing the alpha angle target as it is revolved around the femoral head.

It may be beneficial to the surgeon to know where the start of the cam pathology in the portion of the bone captured in the two-dimensional image is located as a function of the clock-face (i.e., the clock-face location of the point in the two-dimensional image that define the Alpha Angle—referred to here as the Alpha Angle point or Alpha point). This information can be determined from the aligned three-dimensional model, the position and orientation of which correspond to the position and orientation of the patient at the time the two-dimensional image was captured. Accordingly, in some embodiments, an indication 2814 of the clock-face location of the Alpha Angle point on the edge of the bone in the two-dimensional image 2804 (indicating the start of the cam pathology—see FIG. 16 and the associated discussion) relative to a predefined clock face position may be included in the overlay. In FIG. 28A, for example, the indication 2814 indicates that the Alpha Angle point in the two-dimensional image is −30° from 12 o'clock (in some embodiments, a clock face position, such as 11 o'clock may be displayed).

According to some embodiments, the aligned three-dimensional model may be used along with measurements from the two-dimensional image to estimate the clock-face location of the Alpha Angle point. In some embodiments, the Alpha Angle point in the two-dimensional image is determined by analyzing the two-dimensional image, such as by performing edge detection and using the results to: (1) find the femoral head in the two-dimensional image (e.g., using a Hough transform, ray tracing, and/or active shape modeling); (2) find the femoral neck and its mid-line (e.g., using a box sweep method and/or active shape modeling); and (3) find where the femoral neck stops being round and the cam pathology starts (i.e., the Alpha Angle point). In some embodiments, locating the Alpha Angle point can include tracing the strongest edges of the bone surface (e.g., using the results of edge detection) until a deviation from the circle around the femoral head is found (see, for example, Alpha Angle point 35 in FIG. 16). Once the Alpha Angle point is located in the two-dimensional image, the point 2816 in the aligned three-dimensional model that projects onto the Alpha Angle point in the two-dimensional image (or nearby) is determined (this point 2816 may correspond with the intersection of the Alpha Angle line 2812 with the horizon of the three-dimensional model). Next, a plane that includes point 2816, the center of the femoral head in the three-dimensional model, and the center of the femoral neck in the three-dimensional model is determined. The angle between this plane and the 12 o'clock plane is determined, with the 12 o'clock plane being defined as the plane in the three-dimensional model that includes the most superior point of the femoral head in the three-dimensional model, the center of the femoral head in the three-dimensional model, and the center of the femoral neck in the three-dimensional model. In FIG. 28A, the angle between the 12 o-clock plane and the clock-face plane that includes the Alpha Angle point 2816 is −30°. With this information, the surgeon knows where on the bone the start of the cam pathology in the two-dimensional image is located.

Figure 36:
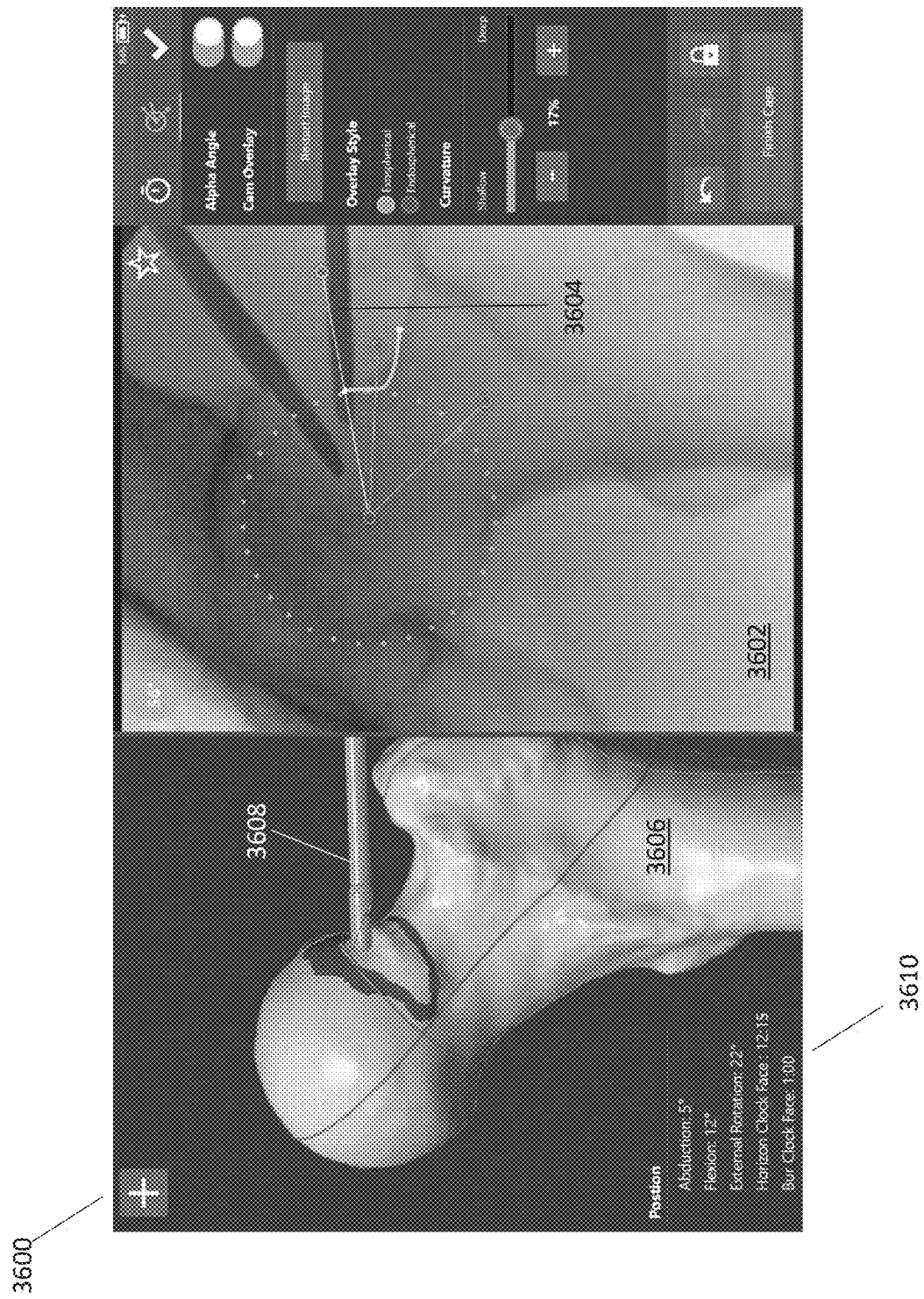
FIG. 36 illustrates a graphical user interface that includes an indication of the clock-face location of a tool, according to various embodiments.

In some embodiments, a clock-face location of a tool in the two-dimensional image may be provided to the surgeon to assist the surgeon in understanding the position of the tool relative to the portion of bone to be removed. FIG. 36 illustrates a graphical user interface 3600 in which the clock-face location of a tool is shown. Interface 3600 includes a two-dimensional image 3602 that imaged a bone removal tool 3604 positioned near the femoral head. Interface 3600 also includes a rendering of a three-dimensional model 3606 of the femur positioned according to the position and orientation of the femur in the image 3602, according to the principles discussed above. The rendering also includes a representation 3608 of the bone-removal tool positioned according to the position of the tool 3604 in the image 3602. The clock-face value 3610 of the distal end of the tool 3604 may be provided in the interface 3600. In some embodiments, the location of the bone-removal tool can be determined by using a semantic segmentation algorithm (e.g., U-net) to segment the tool from the image. The distal end of the tool may then be determined and its clock-face calculated.

According to various embodiments, the interface 3600 may provide additional information regarding the position and orientation of the femur captured in the image, such as the degree of flexion, degree of abduction, degree of external rotation, and/or the clock-face of the horizon, as determined according to the principles discussed above.

Figure 29A:
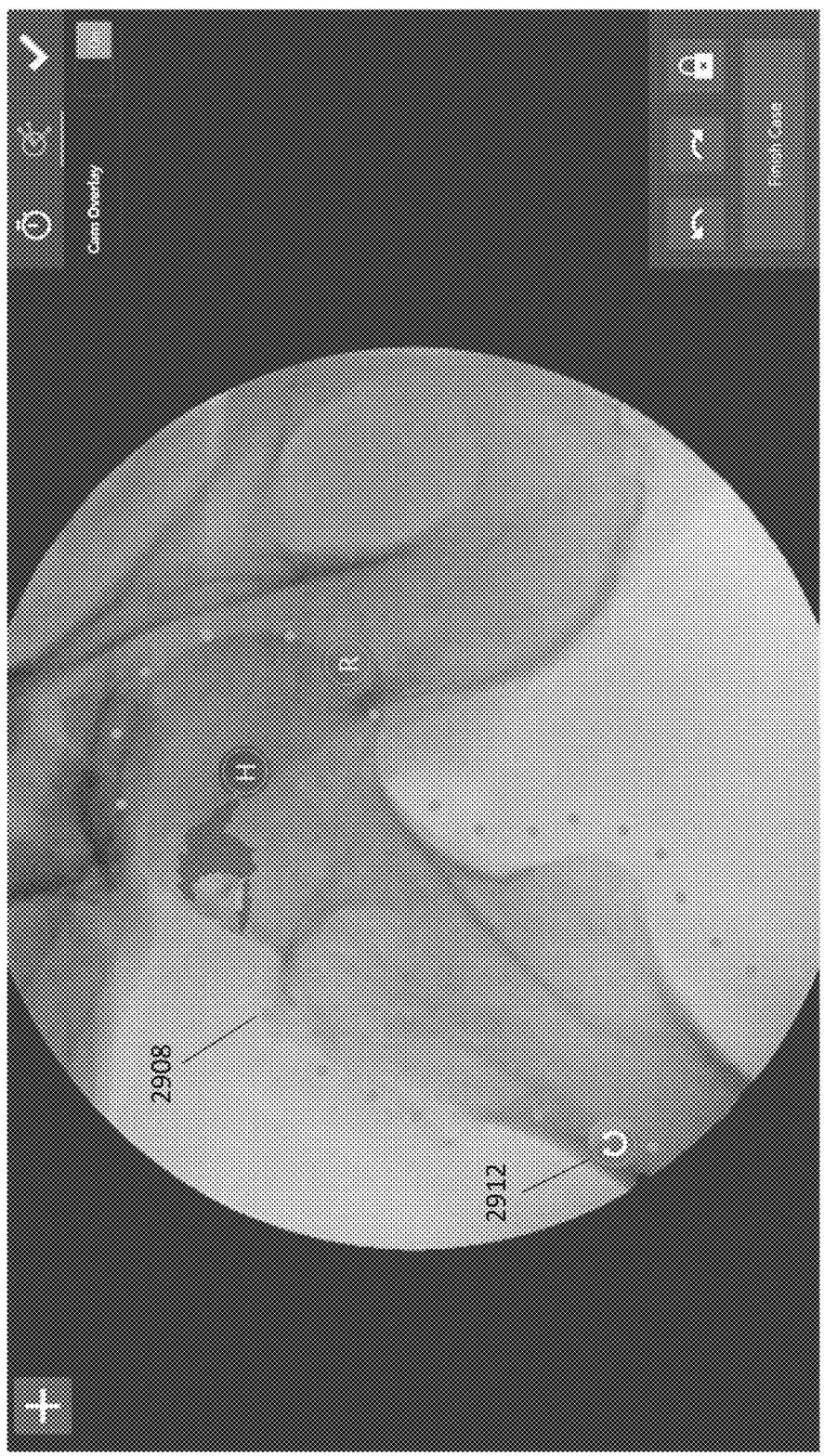
FIGS. 29A and 29B illustrate overlay image user interfaces that provide user overlay adjustment, according to some embodiments.

In some embodiments, the overlay can include a representation of an outline of the bone from the model to indicate to the user how well the projection of the model aligns with the bone in the two-dimensional image. FIG. 29A illustrates an overlay in which an outline 2908 of the perimeter of the projection of the model is included. The outline 2908 is shown in an exaggerated un-aligned position to illustrate that by including the outline 2908, the surgeon can assess the accuracy of the alignment process.

Figure 29B:

In some embodiments, the user can be provided within a user interface for manipulating the alignment of the model. For example, as shown in FIG. 29A, the overlay image is displayed in a user interface in which three user controls are provided. A head location control "H" is provided in the center portion of the femoral head to shift the x and y positions of the overlay. A user can select the head location control "H" and drag the control around the screen to reposition the model rendering—the representation of planned bone removal and the outline of the femur—relative to the two-dimensional image. The user can move the model rendering until the outline of the femur aligns with the perimeter of the femur in the two-dimensional image, as illustrated in FIG. 29B. The embodiment of FIG. 29A also includes a rotation tool 2912 that can be used to rotate the model around the centerpoint of the femoral head. A scaling tool "R" is provided to enable the surgeon to increase or decrease the scale of the model.

In some embodiments, manipulation of the model via the tools results in a new projection being generated. The user inputs are used to re-align the model and a new projection is generated and overlaid on the two-dimensional image. In other embodiments, the user inputs are used to modify the projection rendering itself.

As described above, the systems and methods according to various embodiments can be used to overlay a representation of planned bone removal on an intra-operatively generated two-dimensional image of the bone. The overlay can be displayed to the surgeon to indicate to the surgeon where bone should be removed both at the area of the bone captured in the two-dimensional image and also areas beyond that captured in the two-dimensional image. The surgeon can then remove bone, using the overlay as a guide. The surgeon may then capture a new two-dimensional image of the bone to determine how much bone the surgeon removed and where the bone was removed to assess whether sufficient bone has been removed. According to some embodiments, the system may be configured to update the representation of planned bone removal to generate an overlay in which the rendering of the representation of planned bone removal in the overlay reflects the bone that was removed.

Figure 30:
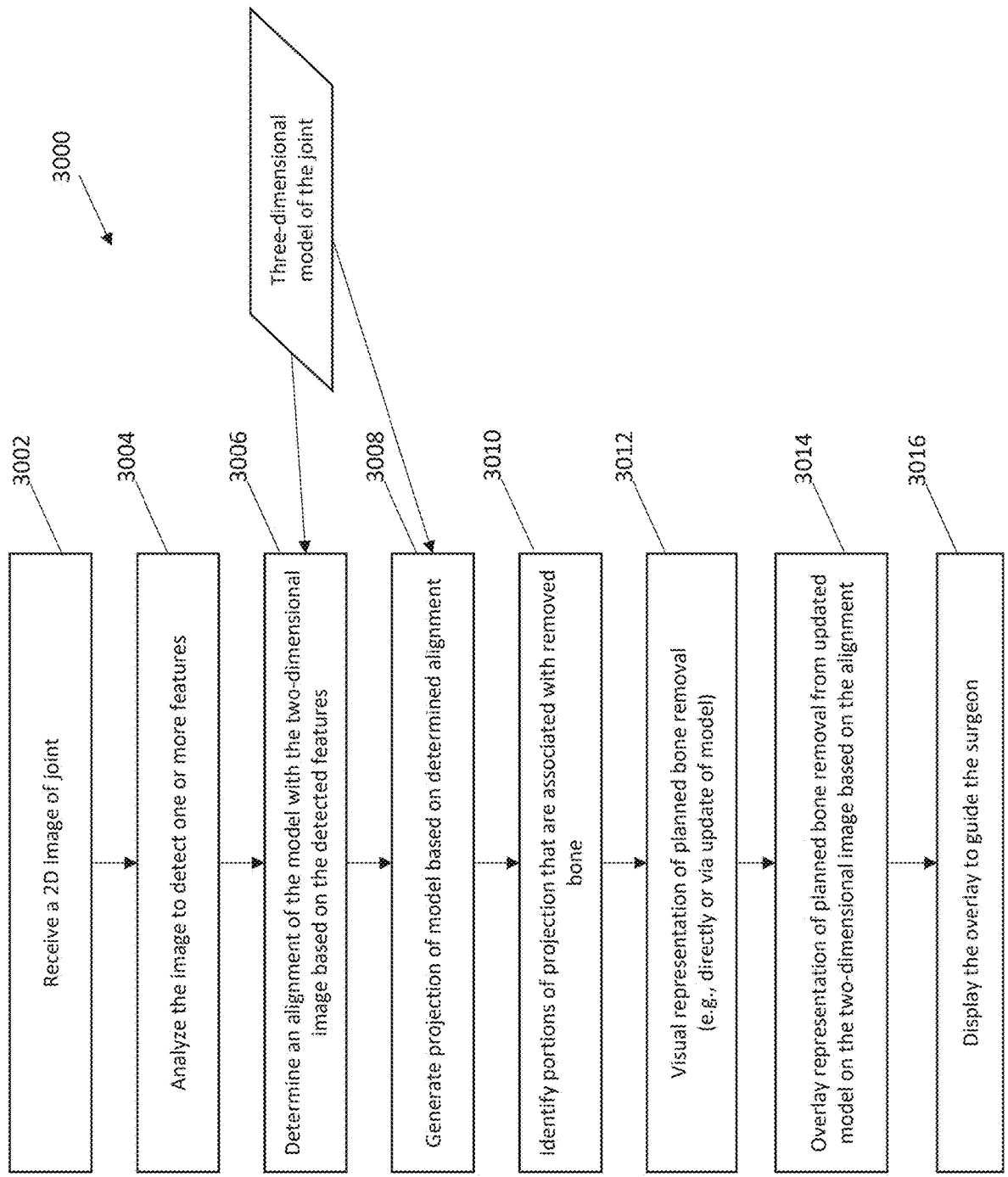
FIG. 30 illustrates a method for generating an overlay image that has an updated representation of planned bone removal that reflects bone having been removed during a surgical procedure, according to some embodiments.

FIG. 30 illustrates a method 3000 for generating an overlay image that has an updated representation of planned bone removal that reflects bone having been removed during a surgical procedure, according to some embodiments. At step 3002, a two-dimensional image of a joint is received intraoperatively. At step 3004, the two-dimensional image is analyzed to extract features of the bone of interest that can be used for aligning a three-dimensional model of the bone with the two-dimensional image. This step is analogous to step 1904 of method 1900 and, therefore, the details of this step are omitted. At step 3006, an alignment of the three-dimensional model with the two-dimensional image is determined based on at least a portion of the features extracted in step 3004 in similar fashion to step 1906 of method 1900. At step 3008, a projection of the model is generated based on the alignment determined in step 3006.

At step 3010, one or more portions of the projection that are associated with removed bone are identified. In some embodiments, this step can include comparing the projection with the set of edges detected in the two-dimensional image and identifying portions of the projection that are outside of the edges associated with the bone of interest from the two-dimensional image.

At step 3012, an updated representation of planned bone removal is generated based on the portions of the projection that were identified as being outside of the perimeter of the bone in the two-dimensional image. In some embodiments, the projection is manipulated directly to reflect the removed bone. For example, the perimeter of the bone in the projection can be altered to align with the edges in the two-dimensional image. In some embodiments, only the representation of bone removal is revised to reflect the removed bone. In some embodiments, the representation of bone removal is a heat map and a portion of the heat map associated with removed bone is removed from the projection. In other embodiments, the portion of the heat map associated with removed bone is visually altered to indicate that it may be associated with removed bone.

In some embodiments, an updated representation is generated by first updating the three-dimensional model and then re-generating a projection from the updated three-dimensional model. The three-dimensional model can be updated so that it does not include bone that has been identified as being removed. In some embodiments, the representation of planned bone removal can be updated accordingly. For example, the portion of the heat map associated with removed bone can be changed to a different color to indicate that bone has been removed and no further bone needs to be removed from the area or that there may still be bone that needs to be removed from the area to achieve the target morphology. In some embodiments, the representation of planned bone removal can be updated based on a detected change in grayscale of the two-dimensional image relative to a previously capture two-dimensional image. A grayscale change associated with portions of the bone that are not on the horizon can indicate less bone mass in that portion of the bone relative to the previously captured image, thus indicating bone removal. For example, a lightening of an area of the two-dimensional image relative to a previously captured two-dimensional image can be associated with removed bone.

An overlay image is then generated by overlaying the updated representation on the two-dimensional image at step 3014. The overlay may then be displayed to the surgeon at step 3016 so that the surgeon can visualize the location where bone has been removed and the locations where bone still needs to be removed.

Figure 31B:
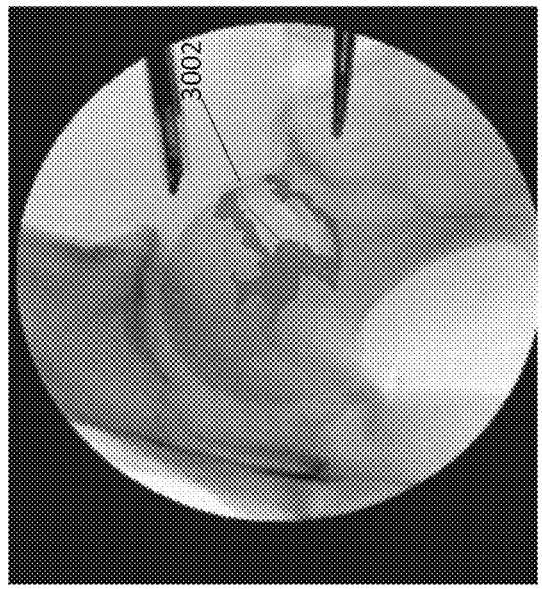
FIGS. 31A-31C illustrate results of the method of FIG. 30, according to an embodiment.
Figure 31A:
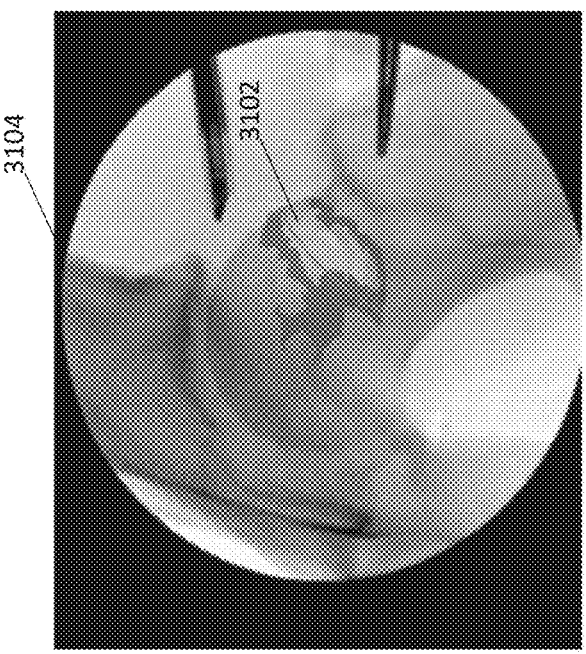
Figure 31C:
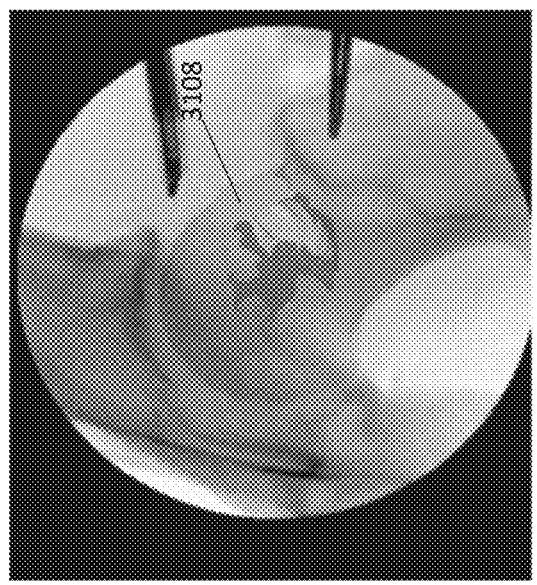

FIGS. 31A-31C illustrate the results of method 3000, according to an embodiment. FIG. 31A illustrates an overlay image showing the representation of planned bone removal 3102 overlaid on the two-dimensional image 3104 prior to any bone being removed. FIG. 31B illustrates an updated overlay generated from a new two-dimensional image captured after the surgeon has removed some bone from the head of the femur. The removal is reflected in the updated overlay via removal of a portion 3106 of the representation of planned bone removal 3102. FIG. 31C illustrates an overlay generated later in the procedure after still more bone has been removed as shown by removal of portion 3108. In this example, the portions of the representation of planned bone removal that are associated with removed bone are shaded a solid color that is different from the color used to represent planned bone removal in order to provide a clear visual indication that bone has been removed from those areas. In some embodiments, the portion of the planned bone removal associated with removed bone may be omitted from the overlay altogether so that the portion of the two-dimensional model is visible in those areas. In some embodiments, determination of bone that has been removed can be done by comparing a perimeter of a three-dimensional model with the perimeter of bone in the current two-dimensional image to determine the two-dimensional sliver of bone missing in the two-dimensional image. The sliver of bone missing from the two-dimensional image can then be removed from the three-dimensional model, such as by making an "extruded" cut of that sliver from the three-dimensional image. An overlay of planned bone removal may then be updated according to the updated three-dimensional mode for overlying on the two-dimensional image.

As discussed above, the three-dimensional model is projected onto a two-dimensional plane for determining an alignment of the model with a two-dimensional image as well as for overlaying a representation of planned bone removal on the two-dimensional image. In some embodiments, the model can be projected using a reverse projection technique that accounts for the manner in which the two-dimensional image is generated. Reverse projection can be used during the determination of the alignment of the model with the two-dimensional image, such as for step 1906 of method 1900, step 2504 of method 2500, and/or step 2606 of method 2600, and/or during the generation of the overlay of the planned bone removal, such as for step 1908 of method 1900.

Reverse projection is suitable, for example, in embodiments in which the two-dimensional image is generated via an X-ray imager, such as a C-arm imager, in which the X-ray source is below the patient and the X-ray detector is above the patient. With the X-ray detector above the patient and the source below, objects that are closer to the X-ray source appear larger than objects further from the X-ray source. Since the standard surgical view is from above the patient, the perspective captured in the X-ray image is the opposite of the perspective from the standard surgical view. In other words, objects that are positioned further from the viewer according to the standard surgical view are depicted larger in the X-ray image than objects positioned closer to the viewer. To accommodate this difference in perspective, according to some embodiments, a reverse projection technique is used to project the three-dimensional model onto the two-dimensional imaging plane.

Figure 34:
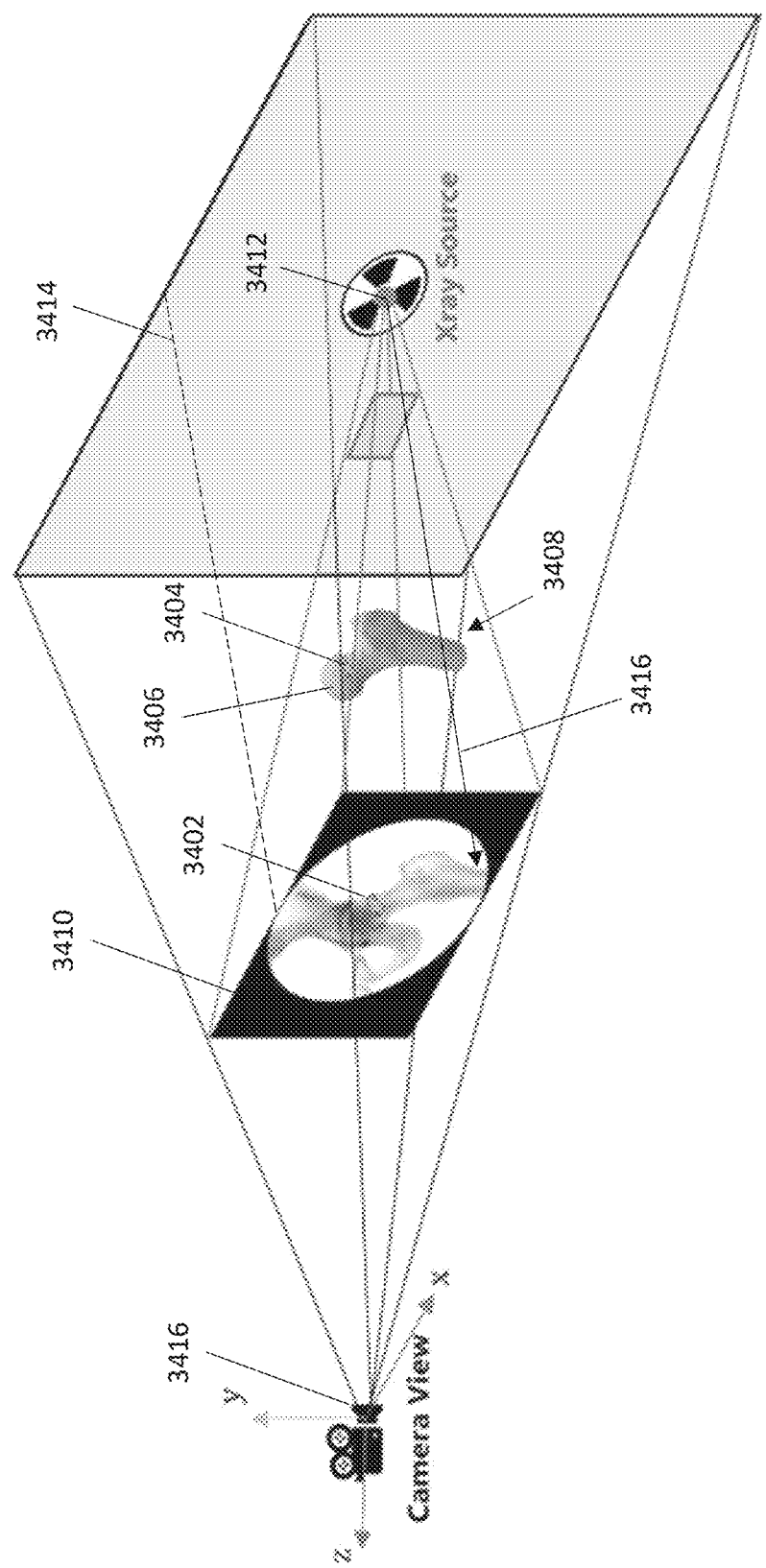
FIG. 34 illustrates a reverse projection technique, according to some embodiments.

FIG. 34 conceptually illustrates the use of reverse projection for projecting the three-dimensional model onto a two-dimensional plane corresponding to the X-ray imaging plane. The reverse projection technique replicates the perspective created by an X-ray imager by enlarging portions further from the viewer (also referred to herein as the camera) and shrinking portions closer to the viewer. Thus, while the viewer-facing portion of the three-dimensional model is included in the projection, the points of the viewer-facing portion of the three-dimensional model are projected such that portions further from the viewer are larger than portions closer to the viewer. This is shown in FIG. 34 in which the overlay 3402 of the heat map 3404 on the anterior portion 3406 of the left femoral head in the three-dimensional model 3408 is generated by projecting onto the projection plane 3410 (corresponding to the X-ray detector/imaging plane) from underneath (posterior to) the three-dimensional model 3408. According to some embodiments, reverse projection maps points on the three-dimensional model 3408 to the projection plane 3410 using projection rays 3416 that extend from a point 3412 located a distance behind the projection plane 3410 that corresponds to the focal length 3414 of the X-ray imager. This results in portions of the heat map 3404 that are further from the viewer 3416 being relatively larger in the overlay 3402 than same-sized portions that are closer to the viewer 3416.

As mentioned above, reverse projection can be used for aligning the three-dimensional model with the two-dimensional image, as well as for generating the overlay of the representation of planned bone removal, such as for step 1908 of method 1900. Once the three-dimensional model is properly aligned (for example, via reverse projection), the representation of planned bone removal (or at least a portion thereof used for the overlay) is located on a portion of the three-dimensional model that faces toward the viewer of the X-ray image and the overlay of the at least a portion of the representation of planned bone removal is generated via reverse projection in which portions of the at least a portion of the representation of planned bone removal that are further from the viewer are relatively larger than similarly-sized portions of the at least a portion of the representation of planned bone removal that are closer to the viewer. For example, where an X-ray image of a femoral head is generated with the X-ray emitter-to-detector direction being the posterior-to-anterior direction, the anterior portion of the three-dimensional model faces in a viewer direction and the representation of planned bone removal on the anterior portion of the model is projected onto a projection plane corresponding to the imaging plane such that portions that are more posterior (further from the viewer) are larger than identically sized portions that are more anterior (closer to the viewer). As noted above, this is the opposite of standard projection in which portions closer to the viewer would be relatively larger than portions further from the viewer. Thus, the overlay is generated in a manner that corresponds to the manner in which the X-ray is captured and can provide an overlay image in which the overlay from the three-dimensional model better aligns with the bone in the X-ray image.

Figure 32:
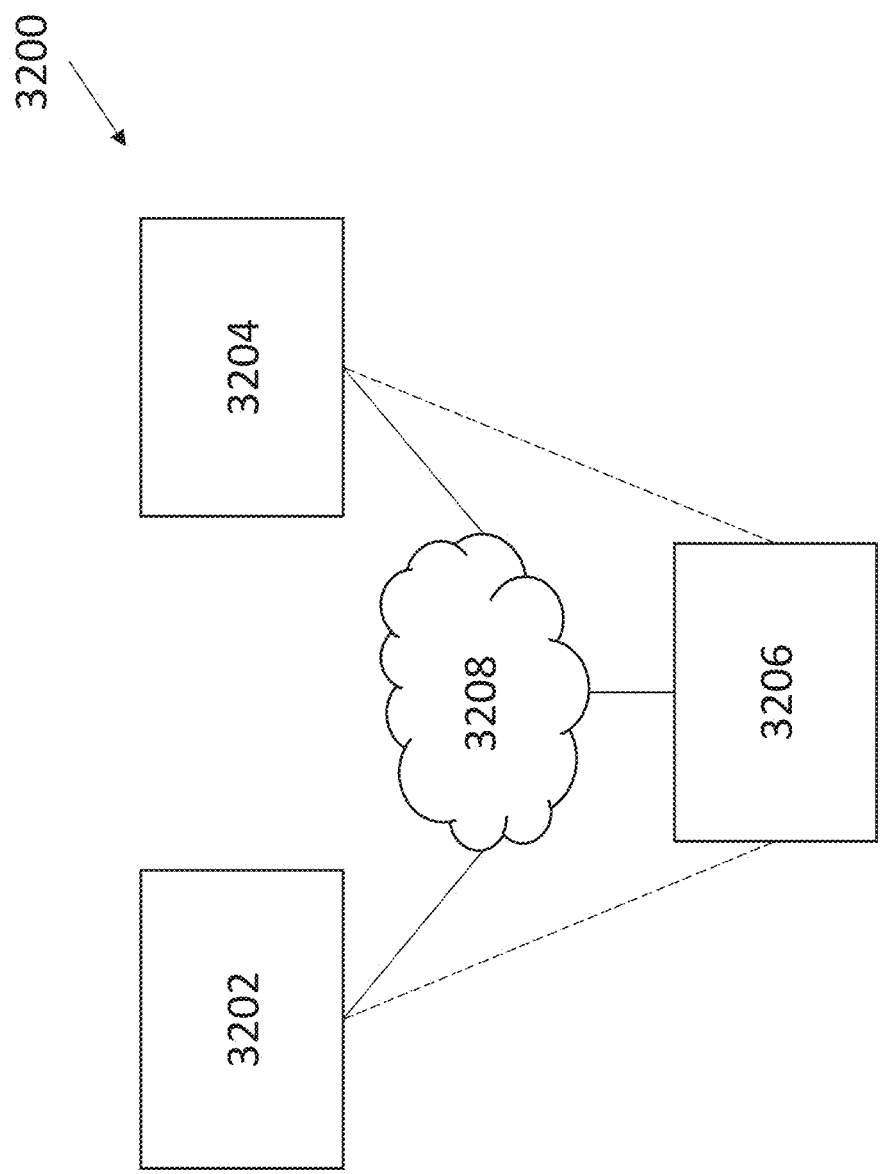
FIG. 32 illustrates a system for generating and displaying the overlay image to a practitioner to guide the practitioner in bone removal during the surgical procedure, according to various embodiments.

FIG. 32 illustrates a system 3200 for generating a two-dimensional image of a joint of a subject, generating an overlay image in which a representation of planned bone removal from a three-dimensional model of the joint is overlaid on the two-dimensional image, and displaying the overlay image to a practitioner to guide the practitioner in bone removal during the surgical procedure, according to various embodiments. System 3200 includes a three-dimensional modeling subsystem 3202 for generating a three-dimensional model of the joint that includes a representation of planned bone removal, an intra-operative imaging subsystem 3204, such as C-arm X-ray machine 115 of FIG. 18, for intra-operative generating two-dimensional images of the joint during a surgical procedure, and a visual guidance subsystem 3206, such as visual guidance system 125 of FIG. 18, for generating overlay images from the three-dimensional model and two-dimensional images. The subsystems may be communicatively connected to one another via one or more communication connections 3208, which can be a network connection, such as a local area network, a wide area network, a combination of local and wide area networks, or any suitable communication network, one or more direct connections between the subsystems, or a combination of direct and network connections. Any of the modeling subsystem 3202, the intra-operative imaging subsystem 3204, and the visual guidance subsystem 3206 can be in separate locations from the other subsystems or can have components that are in separate locations from the other subsystems or components of subsystems. In some embodiments, the subsystems or portions of the subsystems may be in the same location, such as in the same operating suite. In some embodiments, the three-dimensional modeling subsystem 3202 and the intra-operative imaging subsystem 3204 are the same system or share the same components, such as the same imager.

Three-dimensional modeling subsystem 3202 can include an imager for generating imaging data for a subject. Imaging data can include, for example, MRI scans, CT scans, x-rays, fluorescence imaging data, or any suitable imaging data for imaging a joint of a subject. In some embodiment, the three-dimensional modeling subsystem 3202 can include one or more imaging data processing systems for processing imaging data generated by an imager. The three-dimensional modeling subsystem 3202 can include one or more data storage systems for storing imaging data and/or model data. The three-dimensional modeling subsystem 3202 can be configured to transmit imaging and/or model data for a joint of a subject to visual guidance subsystem 3206. For example, after an imaging session in which a joint of a subject was imaged, the three-dimensional modeling subsystem 3202 can generate a three-dimensional model of the joint from the imaging data generated during the session. The three-dimensional model can be transmitted to the visual guidance subsystem 3206 for generating overlay images, according to the principles described herein. According to some embodiments, the three-dimensional modeling subsystem 3202 can identify at least one region of an imaged joint that deviates from a baseline anatomy by comparing at least a portion of the three-dimensional model to a baseline model. The three-dimensional modeling subsystem 3202 can generate one or more measurements of a characteristic of the joint at one or more predefined locations using the three-dimensional model and a coordinate system; and can generate a three-dimensional rendering of the model, according to the principles described herein. The three-dimensional rendering can include a visual indication of the at least one region of the three-dimensional model that deviates from the baseline, wherein the at least one region is visually indicated according to degree of deviation. This visual indication can represent planned bone removal for a surgical procedure. The three-dimensional rendering can be a component of a visualization that includes any other relevant information as described herein.

Intra-operative imaging subsystem 3204 can include an imager for generating two-dimensional imaging data for a subject during a surgical procedure. The intra-operative imaging subsystem 3204 can include, for example, an x-ray imager, such as a C-arm x-ray imager. In some embodiment, the intra-operative imaging subsystem 3204 can be configured to transmit imaging data for a joint of a subject to visual guidance subsystem 3206. For example, upon capturing an image of the joint of the subject, the image can be transmitted to the visual guidance subsystem 3206 for generating overlay images, according to the principles described herein.

The visual guidance subsystem 3206 can be configured to receive imaging data and three-dimensional model data and use some or all of the received data for generating overlay images, according to the principles described herein.

Figure 33:
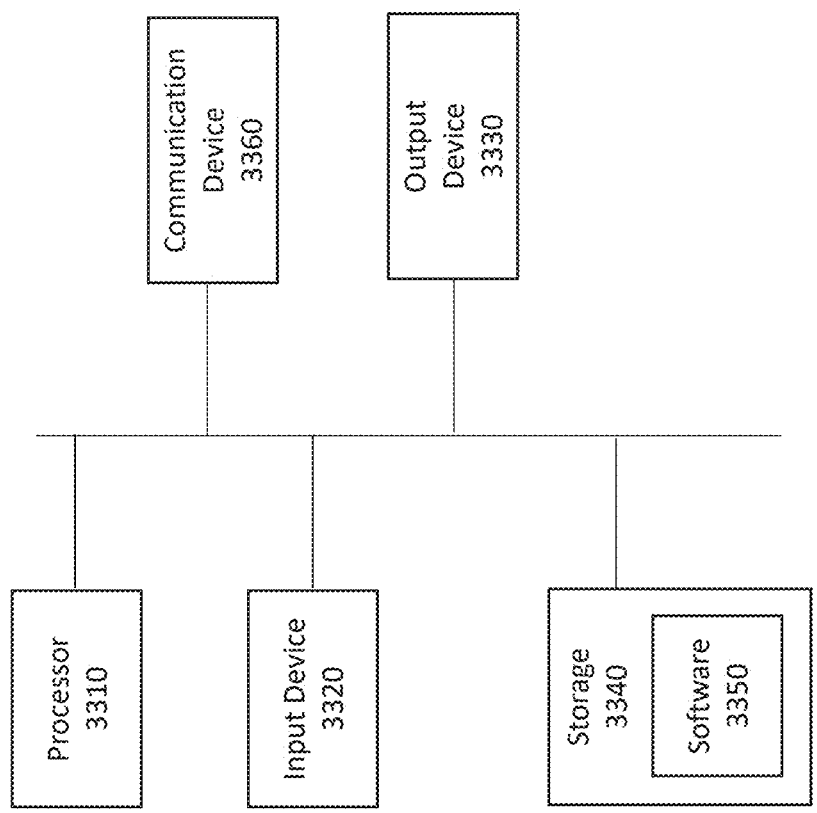
FIG. 33 illustrates an example of a computing system, in accordance with some embodiments.

FIG. 33 illustrates an example of a computing system, in accordance with some embodiments, that can be used for one or more of subsystems 3202, 3204, and 3206 of system 3200. System 3300 can be a computer connected to a network, such as one or more networks of communication connections 3208 of system 3200. System 3300 can be a client computer or a server. As shown in FIG. 33, system 3300 can be any suitable type of microprocessor-based system, such as a personal computer, workstation, server, or handheld computing device (portable electronic device) such as a phone or tablet. The system can include, for example, one or more of processor 3310, input device 3320, output device 3330, storage 3340, and communication device 3360. Input device 3320 and output device 3330 can generally correspond to those described above and can either be connectable or integrated with the computer.

Input device 3320 can be any suitable device that provides input, such as a touch screen, keyboard or keypad, mouse, gesture recognition component of a virtual/augmented reality system, or voice-recognition device. Output device 3330 can be or include any suitable device that provides output, such as a touch screen, haptics device, virtual/augmented reality display, or speaker.

Storage 3340 can be any suitable device that provides storage, such as an electrical, magnetic, or optical memory including a RAM, cache, hard drive, removable storage disk, or other non-transitory computer readable medium. Communication device 3360 can include any suitable device capable of transmitting and receiving signals over a network, such as a network interface chip or device. The components of the computer can be connected in any suitable manner, such as via a physical bus or wirelessly.

Software 3350, which can be stored in storage 3340 and executed by processor 3310, can include, for example, the programming that embodies the functionality of the present disclosure (e.g., as embodied in the devices as described above). For example, software 3350 can include one or more programs for performing one or more of the steps of method 1900, method 2100, method 2500, method 2600, and/or method 3000.

Software 3350 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 3340, that can contain or store programming for use by or in connection with an instruction execution system, apparatus, or device.

Software 3350 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic, or infrared wired or wireless propagation medium.

System 3300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 3300 can implement any operating system suitable for operating on the network. Software 3350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of any patents and publications referred to in this application are hereby incorporated herein by reference.

The invention claimed is:

1. A method for guiding bone removal during a surgical procedure, the method comprising:
 receiving a two-dimensional image of at least a portion of a joint during the surgical procedure;
 determining an alignment of a pre-generated three-dimensional model of the at least a portion of the joint with the two-dimensional image based on one or more features in the two-dimensional image that are associated with the at least a portion of the joint, wherein the pre-generated three-dimensional model comprises a representation of planned bone removal;
 generating an overlay image based on the determined alignment, the overlay image comprising an overlay of at least a portion of the representation of planned bone removal on the two-dimensional image; and
 displaying the overlay image to guide bone removal during the surgical procedure.

2. The method of claim 1, wherein the three-dimensional model was pre-generated based on one or more scans of the joint.

3. The method of claim 1, wherein the one or more features are associated with at least one of a center of a femoral head, a centerline of a femoral neck, and a perimeter of the femoral head.

4. The method of claim 1, wherein determining the alignment of a pre-generated three-dimensional model of the at least a portion of the joint with the two-dimensional image comprises translating and rotating the three-dimensional model based on the one or more features.

5. The method of claim 1, wherein determining the alignment of a pre-generated three-dimensional model of the at least a portion of the joint with the two-dimensional image comprises detecting an edge in the two-dimensional image that is associated with a periphery of bone.

6. The method of claim 1, wherein determining the alignment of a pre-generated three-dimensional model of the at least a portion of the joint with the two-dimensional image comprises determining a center of a femoral head in the two-dimensional image, determining a centerline of a femoral neck in the two-dimensional image, aligning a center of a model femoral head in the three-dimensional model with the center of the femoral head in the two-dimensional image, and aligning a centerline of a model femoral neck in the three-dimensional model with the centerline of the femoral neck in the two-dimensional image.

7. The method of claim 1, wherein the representation of planned bone removal comprises at least one of a heat map indicating locations for and amounts of planned bone removal, a contour map indicating locations for and amounts of planned bone removal, and an outline of a planned bone removal area.

8. The method of claim 1, wherein the three-dimensional model includes a representation of bone that is outside of the planned bone removal and the representation of bone that is outside of the planned bone removal is omitted from the overlay.

9. The method of claim 1, further comprising determining a portion of the three-dimensional model associated with bone that has been removed during the surgical procedure and omitting the portion of the three-dimensional model from the overlay.

10. The method of claim 9, wherein the portion of the three-dimensional model omitted from the overlay is a portion of a heat map associated with planned bone removal.

11. The method of claim 1, further comprising, after displaying the overlay image, modifying a position of the overlay of at least a portion of the representation of planned bone removal on the two-dimensional image in response to a user input.

12. The method of claim 1, further comprising capturing a new two-dimensional image of the portion of the joint in a new position, determining an updated alignment of the pre-generated three-dimensional model with the new two-dimensional image, generating an updated overlay image based on the determined updated alignment, and displaying the updated overlay image to indicate a progress of bone removal.

13. The method of claim 1, wherein the representation of planned bone removal is three-dimensional and generating the overlay image comprises projecting the representation of planned bone removal onto a two-dimensional plane.

14. The method of claim 1, wherein the representation of planned bone removal indicates planned bone removal associated with a cam-type femoroacetabular impingement.

15. The method of claim 1, wherein the representation of planned bone removal indicates planned bone removal associated with a pincer-type femoroacetabular impingement.

16. The method of claim 1, wherein the two-dimensional image is received intra-operatively from an x-ray system.

17. The method of claim 1, wherein the three-dimensional model is based on imaging data from an imaging system of a first type and the two-dimensional image is received from an imaging system of a second type that is different than the first type.

18. The method of claim 17, wherein the imaging system of the first type is an MRI system or a CT system and the imaging system of the second type is a C-arm x-ray system.

19. A system for guiding bone removal during a surgical procedure, the system comprising one or more processors, memory, and one or more programs, wherein the one or more programs are stored in the memory and configured to be executed by the one or more processors, the one or more programs including instructions for:
receiving a two-dimensional image of at least a portion of a joint during the surgical procedure;
determining an alignment of a pre-generated three-dimensional model of the at least a portion of the joint with the two-dimensional image based on one or more features in the two-dimensional image that are associated with the at least a portion of the joint, wherein the pre-generated three-dimensional model comprises a representation of planned bone removal;
generating an overlay image based on the determined alignment, the overlay image comprising an overlay of at least a portion of the representation of planned bone removal on the two-dimensional image; and
transmitting the overlay image to a display for guiding bone removal during the surgical procedure.

20. The system of claim 19, wherein the system is configured for communicatively connecting to an intra-operative imaging system that generates the two-dimensional image.

21. The system of claim 19, wherein the one or more programs include instructions for receiving a user input for repositioning the overlay of the at least a portion of the representation of planned bone removal on the two-dimensional image.

22. The system of claim 21, comprising a touch screen display or augmented reality system for displaying the two-dimensional image and receiving the user input.

23. The system of claim 19, wherein the three-dimensional model was pre-generated based on one or more scans of the joint.

24. The system of claim 19, wherein the one or more features are associated with at least one of a center of a femoral head, a centerline of a femoral neck, and a perimeter of the femoral head.

25. The system of claim 19, wherein determining the alignment of a pre-generated three-dimensional model of the at least a portion of the joint with the two-dimensional image comprises translating and rotating the three-dimensional model based on the one or more features.

26. The system of claim 19, wherein determining the alignment of a pre-generated three-dimensional model of the at least a portion of the joint with the two-dimensional image comprises detecting an edge in the two-dimensional image that is associated with a periphery of bone.

27. The system of claim 19, wherein determining the alignment of a pre-generated three-dimensional model of the at least a portion of the joint with the two-dimensional image comprises determining a center of a femoral head in the two-dimensional image, determining a centerline of a femoral neck in the two-dimensional image, aligning a center of a model femoral head in the three-dimensional model with the center of the femoral head in the two-dimensional image, and aligning a centerline of a model femoral neck in the three-dimensional model with the centerline of the femoral neck in the two-dimensional image.

28. The system of claim 19, wherein the representation of planned bone removal comprises at least one of a heat map indicating locations for and amounts of planned bone removal, a contour map indicating locations for and amounts of planned bone removal, and an outline of a planned bone removal area.

29. The system of claim 19, wherein the three-dimensional model includes a representation of bone that is outside of the planned bone removal and the representation of bone that is outside of the planned bone removal is omitted from the overlay.

30. The system of claim 19, wherein the one or more programs include instructions for determining a portion of the three-dimensional model associated with bone that has been removed during the surgical procedure and omitting the portion of the three-dimensional model from the overlay.

31. The system of claim 30, wherein the portion of the three-dimensional model omitted from the overlay is a portion of a heat map associated with planned bone removal.

32. The system of claim 19, wherein the one or more programs include instructions for, after displaying the overlay image, modifying a position of the overlay of at least a portion of the representation of planned bone removal on the two-dimensional image in response to a user input.

33. The system of claim 19, wherein the one or more programs include instructions for capturing a new two-dimensional image of the portion of the joint in a new position, determining an updated alignment of the pre-generated three-dimensional model with the new two-dimensional image, generating an updated overlay image based on the determined updated alignment, and displaying the updated overlay image to indicate a progress of bone removal.

34. The system of claim 19, wherein the representation of planned bone removal is three-dimensional and generating the overlay image comprises projecting the representation of planned bone removal onto a two-dimensional plane.

35. The system of claim 19, wherein the representation of planned bone removal indicates planned bone removal associated with a cam-type femoroacetabular impingement.

36. The system of claim 19, wherein the representation of planned bone removal indicates planned bone removal associated with a pincer-type femoroacetabular impingement.

37. The system of claim 19, wherein the two-dimensional image is received intra-operatively from an x-ray system.

38. The system of claim 19, wherein the three-dimensional model is based on imaging data from an imaging system of a first type and the two-dimensional image is received from an imaging system of a second type that is different than the first type.

39. The system of claim 38, wherein the imaging system of the first type is an MRI system or a CT system and the imaging system of the second type is a C-arm x-ray system.

40. A non-transitory computer readable medium storing instructions for execution by one or more processors of an imaging system for:
  receiving a two-dimensional image of at least a portion of a joint during the surgical procedure;
  determining an alignment of a pre-generated three-dimensional model of the at least a portion of the joint with the two-dimensional image based on one or more features in the two-dimensional image that are associated with the at least a portion of the joint, wherein the pre-generated three-dimensional model comprises a representation of planned bone removal;
  generating an overlay image based on the determined alignment, the overlay image comprising an overlay of at least a portion of the representation of planned bone removal on the two-dimensional image; and
  transmitting the overlay image to a display for guiding bone removal during the surgical procedure.

* * * * *